US012777142B2

(12) United States Patent
Wang

(10) Patent No.: US 12,777,142 B2
(45) Date of Patent: Oct. 27, 2026

(54) PREDICTION METHODS

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/757,492

(22) Filed: Jun. 27, 2024

(65) Prior Publication Data

US 2024/0372984 A1 Nov. 7, 2024

Related U.S. Application Data

(63) Continuation of application No. PCT/CN2022/086453, filed on Apr. 12, 2022.

(30) Foreign Application Priority Data

Dec. 31, 2021 (WO) ................ PCT/CN2021/144008

(51) Int. Cl.

| | |
|---|---|
| ***H04N 19/52*** | (2014.01) |
| ***H04N 19/105*** | (2014.01) |
| ***H04N 19/132*** | (2014.01) |
| ***H04N 19/156*** | (2014.01) |
| ***H04N 19/159*** | (2014.01) |
| ***H04N 19/176*** | (2014.01) |

(Continued)

(52) U.S. Cl.
CPC ......... *H04N 19/105* (2014.11); *H04N 19/132* (2014.11); *H04N 19/156* (2014.11); *H04N 19/159* (2014.11); *H04N 19/176* (2014.11); *H04N 19/463* (2014.11); *H04N 19/50* (2014.11); *H04N 19/52* (2014.11)

(58) Field of Classification Search
CPC .... H04N 19/11; H04N 19/105; H04N 19/159; H04N 19/593
See application file for complete search history.

(56) References Cited

U.S. PATENT DOCUMENTS

| | | | | |
|---|---|---|---|---|
| 10,694,179 | B2 * | 6/2020 | Hermansson ........ | H04N 19/176 |
| 11,064,206 | B2 | 7/2021 | Zhang et al. | |
| 11,463,687 | B2 | 10/2022 | Zhang et al. | |

(Continued)

FOREIGN PATENT DOCUMENTS

| | | |
|---|---|---|
| CN | 111294590 | 6/2020 |
| CN | 111385569 | 7/2020 |

(Continued)

OTHER PUBLICATIONS

CIIP using triangular partitions; Blasi—2019; (Year: 2019).*

(Continued)

*Primary Examiner* — Luis Perez-Fuentes
(74) *Attorney, Agent, or Firm* — Hodgson Russ LLP

(57) ABSTRACT

A prediction method includes the following. A bitstream is decoded to determine K initial prediction modes, where K is an integer greater than 1. A weight derivation mode for a current block is determined according to the K initial prediction modes. A prediction value of the current block is determined according to the weight derivation mode for the current block.

20 Claims, 16 Drawing Sheets

(51) Int. Cl.
*H04N 19/463* (2014.01)
*H04N 19/50* (2014.01)

(56) References Cited

U.S. PATENT DOCUMENTS

| | | | |
|---|---|---|---|
| 11,533,498 B2 | 12/2022 | Chen et al. | |
| 11,611,743 B2 | 3/2023 | Zhang et al. | |
| 11,876,973 B2 * | 1/2024 | Liao | H04N 19/176 |
| 12,069,262 B2 | 8/2024 | Zhang et al. | |
| 12,225,187 B2 | 2/2025 | Sun | |
| 12,301,792 B2 * | 5/2025 | Wang | H04N 19/176 |
| 12,316,867 B2 * | 5/2025 | Xiu | H04N 19/70 |
| 12,355,944 B2 * | 7/2025 | Wang | H04N 19/46 |
| 12,439,053 B2 * | 10/2025 | Liao | H04N 19/157 |
| 12,526,401 B2 * | 1/2026 | Wang | H04N 19/105 |
| 2019/0215521 A1 | 7/2019 | Chuang et al. | |
| 2021/0092392 A1 | 3/2021 | Reuze et al. | |
| 2022/0329824 A1 | 10/2022 | Liao et al. | |
| 2023/0262223 A1 | 8/2023 | Ghaznavi Youvalari et al. | |
| 2023/0300326 A1 | 9/2023 | Wang | |
| 2024/0007647 A1 | 1/2024 | Liao et al. | |

FOREIGN PATENT DOCUMENTS

| | | |
|---|---|---|
| CN | 111741297 | 10/2020 |
| CN | 112055203 | 12/2020 |
| CN | 113273188 | 8/2021 |
| CN | 113497942 | 10/2021 |
| CN | 113545074 | 10/2021 |
| CN | 113766245 | 12/2021 |
| JP | 2021027464 | 2/2021 |
| WO | 2019198997 | 10/2019 |
| WO | 2020147747 A1 | 7/2020 |
| WO | 2021244935 | 12/2021 |

OTHER PUBLICATIONS

Extension of template matching to Affine, CIIP, GPM merge modes; Chen—Apr. 2021; (Year: 2021).*
Extension of template matching to Affine, CIIP, GPM merge modes; Chen—2021. (Year: 2021).*
Locally-weighted TM based prediction for cloud-based image compression; 2016. (Year: 2016).*
WIPO, International Search Report and Written Opinion for International Application No. PCT/CN2021/144008, Sep. 15, 2022.
WIPO, International Search Report and Written Opinion for International Application No. PCT/CN2022/086453, Sep. 21, 2022.
Begaint et al., "Locally-weighted template-matching based prediction for cloud-based image compression," Data Compression Conference, 2016.
JPO, Office Action for JP Application No. 2024-539671, Dec. 5, 2025.
First examination report issued in corresponding IN application No. 202417053449 dated Jul. 24, 2026. 9 pages.

* cited by examiner

PREDICTION METHODS

CROSS-REFERENCE TO RELATED APPLICATION(S)

This application is a continuation of International Application No. PCT/CN2022/086453, filed Apr. 12, 2022, which claims priority to International Application No. PCT/CN2021/144008, filed Dec. 31, 2021, the entire disclosures of which are hereby incorporated by reference.

TECHNICAL FIELD

This disclosure relates to the field of video coding technology, and more particularly, to prediction methods.

BACKGROUND

Digital video technology may be applied to various video apparatuses, such as digital televisions, smart phones, computers, electronic readers, or video players, etc. With development of video technology, the data amount in video data is large. In order to facilitate transmission of video data, the video apparatus implements video compression technology, so that video data can be transmitted or stored more efficiently.

There is temporal redundancy or spatial redundancy in a video, and redundancy in the video can be eliminated or reduced through prediction, thereby improving compression efficiency. In some cases, multiple prediction modes are used to predict the current block to obtain a prediction value of the current block. In these cases, in order to maintain consistency between the encoding end and the decoding end, mode information required for prediction of the current block needs to be signalled into the bitstream at the encoding end, which would occupy a large amount of coding resources and increase the coding cost.

SUMMARY

In a first aspect, a prediction method is provided in the disclosure. The method is applied to a decoder and includes the following. A bitstream is decoded to determine K initial prediction modes, where K is an integer greater than 1. A weight derivation mode for a current block is determined according to the K initial prediction modes. A prediction value of the current block is determined according to the weight derivation mode for the current block.

In a second aspect, a prediction method is provided in the disclosure. The method is applied to an encoder and includes the following. K initial prediction modes are determined, where K is an integer greater than 1. A weight derivation mode for a current block is determined according to the K initial prediction modes. A prediction value of the current block is determined according to the weight derivation mode for the current block.

DETAILED DESCRIPTION

The disclosure can be applied to the field of picture coding, video coding, hardware video coding, dedicated circuit video coding, real-time video coding, etc. For example, the solution in the disclosure may be incorporated into audio video coding standards (AVS), such as H.264/audio video coding (AVC) standard, H.265/high efficiency video coding (HEVC) standard, and H.266/versatile video coding (VVC) standard. Alternatively, the solution in the disclosure may be incorporated into other proprietary or industry standards, including ITU-TH.261, ISO/IECMPEG-1 Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It should be understood that the techniques in the disclosure are not limited to any particular coding standard or technology.

Figure 1:
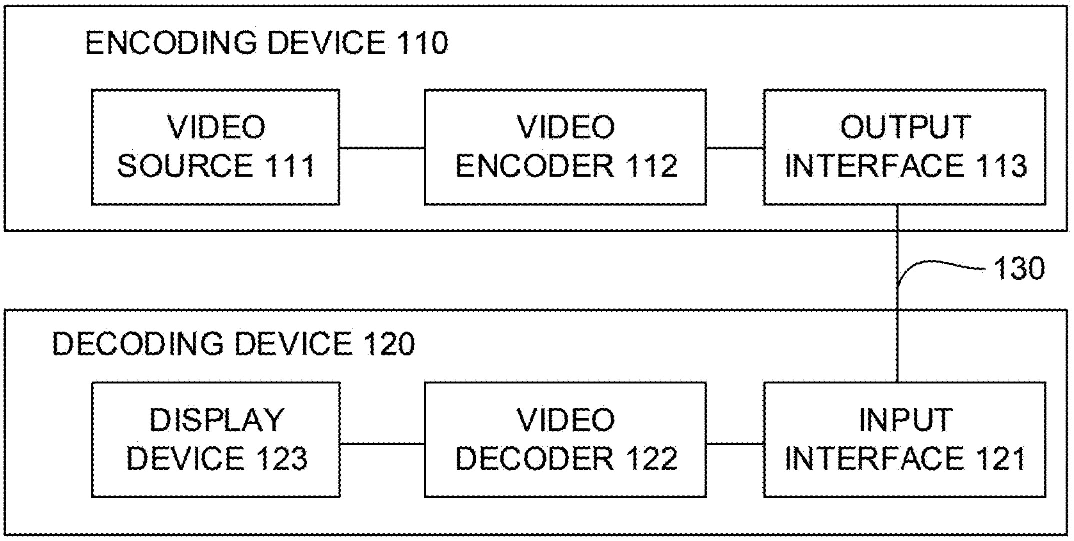
FIG. 1 is a schematic block diagram of a video coding system according to embodiments of the disclosure.

For ease of understanding, a video coding system in embodiments of the disclosure is firstly introduced with reference to FIG. 1.

FIG. 1 is a schematic block diagram of a video coding system 100 according to embodiments of the disclosure. It should be noted that FIG. 1 is only an example, and the video coding system in embodiments of the disclosure includes but is not limited to that illustrated in FIG. 1. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain decoded video data.

The encoding device 110 in the embodiments of the disclosure can be understood as a device having a video encoding function, and the decoding device 120 can be understood as a device having a video decoding function, that is, the encoding device 110 and the decoding device 120 in the embodiments of the disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding device 110 may transmit encoded video data (such as bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, digital versatile discs (DVDs), flash memory, and the like. In this example, the decoding device 120 may obtain the encoded video data from the storage medium.

In another example, the channel 130 may include a storage server that may store video data encoded by the encoding device 110. In this example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the input interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated together with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the disclosure are not limited to FIG. 1. For example, the technology of the disclosure may also be applied to one-sided video encoding or one-sided video decoding.

In the following, a video encoding framework in embodiments of the disclosure will be introduced.

Figure 2:
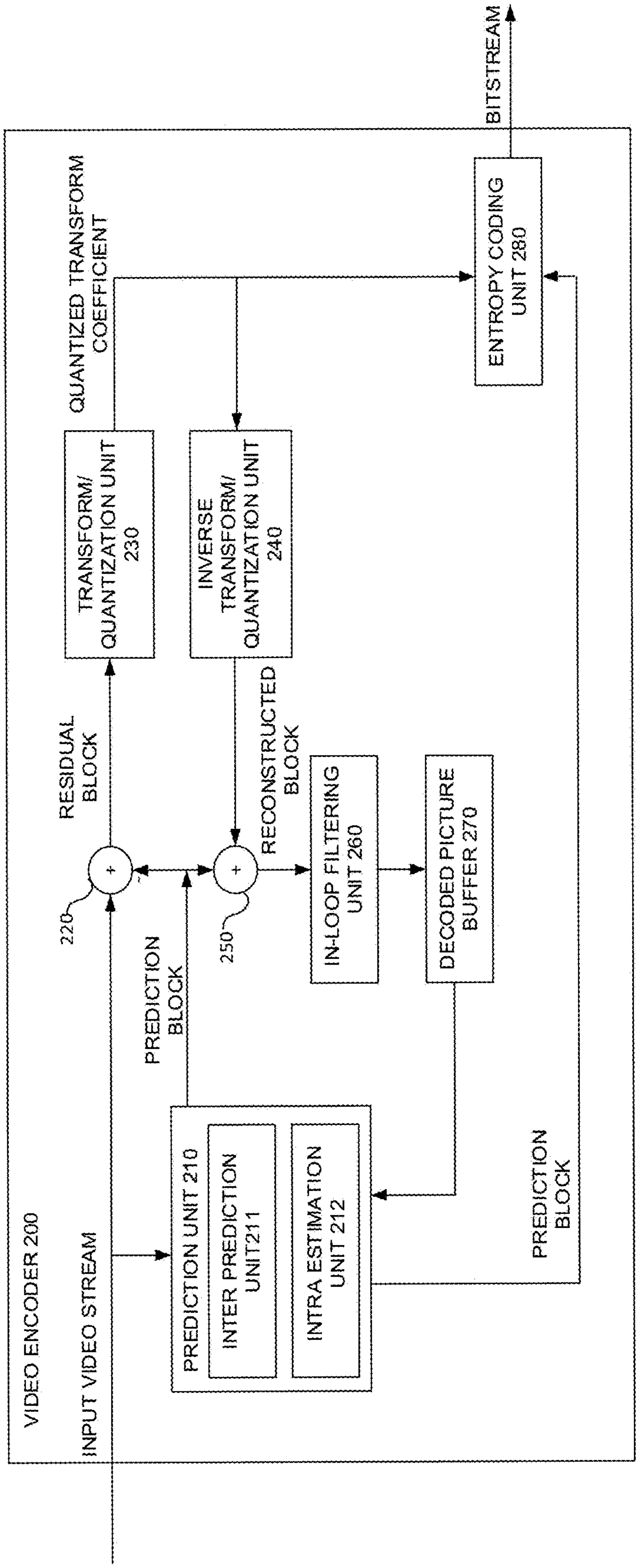
FIG. 2 is a schematic block diagram of a video encoder according to embodiments of the disclosure.

FIG. 2 is a schematic block diagram of a video encoder 200 according to embodiments of the disclosure. It should be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y represents luminance (Luma), Cb (U) represents blue chrominance, and Cr (V) represents red chrominance. U and V represent chrominance (Chroma) for describing colour and saturation. For example, in terms of color format, 4:2:0 represents that every 4 pixels have 4 luma components and 2 chroma components (YYYYCbCr), 4:2:2 represents that every 4 pixels have 4 luma components and 4 chroma component (YYYYCbCrCbCr), and 4:4:4 represents full pixel display (YYYYCbCrCbCrCbCrCbCr).

For example, the video encoder 200 reads video data, and for each picture in the video data, partitions the picture into several coding tree units (CTU). In some examples, the CTU may be called "tree block", "largest coding unit" (LCU), or "coding tree block" (CTB). Each CTU may be associated with a pixel block of the same size as the CTU within the picture. Each pixel may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further partitioned into several coding units (CUs) for coding. The CU may be a rectangular block or a square block. The CU may be further partitioned into a prediction unit (PU) and a transform unit (TU), so that coding, prediction, and transformation are separated, which is more conducive to flexibility in processing. In an example, the CTU is partitioned into CUs in a quadtree manner, and the CU is partitioned into TUs and PUs in a quadtree manner.

The video encoder and video decoder can support various PU sizes. Assuming that a size of a specific CU is 2N×2N, the video encoder and video decoder may support PUs of 2N×2N or N×N for intra prediction, and support symmetric PUs of 2N×2N, 2N×N, N×2N, N×N, or similar size for inter prediction; and the video encoder and video decoder may also support asymmetric PUs of 2N×nU, 2N×nD, nL×2N, or nR×2N for inter prediction.

In some embodiments, as illustrated in FIG. 2, the video encoder 200 may include a prediction unit 210, a residual unit 220, a transform/quantization unit 230, an inverse transform/quantization unit 240, a reconstruction unit 250, an in-loop filtering unit 260, a decoded picture buffer 270, and an entropy coding unit 280. It should be noted that the video encoder 200 may include more, fewer, or different functional components.

Optionally, in the disclosure, a current block may be referred to as a current CU or a current PU. A prediction block may be referred to as a prediction picture block or a picture prediction block. A reconstructed picture block may be referred to as a reconstructed block or a picture reconstructed block.

In some embodiments, the prediction unit 210 includes an inter prediction unit 211 and an intra estimation unit 212. Since there is a strong correlation between neighbouring samples in a video picture, intra prediction is used in the video coding technology to eliminate spatial redundancy between neighbouring samples. Since there is a strong similarity between neighbouring pictures in video, inter prediction is used in the video coding technology to eliminate temporal redundancy between neighbouring pictures, thereby improving encoding efficiency.

The inter prediction unit 211 may be used for inter prediction. The inter prediction may include motion estimation and motion compensation. In inter prediction, reference can be made to picture information of different pictures. In inter prediction, motion information is used to find a reference block from a reference picture, and a prediction block is generated according to the reference block to eliminate temporal redundancy. A frame for which inter prediction is used may be a P frame and/or a B frame, where P frame refers to a forward prediction frame, and B frame refers to bidirectional prediction frame. In inter prediction, the motion information is used to find a reference block from a reference picture, and a prediction block is generated according to the reference block. The motion information includes a reference picture list containing the reference picture, a reference picture index, and a motion vector. The motion vector can be an integer-sample motion vector or a fractional-sample motion vector. If the motion vector is the fractional-sample motion vector, interpolation filtering on the reference picture is required to generate a required fractional-sample block. Here, an integer-sample block or fractional-sample block found in the reference picture according to the motion vector is called a reference block. In some technologies, the reference block may be called a prediction block, and in some technologies, the prediction block will be generated based on the reference block. Generating the prediction block based on the reference block may also be understood as taking the reference block as a prediction block and then processing to generate a new prediction block based on the prediction block.

The intra estimation unit 212 predicts sample information of the current picture block only with reference to information of the same picture, so as to eliminate spatial redundancy. A frame used for intra prediction may be an I frame.

There are multiple prediction modes for intra prediction. Taking the international digital video coding standard H series as an example, there are 8 angular prediction modes and 1 non-angular prediction mode in H.264/AVC standard, which are extended to 33 angular prediction modes and 2 non-angular prediction modes in H.265/HEVC. The intra prediction mode used in HEVC includes a planar mode, direct current (DC), and 33 angular modes, and there are 35 prediction modes in total. The intra prediction mode used in VVC includes planar, DC, and 65 angular modes, and there are 67 prediction modes in total.

It should be noted that with increase of the number of angular modes, intra prediction will be more accurate, which will be more in line with demand for development of high-definition and ultra-high-definition digital video.

The residual unit 220 may generate a residual block of the CU based on a sample block of the CU and a prediction block of a PU of the CU. For example, the residual unit 220 may generate the residual block of the CU such that each sample in the residual block has a value equal to a difference between a sample in the sample block of the CU and a corresponding sample in the prediction block of the PU of the CU.

The transform/quantization unit 230 may quantize a transform coefficient. The transform/quantization unit 230 may quantize a transform coefficient associated with a TU of a CU based on a quantization parameter (QP) value associated with the CU. The video encoder 200 may adjust the degree of quantization applied to a transform coefficient associated with the CU by adjusting the QP value associated with the CU.

The inverse transform/quantization unit 240 may perform inverse quantization and inverse transform respectively on the quantized transform coefficient, to reconstruct a residual block from the quantized transform coefficient.

The reconstruction unit 250 may add samples in the reconstructed residual block to corresponding samples in one or more prediction blocks generated by the prediction unit 210, to generate a reconstructed picture block associated with the TU. By reconstructing sample blocks of each TU of the CU in this way, the video encoder 200 can reconstruct the sample block of the CU. The in-loop filtering unit 260 is configured to process an inverse-transformed and inverse-quantized sample, compensate distorted information, and provide a better reference for subsequent sample encoding. For example, the in-loop filtering unit 260 may perform deblocking filtering operations to reduce blocking artifacts of the sample block associated with the CU.

In some embodiments, the in-loop filtering unit 260 includes a deblocking filtering unit and a sample adaptive offset/adaptive loop filtering (SAO/ALF) unit, where the deblocking filtering unit is configured for deblocking, and the SAO/ALF unit is configured to remove a ringing effect.

The decoded picture buffer 270 may store reconstructed sample blocks. The inter prediction unit 211 may use reference pictures including reconstructed sample blocks to perform inter prediction on PUs of other pictures. In addition, the intra estimation unit 212 may use the reconstructed sample blocks in the decoded picture buffer 270 to perform intra prediction on other PUs in the same picture as the CU.

The entropy coding unit 280 may receive the quantized transform coefficient from the transform/quantization unit 230. The entropy coding unit 280 may perform one or more entropy coding operations on the quantized transform coefficient to generate entropy coded data.

Figure 3:
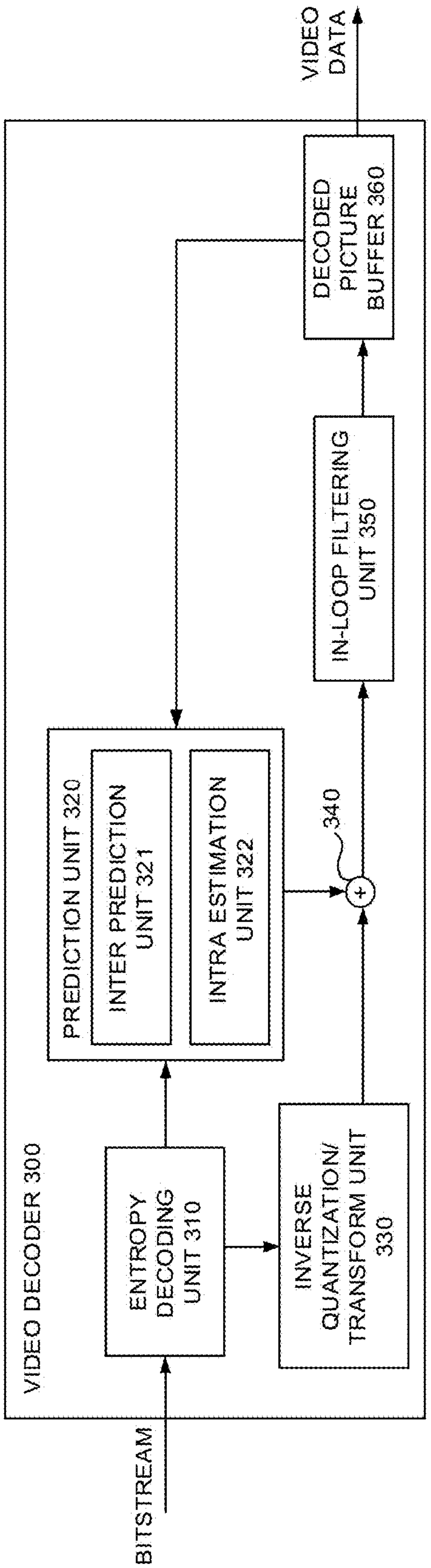
FIG. 3 is a schematic block diagram of a video decoder according to embodiments of the disclosure.

FIG. 3 is a schematic block diagram of a video decoder according to embodiments of the disclosure.

As illustrated in FIG. 3, the video decoder 300 includes an entropy decoding unit 310, a prediction unit 320, an inverse quantization/transform unit 330, a reconstruction unit 340, an in-loop filtering unit 350, and a decoded picture buffer 360. It should be noted that the video decoder 300 may include more, fewer, or different functional components.

The video decoder 300 may receive a bitstream. The entropy decoding unit 310 may parse the bitstream to extract syntax elements from the bitstream. As part of parsing the bitstream, the entropy decoding unit 310 may parse entropy-coded syntax elements in the bitstream. The prediction unit 320, the inverse quantization/transform unit 330, the reconstruction unit 340, and the in-loop filtering unit 350 may decode video data according to the syntax elements extracted from the bitstream, that is, generate decoded video data.

In some embodiments, the prediction unit 320 includes an inter prediction unit 321 and an intra estimation unit 322.

The intra estimation unit 322 may perform intra prediction to generate a prediction block of a PU. The intra estimation unit 322 may use an intra-prediction mode to generate a prediction block of the PU based on a sample block of spatially neighbouring PUs. The intra estimation unit 322 may also determine an intra prediction mode of the PU from one or more syntax elements parsed from the bitstream.

The inter prediction unit 321 can construct a first reference picture list (list 0) and a second reference picture list (list 1) according to the syntax elements parsed from the bitstream. In addition, the entropy decoding unit 310 may parse motion information of the PU if the PU is encoded using inter prediction. The inter prediction unit 321 may determine one or more reference blocks of the PU according to the motion information of the PU. The inter prediction unit 321 may generate a prediction block of the PU based on one or more reference blocks of the PU.

The inverse quantization/transform unit 330 may perform inverse quantization on (that is, dequantize) a transform coefficient associated with a TU. The inverse quantization/transform unit 330 may use a QP value associated with a CU of the TU to determine the degree of quantization.

After inverse quantization of the transform coefficient, the inverse quantization/transform unit 330 may perform one or more inverse transformations on the inverse-quantized transform coefficient in order to generate a residual block associated with the TU.

The reconstruction unit 340 uses the residual block associated with the TU of the CU and the prediction block of the PU of the CU to reconstruct a sample block of the CU. For example, the reconstruction unit 340 may add samples in the residual block to corresponding samples in the prediction block to reconstruct the sample block of the CU to obtain the reconstructed picture block.

The in-loop filtering unit 350 may perform deblocking filtering to reduce blocking artifacts of the sample block associated with the CU.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for display.

A basic process of video coding is as follows. At an encoding end, a picture is partitioned into blocks, and for a current block, the prediction unit 210 performs intra prediction or inter prediction to generate a prediction block of the current block. The residual unit 220 may calculate a residual block based on the prediction block and an original block of the current block, that is, a difference between the prediction block and the original block of the current block, where the residual block may also be referred to as residual information. The residual block can be transformed and quantized by the transform/quantization unit 230 to remove information that is not sensitive to human eyes, so as to eliminate visual redundancy. Optionally, the residual block before being transformed and quantized by the transform/quantization unit 230 may be called a time-domain residual block, and the time-domain residual block after being transformed and quantized by the transform/quantization unit 230 may be called a frequency residual block or a frequency-domain residual block. The entropy coding unit 280 receives the quantized transformation coefficient output by the transform/quantization unit 230, and may perform entropy coding on the quantized transformation coefficient to output a bitstream. For example, the entropy coding unit 280 can eliminate character redundancy according to a target context model and probability information of a binary bitstream.

At a decoding end, the entropy decoding unit 310 may parse the bitstream to obtain prediction information, a quantization coefficient matrix, etc. of the current block, and the prediction unit 320 performs intra prediction or inter prediction on the current block based on the prediction information to generate a prediction block of the current block. The inverse quantization/transform unit 330 uses the quantization coefficient matrix obtained from the bitstream to perform inverse quantization and inverse transformation on the quantization coefficient matrix to obtain a residual block. The reconstruction unit 340 adds the prediction block and the residual block to obtain a reconstructed block. The reconstructed blocks form a reconstructed picture. The in-loop filtering unit 350 performs in-loop filtering on the reconstructed picture on a picture basis or on a block basis to obtain a decoded picture. Similar operations are also required at the encoding end for obtaining the decoded picture. The decoded picture may also be referred to as a reconstructed picture, and the reconstructed picture may be a reference picture of a subsequent picture for inter prediction.

It should be noted that block partition information as well as mode information or parameter information for prediction, transformation, quantization, entropy coding, and in-loop filtering, etc. determined at the encoding end is carried in the bitstream when necessary. At the decoding end, the bitstream parsed and existing information is analyzed to determine the block partition information as well as the mode information or the parameter information for prediction, transformation, quantization, entropy coding, in-loop filtering, etc. that is the same as such information at the encoding end, so as to ensure the decoded picture obtained at the encoding end is the same as the decoded picture obtained at the decoding end.

The above is the basic process of video coding under a block-based hybrid coding framework. With development of technology, some modules or steps of the framework or process may be optimized. The disclosure is applicable to the basic process of the video coder under the block-based hybrid coding framework, but is not limited to the framework and process.

In some embodiments, the current block may be a current CU or a current PU, etc. Due to requirements of parallel processing, a picture may be partitioned into slices, etc. Slices in the same picture may be processed in parallel, that is, there is no data dependency between the slices. The term "frame" is a common expression. It can be generally understood that a frame is a picture. In the disclosure, the frame may also be replaced with a picture or a slice, etc.

In the video coding standard VVC currently under development, there is an inter prediction mode called geometric partitioning mode (GPM). In the video coding standard AVS currently under development, there is an inter prediction mode called angular weighted prediction (AWP) mode. Although these two modes have different names and implementation details, they share common principles.

It should be noted that in traditional unidirectional prediction, only one reference block with the same size as the current block is searched for, while in traditional bidirectional prediction, two reference blocks with the same size as the current block are used, where a sample value of each sample in a prediction block is an average of samples at corresponding positions in the two reference blocks, that is, all samples in each reference block account for 50%. Bidirectional weighted prediction allows proportions of the two reference blocks to be different, such as 75% for all samples in a $1^{st}$ reference block and 25% for all samples in a $2^{nd}$ reference block, but proportions of all samples in the same reference block are the same. Other optimization methods, such as decoder-side motion vector refinement (DMVR) technology, bi-directional optical flow (BIO), etc., may cause some changes in reference samples or prediction samples. In addition, in GPM or AWP, two reference blocks with the same size as the current block are also used. However, in some sample positions, 100% of sample values at corresponding positions in the $1^{st}$ reference block are used; in some sample positions, 100% of sample values at corresponding positions in the $2^{nd}$ reference block are used; and in a boundary area, sample values at corresponding positions in these two reference blocks are used according to a certain proportion (weight). The allocation of these weights is determined according to the prediction mode of GPM or AWP. Alternatively, it may be considered that in GPM or AWP, two reference blocks with different sizes from the current block are used, that is, a required part of each reference block is taken as a reference block, in other words, a part with non-zero weights is taken as the reference block, and a part with zero weights is removed.

Figure 4:
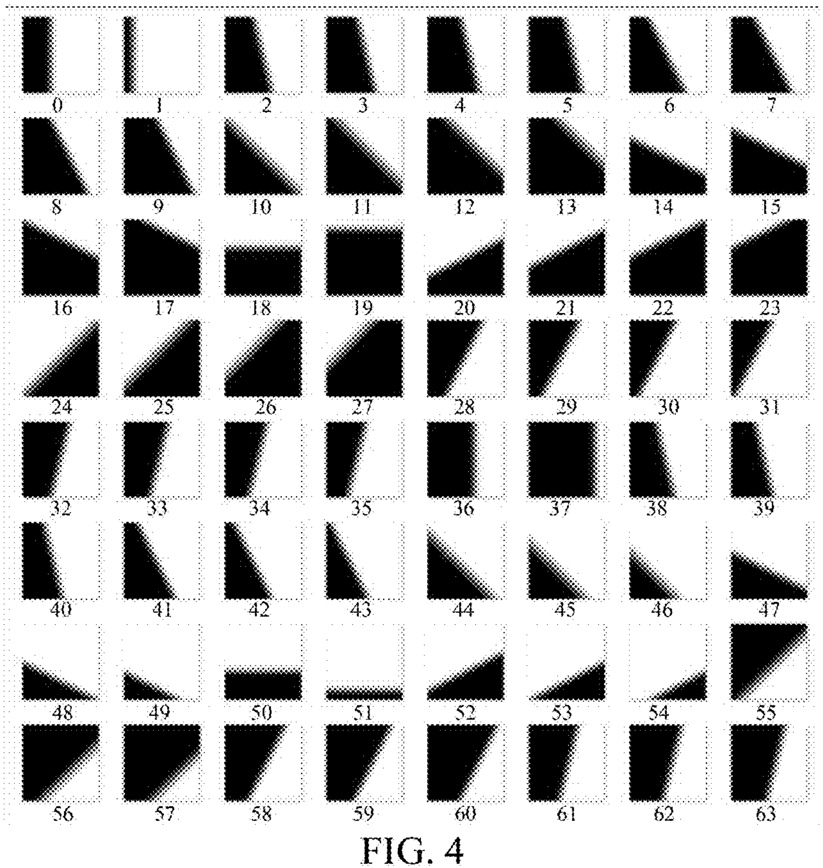
FIG. 4 is a schematic diagram illustrating weight allocation.
Figure 5:
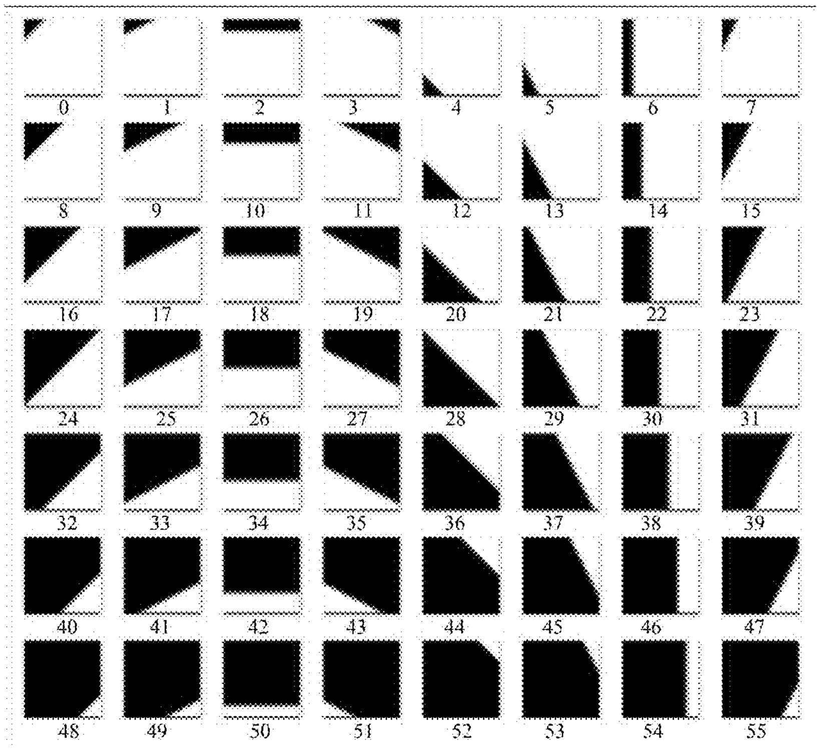
FIG. 5 is a schematic diagram illustrating weight allocation.

Exemplarily, FIG. 4 is a schematic diagram illustrating weight allocation. FIG. 4 is a schematic diagram illustrating weight allocation for multiple partitioning modes of GPM on a 64×64 current block provided in embodiments of the disclosure, where GPM has 64 partition modes. FIG. 5 is a schematic diagram illustrating weight allocation. FIG. 5 illustrates a schematic diagram of weight allocation for multiple partitioning modes of AWP on a 64×64 current block provided in embodiments of the disclosure, where AWP has 56 partitioning modes. In each of FIG. 4 and FIG. 5, for each partitioning mode, a black area represents a weight of 0% for corresponding positions in the 1st reference block, while a white area represents a weight of 100% for corresponding positions in the 1st reference block, a grey area represents a weight greater than 0% and less than 100%, represented by a colour depth, for corresponding positions in the $1^{st}$ reference block, and a weight for a corresponding position in the $2^{nd}$ reference block is 100% minus a weight for a corresponding position in the 1st reference block.

GPM and AWP differ in method for weight derivation. For GPM, an angle and an offset are determined according to each mode, and then a weight matrix for each mode is calculated. For AWP, a one-dimensional weight line is firstly defined, and then a method similar to intra angular prediction is used to fill an entire matrix with the one-dimensional weight line.

It should be noted that in earlier coding technologies, only rectangular partitioning was available, no matter whether it is for CU partitioning, PU partitioning, or TU partitioning. However, with GPM or AWP, the effect of non-rectangular partitioning for prediction is achieved without partitioning. In GPM and AWP, a weight mask is used for two reference blocks, namely the weight map as described above. From the mask, weights of the two reference blocks for generating the prediction block are determined. It may be simply understood as that some positions in the prediction block come from the $1^{st}$ reference block and some positions come from the $2^{nd}$ reference block, and a blending area is obtained by weighting corresponding positions in the two reference blocks, which allows a smoother transition. In GPM and AWP, the current block are not partitioned into two CUs or PUs according to a partition line. Therefore, after prediction, the current block is processed as a whole during transformation, quantization, inverse transformation, and inverse quantization of residuals.

In GPM, a weight matrix is used to simulate geometric shape partitioning, or more precisely, simulate partitioning of prediction. To implement GPM, in addition to the weight matrix, two prediction values are also needed, each determined by one unidirectional motion information. These two unidirectional motion information come from a motion information candidate list, such as a merge motion information candidate list (mergeCandList). In GPM, two indices are used in a bitstream to determine the two unidirectional motion information from mergeCandList.

In inter prediction, motion information is used to represent "motion". Basic motion information includes reference frame (or called reference picture) information and motion vector (MV) information. In common bidirectional prediction, a current block is predicted by using two reference blocks. The two reference blocks may be a forward reference block and a backward reference block. Optionally, the two reference blocks are allowed to be both forward or both backward. Forward means that a moment corresponding to the reference picture is before a current picture, and backward means that the moment corresponding to the reference picture is after the current picture. In other words, forward means that a position of the reference picture in a video is before the current picture, and backward means that the position of the reference picture in the video is after the current picture. In other words, forward means that a picture order count (POC) of the reference picture is less than a POC of the current picture, and backward means that the POC of the reference picture is greater than the POC of the current picture. In order to use bidirectional prediction, it is necessary to find two reference blocks, and accordingly, two groups of reference picture information and motion vector information are needed. Each of the two groups may be understood as one unidirectional motion information, and one bidirectional motion information may be obtained by combining the two groups. During implementation, the unidirectional motion information and the bidirectional motion information may use the same data structure, but the two groups of reference picture information and motion vector information in the bidirectional motion information are both valid, while one of the two groups of reference picture information and motion vector information in the unidirectional motion information is invalid.

In some embodiments, two reference picture lists are supported, and are denoted as RPL0, RPL1, where RPL is an abbreviation for reference picture list. In some embodiments, only RPL0 can be used for P slice can, and both RPL0 and RPL1 can be used for B slice. For a slice, each reference picture list has several reference pictures, and a coder finds a certain reference picture according to a reference picture index. In some embodiments, the motion information is represented by a reference picture index and a motion vector. For example, for the bidirectional motion information described above, a reference picture index refIdxL0 corresponding to RPL0, a motion vector mvL0 corresponding to RPL0, a reference picture index refIdxL1 corresponding to RPL1, and a motion vector mvL1 corresponding to RPL1 are used. Here, the reference picture index corresponding to RPL0 and the reference picture index corresponding to RPL1 may be understood as the reference picture information described above. In some embodiments, two flag bits are used to indicate whether to use motion information corresponding to RPL0 and whether to use motion information corresponding to RPL1 respectively, and are denoted as predFlagL0 and predFlagL1 respectively, which may also mean that predFlagL0 and predFlagL1 indicate whether the unidirectional motion information is "valid". Although such data structure of the motion information is not explicitly indicated, the motion information is indicated by using a reference picture index, a motion vector, and a flag bit indicating validity corresponding to each RPL. In some standard texts, the term "motion vector" is used rather than "motion information", and it may also be considered that the reference picture index and the flag indicating whether to use corresponding motion information are associated with the motion vector. In the disclosure, "motion information" is still used for the convenience of illustration, but it should be understood that "motion vector" may also be used for illustration.

Motion information used for the current block may be stored, and motion information of previously coded blocks such as neighbouring blocks may be used for subsequent coding blocks of the current picture based on a positional relationship. This utilizes spatial correlation, so this kind of coded motion information is called spatial motion information. Motion information used for each block of the current picture may be stored, and motion information of previously coded picture may be used for subsequent coding pictures based on a reference relationship. This utilizes temporal correlation, so this kind of motion information of coded picture is called temporal motion information. The motion information used for each block in the current picture is usually stored in the following manner: a fixed-size matrix such as a 4×4 matrix is usually taken as a minimum unit, and each minimum unit stores a set of motion information separately. In this way, when coding each block, a minimum unit(s) corresponding to a position of the block may store motion information of the block. As such, when spatial motion information or temporal motion information is used, motion information corresponding to a position may be directly found according to the position. For example, if traditional unidirectional prediction is used for a 16×16 block, all 4×4 minimum units corresponding to the block will store motion information of this unidirectional prediction. If GPM or AWP is used for a block, all minimum units corresponding to the block will store motion information determined according to the mode of GPM or AWP, $1^{st}$ motion information, $2^{nd}$ motion information, and a position of each minimum unit. In one manner, if all 4×4 samples corresponding to a minimum unit come from the $1^{st}$ motion information, the minimum unit stores the $1^{st}$ motion information. If all 4×4 samples corresponding to a minimum unit come from the $2^{nd}$ motion information, the minimum unit stores the $2^{nd}$ motion information. If all 4×4 samples corresponding to a minimum unit come from both the $1^{st}$ motion information and the $2^{nd}$ motion information, in AWP, one of the $1^{st}$ motion information and the $2^{nd}$ motion information will be chosen and stored; and in GPM, two motion information will be combined as bidirectional motion information for storage if the two motion information correspond to different RPLs, and otherwise, only the 2nd motion information will be stored.

Figure 6A:
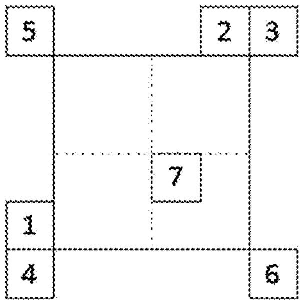
FIG. 6A is a schematic diagram illustrating inter prediction.

Optionally, the aforementioned mergeCandList is constructed based on spatial motion information, temporal motion information, history-based motion information, and some other motion information. Exemplarily, for the mergeCandList, positions 1 to 5 in FIG. 6A are used to derive the spatial motion information, and position 6 or 7 in FIG. 6A is used to derive the temporal motion information. For the history-based motion information, motion information of each block is added to a first-in-first-out list when coding the block, and the addition process may require some checks, such as whether the motion information duplicates existing motion information in the list. In this way, reference may be made the motion information in the history-based list when coding the current block.

In some embodiments, the syntax description for GPM is that as illustrated in Table 1.

TABLE 1

| | |
|---|---|
| regular_merge_flag[x0][y0] | ae(v) |
| if( regular_merge_flag[x0][y0] == 1 ) { | |
| if( sps_mmvd_enabled_flag ) | |
| mmvd_merge_flag[x0][y0] | ae(v) |
| if( mmvd_merge_flag[x0][y0] == 1 ) { | |
| if( MaxNumMergeCand > 1 ) | |
| mmvd_cand_flag[x0][y0] | ae(v) |
| mmvd_distance_idx[x0][y0] | ae(v) |
| mmvd_direction_idx[x0][y0] | ae(v) |
| } else if( MaxNumMergeCand > 1 ) | |
| merge_idx[x0][y0] | ae(v) |
| } else { | |

TABLE 1-continued

```
    if( sps_ciip_enabled_flag && sps_gpm_enabled_flag &&
      sh_slice_type == B &&
      cu_skip_flag[x0][y0] == 0 && cbWidth >= 8 && cbHeight >=
8 &&
      cbWidth < (8*cbHeight) && cbHeight < (8*cbWidth) &&
      cbWidth < 128 && cbHeight < 128 )
      ciip_flag[x0][y0]                                    ae(v)
    if( ciip_flag[x0][y0] && MaxNumMergeCand > 1 )
      merge_idx[x0][y0]                                    ae(v)
    if( !ciip_flag[x0][y0] ) {
      merge_gpm_partition_idx[x0][y0]                      ae(v)
      merge_gpm_idx0[x0][y0]                               ae(v)
      if( MaxNumGpmMergeCand > 2 )
        merge_gpm_idx1[x0][y0]                             ae(v)
    }
  }
```

As illustrated in Table 1, in a merge mode, if regular merge flag is not equal to 1, either combined inter-intra prediction (CIIP) or GPM may be used for the current block. If CIIP is not used for the current block, then GPM will be used, as indicated by the syntax "if (!ciip_flag[x0][y0])" in Table 1.

As illustrated in the above Table 1, in GPM, transmission of three information in a bitstream, namely merge_gpm_partition_idx, merge_gpm_idx0, and merge_gpm_idx1, is required. x0 and y0 are used to determine coordinates (x0, y0) of a top-left luma sample of the current block relative to a top-left luma sample of the picture. merge_gpm_partition_idx is used to determine a partitioning shape of GPM, which is a "simulated partitioning" as described above. merge_gpm_partition_idx represents a weight derivation mode or an index of the weight derivation mode in embodiments of the disclosure. merge_gpm_idx0 represents an index of the $1^{st}$ motion information in the candidate list, and merge_gpm_idx1 represents an index of the $2^{nd}$ motion information in the candidate list. merge_gpm_idx1 needs to be transmitted only when a length of the candidate list (MaxNumGpmMergeCand) is greater than 2; otherwise, merge_gpm_idx1 may be determined directly.

In some embodiments, a decoding process of GPM includes the following steps.

Information input for the decoding process includes: coordinates (xCb, yCb) of a top-left luma location of the current block relative to a top-left luma location of the picture, a width (cbWidth) of a current luma component, a height (cbHeight) of a current luma component, luma motion vectors mvA and mvB in 1/16 fractional-sample accuracy, chroma motion vectors mvCA and mvCB, reference picture indices refIdxA and refIdxB, and prediction list flags predListFlagA and predListFlagB.

Exemplarily, the motion information may be represented by a combination of motion vectors, reference picture indices, and prediction list flags. In some embodiments, two reference picture lists are supported, each of which may have multiple reference pictures. In unidirectional prediction, only one reference block in one reference picture in one reference picture list is used for reference, while in bidirectional prediction, two reference blocks each in one reference picture in one of the two reference picture lists are used for reference. In GPM, two unidirectional predictions are used. In mvA and mvB, mvCA and mvCB, refIdxA and refIdxB, predListFlagA and predListFlagB, "A" may be understood as a first prediction mode, and "B" may be understood as a second prediction mode. Optionally, "X" is used to represent "A" or "B", so that predListFlagX indicates whether a 1st reference picture list or a 2nd reference picture list is used for X, refIdxX indicates a reference picture index in the reference picture list used for X, mvX indicates a luma motion vector used for X, and mvCX indicates a chroma motion vector used for X. It should be noted that, the motion information described in the disclosure may be considered as represented by a combination of motion vectors, reference picture indices, and prediction list flags.

Information output for the decoding process includes: an (cbWidth)×(cbHeight) array predSamplesL of luma prediction samples; an (cbWidth/SubWidthC)×(cbHeight/SubHeightC) array of chroma prediction samples for the component Cb, if necessary; and an (cbWidth/SubWidthC)×(cbHeight/SubHeightC) array of chroma prediction samples for the component Cr, if necessary.

Exemplarily, the luma component is taken as an example. The processing of the chroma component is similar to that of the luma component.

Let each of predSamplesLAL and predSamplesLBL have a size of (cbWidth)×(cbHeight), which are prediction sample arrays obtained based on two prediction modes. predSamplesL is derived as follows. predSamplesLAL and predSamplesLBL are determined separately according to the luma motion vectors mvA and mvB, chroma motion vectors mvCA and mvCB, reference picture indices refIdxA and refIdxB, and prediction list flags predListFlagA and predListFlagB. In other words, prediction is performed according to motion information of the two prediction modes, and the detailed process thereof is not described herein. Generally, GPM is a merge mode, so that both the two prediction modes of GPM may be considered as merge modes.

According to merge_gpm_partition_idx[xCb][yCb], a "partition" angle index variable angleIdx and a distance index variable distanceIdx of GPM are determined based on Table 2.

TABLE 2

Correspondence among angleIdx, distanceIdx, and merge_gpm_partition_idx

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |

TABLE 2-continued

Correspondence among angleIdx, distanceIdx, and merge_gpm_partition_idx

| | | | | | | | | | | | | | | | | |
|---|---|---|---|---|---|---|---|---|---|---|---|---|---|---|---|---|
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

It should be noted that, GPM may be used for each of the three components (Y, Cb, Cr). Therefore, the process of generating a GPM prediction sample array for a component is encapsulated in a sub-process called "weighted sample prediction process for GPM". This sub-process is invoked for all the three components, with different parameters for each component. Here, the luma component is taken as an example. A prediction array for a current luma block, predSamplesL [xL][yL] (where xL=0 . . . cbWidth−1, yL=0 . . . cbHeight−1), is derived from the weighted sample prediction process for GPM. nCbW is set to cbWidth, and nCbH is set to cbHeight. The prediction sample arrays predSamplesLAL and predSamplesLBL generated using the two prediction modes, as well as angleIdx and distanceIdx, are used as inputs.

In some embodiments, the weighted sample prediction and derivation process for GPM includes the following steps.

Inputs to this process are: a width nCbW of the current block, a height nCbH of the current block, two (nCbW)×(nCbH) prediction sample arrays predSamplesLA and predSamplesLB, a "partition" angle index variable angleIdx of GPM, a distance index variable distanceIdx of GPM, and a colour component index variable cIdx. Here, a luma component is taken as an example, so that cIdx=0, which indicates the luma component.

Output of this process is the (nCbW)×(nCbH) array pbSamples of prediction sample values of GPM.

Exemplarily, variables nW, nH, shift1, offset1, displacementX, displacementY, partFlip, and shiftHor are derived as follows:

$$nW = (\ cIdx == 0\ )?\ nCbW\ :\ nCbW * SubWidthC;$$

$$nH = (\ cIdx == 0\ )?\ nCbH\ :\ nCbH * SubHeightC;$$

$$shift1 = \mathrm{Max}(\ 5,\ 17 - \mathrm{BitDepth}\ ),$$

where BitDepth represents a coding bit depth;

$$offset1 = 1 \ll (\ \mathrm{shift1} - 1\ ),$$ where "≪" represents shift left;

$$displacementX = angleIdx;$$

$$displacementY = (\ angleIdx + 8\ )\ \%\ 32;$$

$$partFlip = (\ angleIdx >= 13\ \&\&\ angleIdx <= 27\ )\ ?\ 0 : 1;$$

$$shiftHor = (\ angleIdx\ \%\ 16 == 8\ \|\ (\ angleIdx\ \%\ 16\ != 0\ \&\&\ nH >= nW\ ))?0 : 1.$$

Variables offsetX and offsetY are derived as follows:

$$\text{If } shiftHor = 0 : offsetX = (\ -nW\ ) \gg 1,\ offsetY = ((\ -nH\ ) \gg 1\ ) + (\ angleIdX < 16?\ (\ distanceIdx * nH\ ) \gg 3 : -((\ distanceIdx * nH\ ) \gg 3\ ))$$

$$\text{If } shiftHor = 1 : offsetX = ((\ -nW\ ) \gg 1\ ) + (\ angleIdx < 16\ ?\ (\ distanceIdx * nH\ ) \gg 3 : -((\ distanceIdx * nW\ ) \gg 3)),\ offsetY = (\ -nH\ ) \gg 1.$$

Variables xL and yL are derived as follows:

$$xL = (\ cIdx\ ==\ 0\ )\ ?\ x : x * SubWidthC;$$

$$yL = (\ cIdx\ ==\ 0\ )\ ?\ y : y * SubHeightC.$$

Variable wValue specifying a weight of a prediction sample at a current position is derived as follows, where wValue is a weight of a predicted sample predSamplesLA [x][y] at (x, y) in a prediction array for the first prediction mode, and (8−wValue) is a weight of a predicted sample predSamplesLB[x][y] at (x, y) in the prediction array for the first prediction mode.

The distance matrix disLut is determined according to Table 3.

TABLE 3

| | | | | | | | | | | | | |
|---|---|---|---|---|---|---|---|---|---|---|---|---|
| idx | 0 | 2 | 3 | 4 | 5 | 6 | 8 | 10 | 11 | 12 | 13 | 14 |
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

$$weightIdx = (((\ xL + offsetX\ ) \ll 1\ ) + 1\ ) * disLut[\ displacementX\ ] + (((\ yL + offsetY\ ) \ll 1\ ) + 1\ ) * disLut[\ displacementY\ ];$$

$$weightIdxL = partFlip\ ?\ 32 + weightIdx : 32 - weightIdx;$$

$$wValue = Clip3(\ 0,\ 8,\ (\ weightIdxL + 4\ ) \gg 3\ ).$$

The prediction sample values pbSamples[x][y] are derived as follows:

$$pbSamples[x][y] = \text{Clip3}(0, (1 << \text{BitDepth}) - 1, (predSamplesLA[x][y] * wValue + predSamplesLB[x][y] * (8 - wValue) + \text{offset1} >> \text{shift1}).$$

It should be noted that, for each position in the current block, a weight is derived and then a GPM prediction value pbSamples[x][y] is calculated. In this case, although the weights wValue do not have to be written in matrix form, it may be understood that if each wValue for each position is stored in a matrix, then a weight matrix is formed. The principle of calculating the GPM prediction value by separately calculating the weight for each sample and weighting, and the principle of calculating the GPM prediction sample array by calculating all the weights and then uniformly weighting, are the same. However, the expression of "weight matrix" in various elaborations in the disclosure is for the sake of better understanding, and drawings based on a weight matrix are more intuitive. In fact, elaborations can also be made based the weight of each position. For example, a weight matrix derivation mode may also be referred to as a weight derivation mode.

Figure 6B:
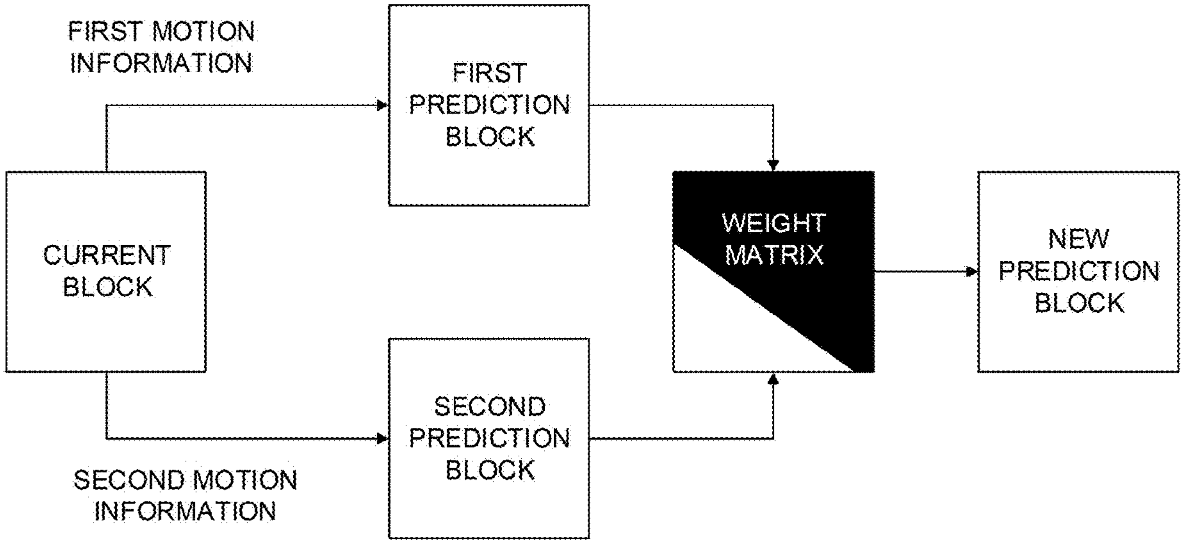
FIG. 6B is a schematic diagram illustrating weighted inter prediction.

In some embodiments, as illustrated in FIG. 6B, a GPM decoding process may be expressed as follows. A bitstream is parsed to determine whether a GPM technology is adopted for the current block. If the GPM technology is adopted for the current block, a weight derivation mode (or a "partitioning" mode or a weight matrix derivation mode), first motion information, and second motion information are determined. A first prediction block is determined according to the first motion information, a second prediction block is determined according to the second motion information, a weight matrix is determined according to the weight matrix derivation mode, and a prediction block of the current block is determined according to the first prediction block, the second prediction block, and the weight matrix.

It should be noted that in embodiments of the disclosure, GPM or AWP is a type of prediction technique. A flag indicating whether GPM or AWP is used needs to be transmitted in the bitstream, where the flag indicates whether GPM or AWP is used for the current block. If GPM or AWP is used, the encoder needs to transmit the specific mode used, that is, one of the 64 partitioning modes of GPM or one of the 56 partitioning modes of AWP, as well as index values of two unidirectional motion information, in the bitstream. That is, for the current block, the decoder may obtain information regarding whether GPM or AWP is used by parsing the bitstream. If it is determined that GPM or AWP is used, the decoder may parse to obtain prediction mode parameters of GPM or AWP and the index values of the two motion information. For example, if the current block is partitioned into two partitions, a first index value corresponding to a first partition and a second index value corresponding to a second partition may be obtained through parsing.

Specifically, for a GPM mode, if GPM is used, the prediction mode parameter of GPM will be transmitted in the bitstream, such as the specific partitioning mode of GPM. Generally, GPM includes 64 partitioning modes. For an AWP mode, if AWP is used, the prediction mode parameter of AWP will be transmitted in the bitstream, such as the specific partitioning mode of AWP. Generally, AWP includes 56 partitioning modes.

In an inter prediction mode such as GPM and AWP, two unidirectional motion information are required to search for two reference blocks. At present, this is implemented as follows. At an encoder side, a unidirectional motion information candidate list is constructed using relevant information of the coded part before the current block, unidirectional motion information is selected from the unidirectional motion information candidate list, and indices of these two unidirectional motion information in the unidirectional motion information candidate list are signalled into the bitstream. At a decoder side, the same method applies, that is, a unidirectional motion information candidate list is constructed using relevant information of the decoded part before the current block, and this unidirectional motion information candidate list must be identical to the one constructed at the encoder side. As such, the indices of the two unidirectional motion information are parsed out from the bitstream, and these two unidirectional motion information are found from the unidirectional motion information candidate list as the two unidirectional motion information required for the current block.

In other words, the unidirectional motion information described herein may include motion vector information, which is the value of (x, y), and corresponding reference picture information, which is a reference picture list and a reference picture index value in the reference picture list. In one manner, reference picture index values in two reference picture lists are recorded, where index values in one list are valid, such as 0, 1, 2, etc., and index values in the other list are invalid, i. e. −1. The reference picture list with valid reference picture index values is the reference picture list used for the motion information of the current block. A corresponding reference picture may be found in the reference picture list based on the reference picture index value. Each reference picture list has a corresponding motion vector, and a motion vector for a valid reference picture list is valid, while a motion vector for an invalid reference picture list is invalid. The decoder may use the reference picture information in the unidirectional motion information to find the required reference picture, and may find the reference block in the reference picture based on a position of the current block and the motion vector, that is, the value of (x, y), so as to determine an inter prediction value of the current block.

Figure 7A:
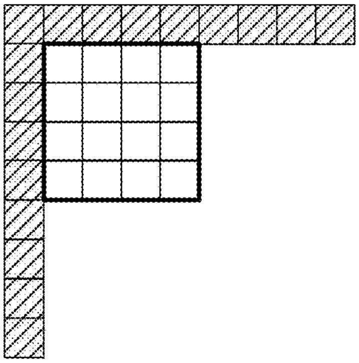
FIG. 7A is a schematic diagram illustrating intra prediction.

In intra prediction, reconstructed samples around the current block that have been coded are used as reference samples to predict the current block. FIG. 7A is a schematic diagram illustrating intra prediction. As illustrated in FIG. 7A, the current block is 4×4 in size, and samples on the left column and the above row of the current block are used as reference samples of the current block and are used for intra prediction of the current block. These reference samples may all be available, i. e. they have all been coded. Alternatively, some of the reference samples may not be available. For example, if the current block is on the leftmost of a picture, the reference samples on the left of the current block are not available. For another example, when coding the current block, the samples on the bottom left of the current block have not yet been coded, and in this case, reference samples on the bottom left are also not available. For the case where reference samples are not available, available reference samples, some values, or some methods may be used for filling, or no filling may be performed.

Figure 7B:
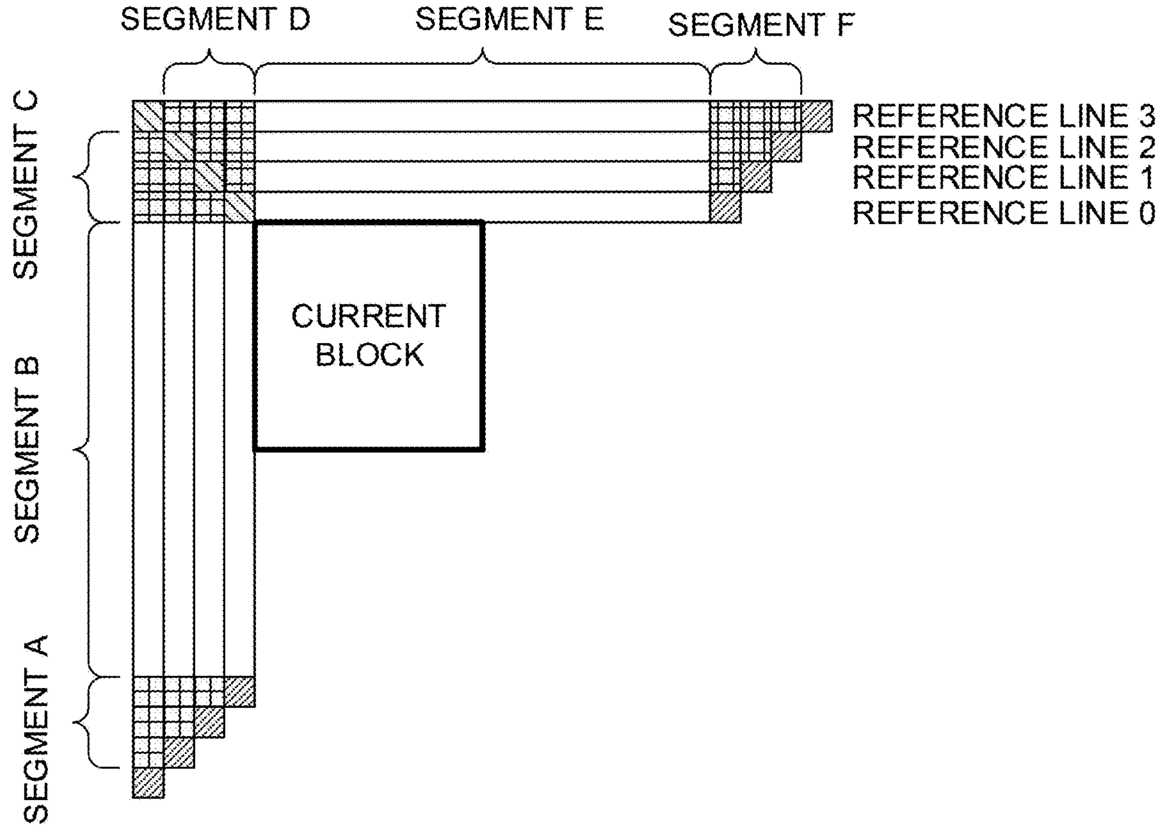
FIG. 7B is a schematic diagram illustrating intra prediction.
Figure 8A:
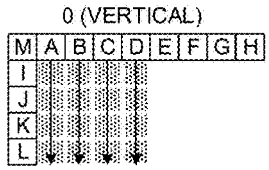
FIG. 8A to FIG. 8I each are a schematic diagram illustrating intra prediction.
Figure 8B:
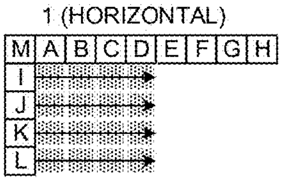
Figure 8C:
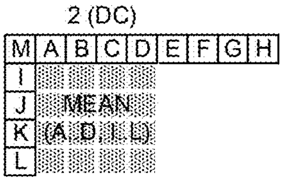
Figure 8D:
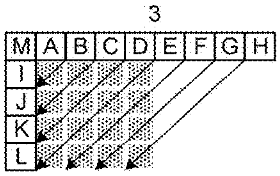
Figure 8E:
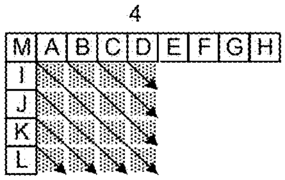
Figure 8F:
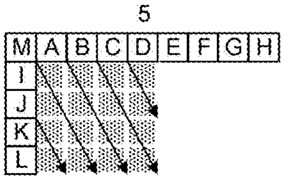
Figure 8G:
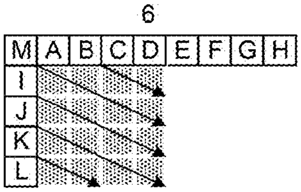
Figure 8H:
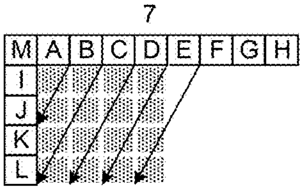
Figure 8I:
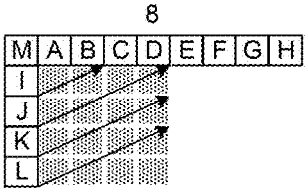

FIG. 7B is a schematic diagram illustrating intra prediction. As illustrated in FIG. 7B, with a multiple reference line (MRL) intra prediction method, more reference samples may be used to improve coding efficiency. For example, four reference rows/columns are used as the reference samples of the current block.

Further, there are multiple prediction modes for intra prediction. FIG. 8A~FIG. 8I each are a schematic diagram illustrating intra prediction. As illustrated in FIG. 8A~FIG. 8I, in H.264, there are nine modes for intra prediction of 4×4 blocks. In mode 0 illustrated in FIG. 8A, samples above the current block are copied to the current block vertically as prediction values. In mode 1 illustrated in FIG. 8B, reference samples on the left of the current block are copied to the current block horizontally as prediction values. In mode 2 (DC) illustrated in FIG. 8C, an average value of eight samples (A~D and I~L) is taken as the prediction value of all samples. In mode 3 to mode 8 illustrated in FIG. 8D~FIG. 8I, reference samples are copied to corresponding positions in the current block according to a certain angle, and since some positions in the current block may not correspond exactly to the reference sample, a weighted average of reference samples or interpolated factional samples of the reference samples may be required.

Figure 9:
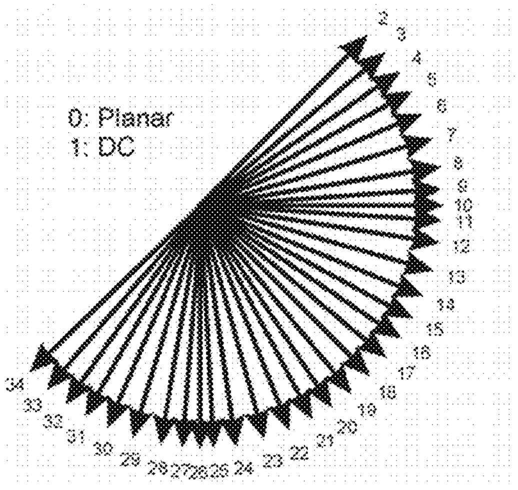
FIG. 9 is a schematic diagram illustrating intra prediction modes.
Figure 10:
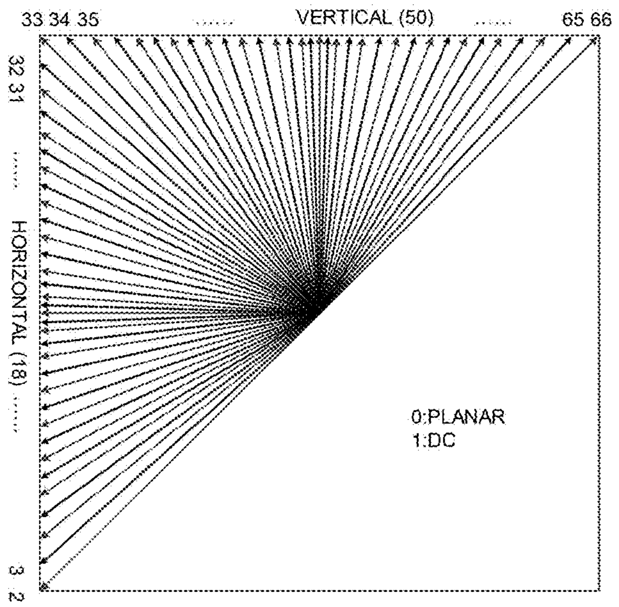
FIG. 10 is a schematic diagram illustrating intra prediction modes.
Figure 11:
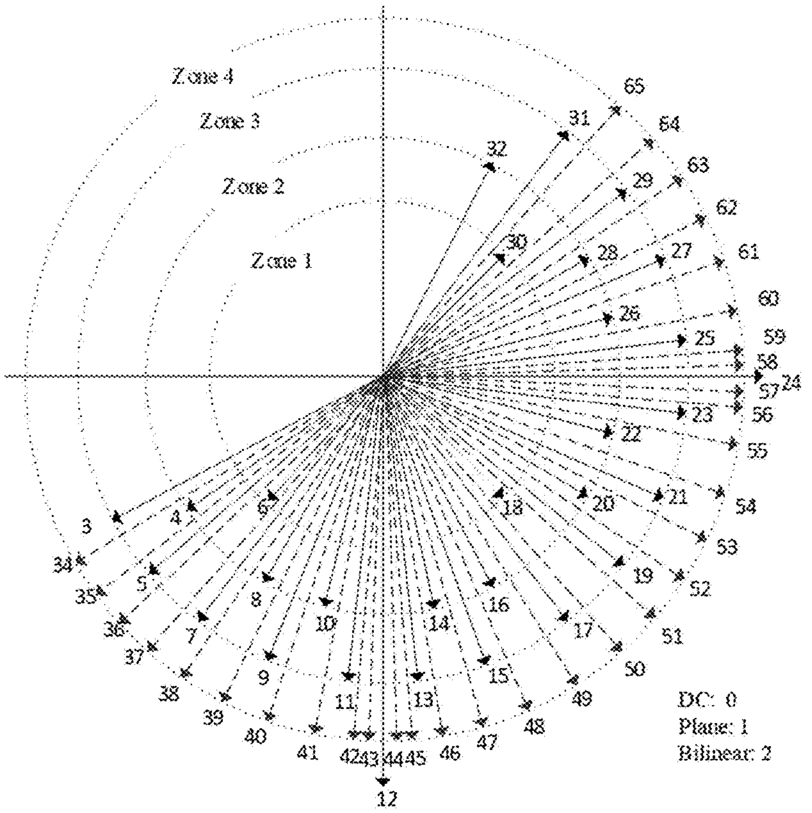
FIG. 11 is a schematic diagram illustrating intra prediction modes.

In addition, there are other modes such as the planar mode. With development of technology and increase in block size, there are an increasing number of angular prediction modes. FIG. 9 is a schematic diagram illustrating intra prediction modes. As illustrated in FIG. 9, in HEVC, a total of 35 prediction modes are used, including planar, DC, and 33 angular modes. FIG. 10 is a schematic diagram illustrating intra prediction modes. As illustrated in FIG. 10, in VVC, a total of 67 prediction modes are used, including planar, DC, and 65 angular modes. FIG. 11 is a schematic diagram illustrating intra prediction modes. As illustrated in FIG. 11, in AVS3, a total of 66 prediction modes are used, including DC, planar, bilinear, and 63 angular modes.

Furthermore, there are some techniques to improve the prediction, such as fractional sample interpolation which improves reference samples, filtering of prediction samples, etc. For example, in multiple intra prediction filter (MIPF) in AVS3, prediction values are generated by using different filters for different block sizes. For different positions of samples within the same block, a filter is used to generate prediction values for samples that are closer to the reference samples, while another filter is used to generate prediction values for samples that are away from the reference samples. With aid of technology for filtering prediction samples, such as intra prediction filter (IPF) in AVS3, the prediction values may be filtered based on the reference samples.

In intra prediction, an intra mode coding technology using a most probable mode (MPM) list may be used to improve coding efficiency. The mode list is constructed with intra prediction modes for surrounding coded blocks, intra prediction modes derived from the intra prediction modes for the surrounding coded blocks such as a neighbourhood mode, and some commonly-used or high-probability intra prediction modes such as DC, planar, and bilinear modes. Reference to the intra prediction modes for the surrounding coded blocks utilizes spatial correlation because textures have a certain spatial continuity. The MPM(s) may be used as a prediction for intra prediction modes. That is, it is assumed that the probability of using the MPM for the current block is higher than not using the MPM. Therefore, during binarization, fewer codewords will be assigned to the MPM to reduce overhead and improve coding efficiency.

In GPM, two inter-prediction blocks are combined by using a weight matrix. In practice, usage of the weight matrix can be extended to combining any two prediction blocks, such as two inter-prediction blocks, two intra-prediction blocks, and one inter-prediction block and one intra-prediction block. A prediction block(s) of intra block copy (IBC) or palette may also be used as one or two of the prediction blocks in screen content coding.

In the disclosure, intra, inter, IBC, and palette are referred to as different prediction manners. For ease of elaboration, they are referred to as prediction modes. The prediction mode means that a coder may generate information of a prediction block of the current block according to the prediction mode. For example, in intra prediction, the prediction mode may be a certain intra prediction mode, such as DC, planar, and various intra angular prediction modes. One or more auxiliary information may also be added, for example, an optimization method for intra reference samples, an optimization method (for example, filtering) after a preliminary prediction block is generated, and the like. For example, in inter prediction, the prediction mode may be a skip mode, a merge mode, a merge with motion vector difference (MMVD) mode, or an advanced motion vector prediction (AMVP) mode. The inter prediction mode may be unidirectional prediction, bidirectional prediction, or multi-hypothesis prediction. If unidirectional prediction is used for the inter prediction mode, motion information that is one unidirectional motion information needs to be determined, and a prediction block can be determined according to the motion information. If bidirectional prediction is used for the inter prediction mode, one bidirectional motion information or two unidirectional motion information needs to be determined, and a prediction block can be determined according to the motion information. If multi-hypothesis prediction is used for the inter prediction mode, multiple unidirectional motion information needs to be determined, and a prediction block can be determined according to the motion information. The skip mode, the merge mode, the MMVD mode, and the common inter mode each can support unidirectional prediction, bidirectional prediction, or multi-hypothesis prediction. If the prediction mode is an inter prediction mode, motion information can be determined, and a prediction block can be determined according to the motion information. Template matching can be used on the basis of the skip mode, the merge mode, the MMVD mode, and the common inter mode, and such a prediction mode can still be referred to as the skip mode, the merge mode, the MMVD mode, and the common inter mode, or a template matching-based skip mode, a template matching-based merge mode, a template matching-based MMVD mode, and a template matching-based common inter mode.

In the skip mode or the merge mode, an MVD does not need to be transmitted in a bitstream, and in the skip mode, a residual also does not need to be transmitted in the bitstream. The MMVD may be considered as a special merge mode, in which some specific MVDs are represented by some flag bits, and these specific MVDs each only have several possible preset values. An example is an MMVD mode in VVC, in which the direction of the MVD is represented by mmvd_direction_idx. The possible value of mmvd_direction_idx is 0, 1, 2, and 3, where 0 indicates that the horizontal component of the MMVD is a positive value and the vertical direction is 0, 1 indicates that the horizontal component of the MMVD is a negative value and the vertical direction is 0, 2 represents that the horizontal component of the MMVD is 0 and the vertical direction is a positive value, and 3 represents that the horizontal component of the MMVD is 0 and the vertical direction is a negative value. The absolute value of the above positive or negative value is represented by mmvd_distance_idx, and the possible value of mmvd_distance_idx is 0~7, which represent 1, 2, 4, 8, 16, 32, 64, and 128 respectively when ph_mmvd_fullpel_only_flag==0, and represent 4, 8, 16, 32, 64, 128, 256, and 512 respectively when ph_mmvd_fullpel_only_flag==1. The MVD of the common inter mode can represent theoretically any possible MVD in a valid range.

In this way, information that needs to be determined for GPM may be expressed as one weight derivation mode and two prediction modes. The weight derivation mode is used to determine a weight matrix or weights, and the two prediction modes are each used determine a prediction block or prediction value. The weight derivation mode is sometimes referred to as a partitioning mode, but since it is simulated partitioning, the disclosure tends to refer to the partitioning mode as a weight derivation mode.

Optionally, the two prediction modes may come from the same or different prediction modes, where the prediction mode includes but is not limited to intra prediction, inter prediction, IBC, and palette.

A specific example is as follows. GPM is adopted for the current block and this example is used for an inter-coded block, the intra prediction and the merge mode in the inter prediction are allowed to be used. As illustrated in Table 4, a syntax element intra_mode_idx is added, so as to indicate which prediction mode is an intra prediction mode. For example, if intra_mode_idx=0, it indicates that two prediction modes each are an inter prediction mode, that is, mode0IsInter=1 and mode1IsInter=1. If intra_mode_idx=1, it indicates that a first prediction mode is an intra prediction mode and a second prediction mode is an inter prediction mode, that is, mode0IsInter=0 and mode1IsInter=1. If intra_mode_idx=2, it indicates that the first prediction mode is an inter prediction mode and the second prediction mode is an intra prediction mode, that is, mode0IsInter=1 and mode1IsInter=0. If intra_mode_idx=3, it indicates that the two prediction modes each are an intra prediction mode, that is, mode0IsInter=0, and mode1IsInter=0.

TABLE 4

```
    {
      merge_gpm_partition_idx[x0][y0]                          ae(v)
   intra_mode_idx[x0][y0]                                      ae(v)
   if( mode0IsInter )
      merge_gpm_idx0[x0][y0]                                   ae(v)
      if( (!mode0IsInter && mode1IsInter) ||
 (MaxNumGpmMergeCand > 2 && mode0IsInter && mode1IsInter))
         merge_gpm_idx1[x0][y0]                                ae(v)
    }
```

Figure 12:
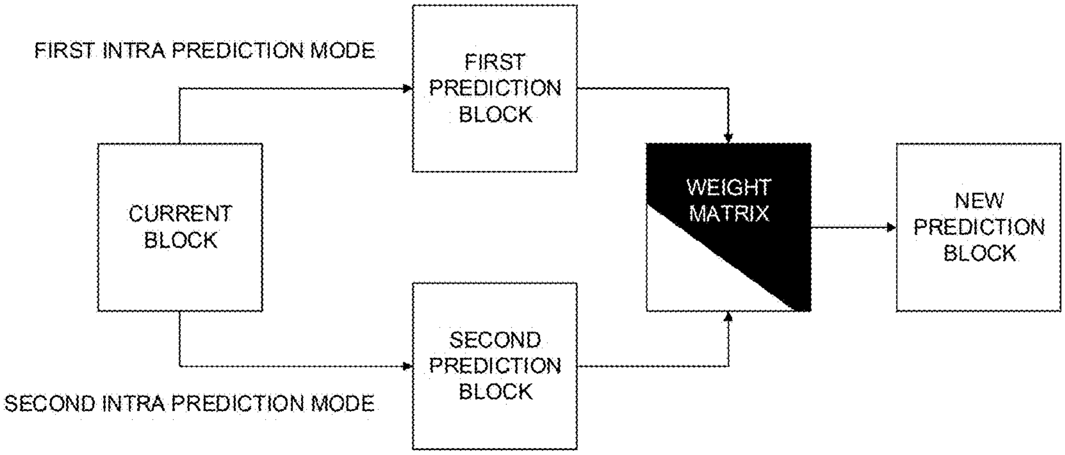
FIG. 12 is a schematic diagram illustrating weighted intra prediction.

In some embodiments, as illustrated in FIG. 12, a GPM decoding process may be expressed as follows. A bitstream is parsed to determine whether a GPM technology is adopted for the current block. If the GPM technology is adopted for the current block, a weight derivation mode (or a "partitioning" mode or a weight matrix derivation mode), a first intra prediction mode, and a second intra prediction mode are determined. A first prediction block is determined according to the first intra prediction mode, a second prediction block is determined according to the second intra prediction mode, a weight matrix is determined according to the weight matrix derivation mode, and a prediction block of the current block is determined according to the first prediction block, the second prediction block, and the weight matrix.

Template matching is originally used in inter prediction. In template matching, by utilizing correlation between neighbouring samples, some regions neighbouring the current block are taken as a template. Before coding the current block, blocks on the left and the top of the current block have already been coded according to a coding order. However, when implemented by an existing hardware decoder, it may not be ensured that blocks on the left and the top of the current block have already been decoded before decoding the current block, where the current block is an inter block. For example, in HEVC, when generating a prediction block for an inter-coding block, neighbouring reconstructed samples are not required, and therefore, a prediction process for the inter block may be performed in parallel. However, for an intra-coding block, reconstructed samples on the left and on the top are required as reference samples. Theoretically, samples on the left and on the top are available, that is, this can be realized by making corresponding adjustments on hardware design. Samples on the right and on the bottom are unavailable based on a coding order in an existing standard such as VVC.

Figure 13:
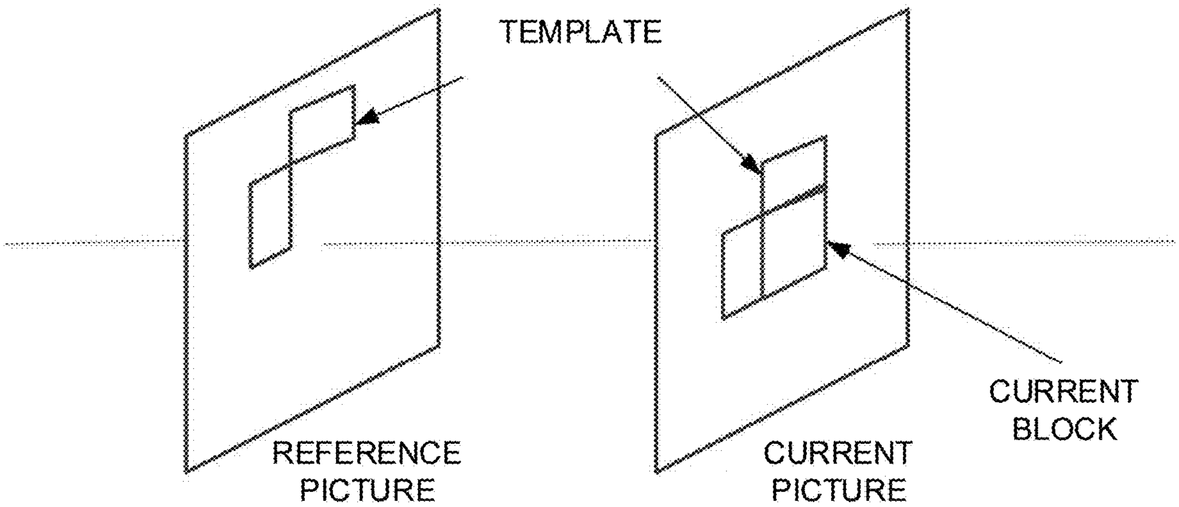
FIG. 13 is a schematic diagram illustrating template matching.

As illustrated in FIG. 13, rectangular regions on the left and the top of the current block are set as a template, where a height of the left part of the template is usually the same as a height of the current block, and a width of the top part of the template is usually the same as a width of the current block. The template may also have a different height or width from the current block. A best matching position of the template is found in a reference picture, so as to determine motion information or a motion vector of the current block. This process may be generally described as follows. In a certain reference picture, search within a certain range starting from a start position. A search rule may be preset, such as a search range and a search step size. Upon moving to a position each time, a degree of matching between a template corresponding to the position and a template neighbouring the current block is calculated. The degree of matching may be measured according to some distortion costs, such as a sum of absolute difference (SAD) and a sum of absolute transformed difference (SATD). A transform used in the SATD is usually a Hadamard transform or a mean-square error (MSE). A lower value of the SAD, the SATD, or the MSE indicates a higher degree of matching. A cost is calculated based on a prediction block of the template corresponding to the position and a reconstructed block of the template neighbouring the current block. In addition to searching for a position of an integer sample, searching for a position of a fractional sample may also be performed. The motion information of the current block is determined according to a position with the highest degree of matching found through searching. Due to correlation between neighbouring samples, motion information suitable for the template may also be motion information suitable for the current block. Template matching may not be applicable to some blocks, and therefore, whether template matching is used for the current block may be determined according to some methods, for example, a control switch is used for the current block to indicate whether to use template matching. Such template matching is also called decoder side motion vector derivation (DMVD). Both an encoder and a decoder may perform searching based on a template to derive motion information or find better motion information based on original motion information. In order to ensure consistency between encoding and decoding, the encoder and the decoder perform searching based on the same rule instead of transmitting a specific motion vector or motion vector difference. With template matching, it is possible to improve compression performance, but the decoder still needs to perform searching, which causes increase in decoder complexity.

The above is a method for applying template matching to inter prediction. Template matching may also be applied to intra prediction, for example, a template is used to determine an intra prediction mode. For the current block, a region within a certain range from the top and the left of the current block may be used as a template, such as a left rectangular region and a top rectangular region illustrated in the foregoing figure. When coding the current block, reconstructed samples in the template are available. This process may be generally described as follows. A set of candidate intra prediction modes is determined for the current block, where the candidate intra prediction modes constitute a subset of all available intra prediction modes, or the candidate intra prediction modes may be a universal set of all available intra prediction modes, which may be determined based on the trade-off between performance and complexity. The set of candidate intra prediction modes may be determined according to an MPM or some rules, such as equidistant screening. A cost, such as the SAD, the SATD, and the MSE, of each candidate intra prediction mode for the template is calculated. Prediction is performed on the template according to the mode to obtain a prediction block, and the cost is calculated according to the prediction block and a reconstructed block of the template. A mode with lower cost may match the template better, and due to similarity between neighbouring samples, an intra prediction mode that matches well with the template may also be an intra prediction mode that matches well with the current block. One or more modes with low cost are selected. The foregoing two steps may be repeated. For example, after one or more modes with low cost are selected, a set of candidate intra prediction modes is determined, cost is calculated for the newly determined set of candidate intra prediction modes, and one or more modes with lower cost are selected. This may also be understood as a rough selection and a fine selection. The one intra prediction mode finally chosen is determined as the intra prediction mode for the current block, or several intra prediction modes finally chosen are taken as candidates of the intra prediction mode for the current block. The set of candidate intra prediction modes may also be sorted by means of template matching. For example, an MPM list is sorted, that is, for each mode in the MPM list, a prediction block is obtained for the template according to the mode and a cost thereof is determined, and these modes are sorted in an ascending order of cost. Generally, a mode at the front in the MPM list leads to lower overhead in a bitstream, which can also improve compression efficiency.

Template matching may be used to determine two prediction modes of GPM. If template matching is used for GPM, one control switch may be used for the current block to control whether template matching is used for the two prediction modes for the current block, or two control switches may be used respectively to control whether template matching is used for each of the two prediction modes.

Another aspect is how to use template matching. For example, if GPM is used in the merge mode, for example, in GPM in VVC, merge_gpm_idxX is used to determine motion information from mergeCandList, where X=0 or 1. For $X^{th}$ motion information, one method is to perform optimization by means of template matching based on the foregoing motion information. That is, the motion information is determined from mergeCandList according to merge_gpm_idxX. If template matching is used for the motion information, template matching is used to perform optimization based on the motion information. Another method is to determine the motion information directly by searching based on default motion information, instead of using merge_gpm_idxX to determine the motion information from mergeCandList.

If an $X^{th}$ prediction mode is an intra prediction mode and template matching is used for an $X^{th}$ prediction mode for the current block, template matching may be used to determine an intra prediction mode, and an index of the intra prediction mode does not need to be indicated in a bitstream. Alternatively, a candidate set or an MPM list is determined by means of template matching, and an index of the intra prediction mode needs to be indicated in a bitstream.

In GPM, after determining the weight derivation mode, a region occupied by each prediction mode may be determined. Here, the region occupied may be understood as a region in which a weight corresponding to the prediction mode is the maximum, or a region in which the weight corresponding to the prediction mode is greater than or equal to a threshold. The reason why compression performance can be improved with aid of GPM is that the two parts "partitioned" based on GPM are different, and therefore, when determining a prediction mode of GPM by means of template matching, the template may also be partitioned. In the related art, the template may be classified into three types, i.e., left, top, and both (left and top). Partitioning of the template depends on a weight derivation mode. Exemplarily, as illustrated in Table 5, in the related art, partitioning of the template depends on a "partition" angle or a "partition" angle index angleIdx.

TABLE 5

| "Partition" angle index | Template corresponding to first prediction mode | Template corresponding to second prediction mode |
|---|---|---|
| 0 | TM_A | TM_AL |
| 1 | / | / |
| 2 | TM_A | TM_AL |
| 3 | TM_A | TM_AL |
| 4 | TM_A | TM_L |
| 5 | TM_AL | TM_L |
| 6 | / | / |
| 7 | / | / |
| 8 | TM_AL | TM_L |
| 9 | / | / |
| 10 | / | / |
| 11 | TM_AL | TM_L |
| 12 | TM_AL | TM_AL |
| 13 | TM_A | TM_AL |
| 14 | TM_A | TM_AL |
| 15 | / | / |
| 16 | TM_A | TM_AL |
| 17 | / | / |
| 18 | TM_A | TM_AL |
| 19 | TM_A | TM_AL |
| 20 | TM_A | TM_L |
| 21 | TM_AL | TM_L |
| 22 | / | / |
| 23 | / | / |
| 24 | TM_AL | TM_L |
| 25 | / | / |
| 26 | / | / |
| 27 | TM_AL | TM_L |
| 28 | TM_AL | TM_AL |

TABLE 5-continued

| "Partition" angle index | Template corresponding to first prediction mode | Template corresponding to second prediction mode |
|---|---|---|
| 29 | TM_A | TM_AL |
| 30 | TM_A | TM_AL |
| 31 | / | / |

For example, the template on the left is denoted as TM_A, the template on the top is denoted as TM_L, and both (left and top) templates are denoted as TM_AL. A relationship between templates and "partition" angle indices is illustrated in Table 5. Some angle indices such as 1, 6, and 7 are not used in the current GPM, and therefore there is no corresponding template, which is denoted by /.

Figure 14:
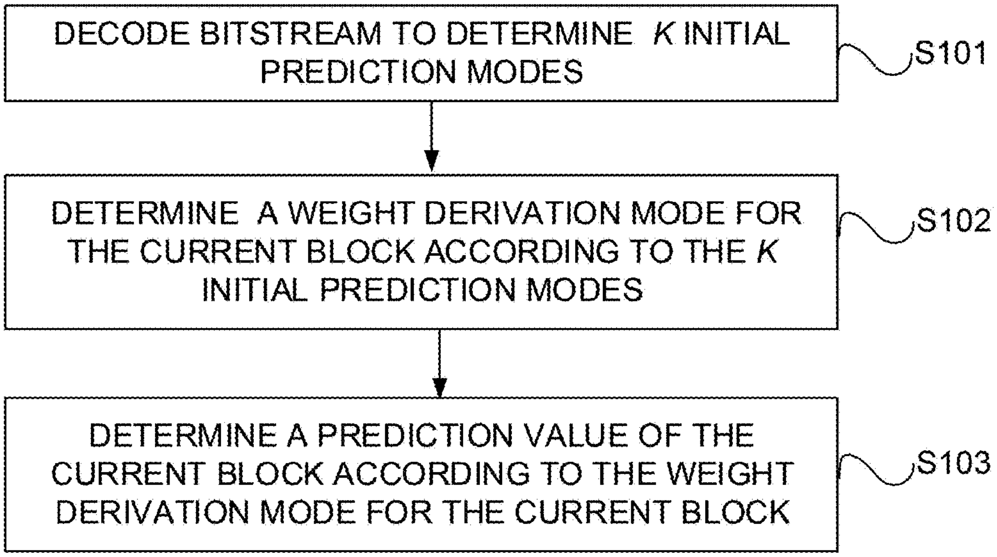
FIG. 14 is a schematic flowchart of a prediction method provided in an embodiment of the disclosure.

Taking the decoding end as an example, the video decoding method provided in embodiments of the present disclosure will be introduced in conjunction with FIG. 14.

FIG. 14 is a schematic flowchart of a prediction method according to an embodiment of the present disclosure. The embodiment of the present disclosure is applied to a video decoder illustrated in FIG. 1 and FIG. 3. As illustrated in FIG. 14, the method in the embodiment of the present disclosure includes the following.

S101, a bitstream is decoded to obtain K initial prediction modes.

As can be seen from the above, in order to further improve prediction accuracy, multiple prediction modes may be used to predict a current block. In this case, in order to maintain the consistency of prediction between the encoding and decoding ends, in some embodiments, the encoding end needs to indicate a weight derivation mode in the bitstream, such as signalling an index of the weight derivation mode into the bitstream. Taking VVC as an example, 64 weight derivation modes in GPM are encoded with equal probability, that is, an equal length of 6 bits is used for each of the 64 weight derivation modes during binarization and inverse binarization, which would increase the coding cost.

In the embodiments of the present disclosure, in order to reduce the coding cost, the decoding end derives the weight derivation mode according to prediction modes. Specifically, K initial prediction modes are determined by decoding the bitstream at the decoding end. Then, according to these K initial prediction modes, the weight derivation mode for the current block is determined, and a prediction value of the current block is determined according to the weight derivation mode for the current block.

Examples of the K initial prediction modes of the current block include the following.

Example 1, all of the K initial prediction modes are inter prediction modes.

Example 2, all of the K initial prediction modes are intra prediction modes.

Example 3, the K initial prediction modes include at least one intra prediction mode and at least one inter prediction mode.

Example 4, the K initial prediction modes include at least one intra prediction mode and at least one non-intra and non-inter prediction mode, such as an intra block copy (IBC) prediction mode or a palette prediction mode.

Example 5, the K initial prediction modes include at least one inter prediction mode and at least one non-intra and non-inter prediction mode, such as an IBC prediction mode or a palette prediction mode.

Example 6, none of the K initial prediction modes is an intra prediction mode or an inter prediction. For example, the K initial prediction modes include an IBC prediction mode and a palette prediction mode.

It should be noted that the specific types of the K initial prediction modes are not limited in the embodiments of the present disclosure.

Figure 15:
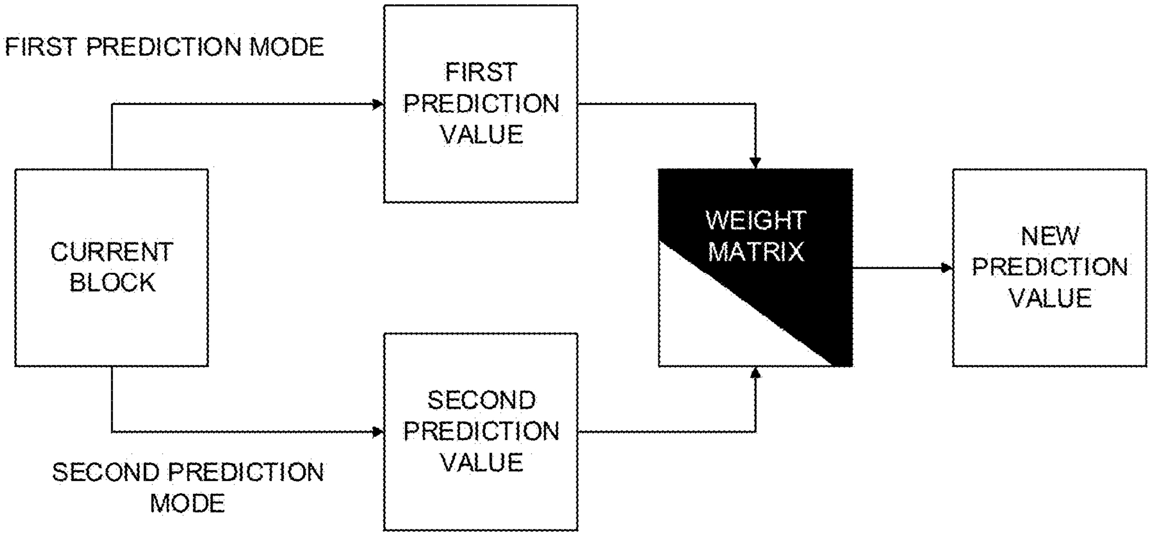
FIG. 15 is a schematic diagram illustrating prediction of a current block by using two prediction modes.

FIG. 15 illustrates prediction of a current block using two prediction modes. As illustrated in FIG. 15, during prediction of the current block, a first prediction mode may be used to determine a first prediction value, and a second prediction mode may be used to determine a second prediction value. Then the first prediction value and the second prediction value are weighted with weights to obtain a prediction value of the current block.

The manner of decoding the bitstream to obtain the K initial prediction modes at the decoding end at S101 includes, but is not limited to, the following manners.

Manner 1, the bitstream contains indexes of the K initial prediction modes, so that the decoding end can obtain the indexes of the K initial prediction modes by decoding the bitstream, and then determine the K initial prediction modes according to the indexes. For example, all of the K initial prediction modes are intra prediction modes, and indexes of the K initial intra prediction modes are signalled into the bitstream by the encoding end. For example, K=2, and the two initial prediction modes are angular prediction mode 31 and angular prediction mode 35 respectively in 65 angular prediction modes in VVC illustrated in FIG. 10. In this case, the encoding end signals indexes 31 and 35 into the bitstream. The decoding end decodes the bitstream to obtain indexes 31 and 35, and then obtain, from the 65 angular prediction modes in VVC illustrated in FIG. 10, intra prediction modes corresponding to indexes 31 and 35 as two initial prediction modes.

Manner 2, the operation S101 includes operations from S101-A1 to S101-A3 as follows.

S101-A1, an alternative prediction mode list is determined, where the alternative prediction mode list includes at least two alternative prediction modes.

S101-A2, the bitstream is decoded to obtain a prediction mode index.

S101-A3, the K initial prediction modes are determined from the alternative prediction mode list according to the prediction mode index.

In some embodiments, if all of the K initial prediction modes are intra prediction modes, all of alternative prediction modes included in the alternative prediction mode list are intra prediction modes. For example, the alternative prediction mode list includes at least one of a direct current (DC) mode, a PLANAR mode, or an angular mode. Optionally, the alternative prediction mode list further includes an intra prediction mode in a MPM list.

In some embodiments, if all of the K initial prediction modes are inter prediction modes, all of alternative prediction modes included in the alternative prediction mode list are inter prediction modes. For example, the alternative prediction mode list includes at least one of a skip mode, a merge mode, or a normal inter prediction mode.

In some embodiments, if the K initial prediction modes include both an inter prediction mode and an intra prediction mode, the alternative prediction mode list includes at least one intra prediction mode and at least one inter prediction mode.

Optionally, the alternative prediction mode list further includes an IBC mode, a palette mode, or the like.

Optionally, the alternative prediction mode list further includes a uni-directional prediction mode, a bi-directional prediction mode, a multiple-hypothesis prediction mode, or the like.

The types and number of alternative prediction modes included in the above alternative prediction mode list are not limited in embodiments of the present disclosure.

The manner of determining the alternative prediction mode list is not limited in embodiments of the present disclosure.

In an example, the alternative prediction modes included in the alternative prediction mode list are preset modes.

In an example, the alternative prediction mode list is the MPM list.

In an example, the alternative prediction mode list is a set of prediction modes determined based on certain rules, such as equidistant filtering.

In an example, it is default at both the encoding end and the decoding end that the alternative prediction modes included in the alternative prediction mode list are determined by template matching. For example, the decoding end uses a prediction mode to predict a template of the current block to obtain a prediction value of the template, and determines a cost, such as SAD cost, SATD cost, or MSE cost, of the prediction mode based on the prediction value of the template and a reconstruction value of the template. In this way, the decoding end can sort the prediction modes according to their costs so as to obtain the alternative prediction mode list. For example, multiple prediction modes with the lowest cost(s) may be determined as alternative prediction modes to form the alternative prediction mode list.

In the present embodiment, the prediction mode index contained in the bitstream may be an index of at least one initial prediction mode out of the K initial prediction modes. For example, the prediction mode index is indexes of the K initial prediction modes, or an index of the first initial prediction mode out of the K initial prediction modes. The decoding end decodes the bitstream to obtain the prediction mode index, and determines the K initial prediction modes from the above-determined alternative prediction mode list according to the prediction mode index.

For example, if the prediction mode indexes included in the bitstream are the indexes of the K initial prediction modes, the decoding end will determine K alternative prediction modes corresponding to the indexes of the K initial prediction modes in the alternative prediction modes list, as the K initial prediction modes.

For example, if the prediction mode index included in the bitstream is the index of the first initial prediction mode among the K initial prediction modes, the decoding end will determine from the alternative prediction mode list an alternative prediction mode corresponding to the index as the first initial prediction mode among the K initial prediction modes, and determines from the alternative prediction mode list K−1 alternative prediction modes corresponding to K−1 indexes after the index, as the remaining K−1 initial prediction modes among the K initial prediction modes.

In the embodiments of the present disclosure, the decoding end determines the K initial prediction modes according to the above operations, determines the weight derivation mode for the current block based on these K initial prediction modes, and then predicts the current block based on the weight derivation mode for the current block to determine the prediction value of the current block.

In some embodiments, at the decoding end, before determination of the K initial prediction modes, whether to use K different prediction modes for weighted prediction of the current block needs to be determined. If it is determined at the decoding end that K different prediction modes are used for weighted prediction of the current block, S101 is performed to determine the K initial prediction modes.

In a possible implementation, at the decoding end, whether to use two different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether K different prediction modes can be used for prediction of the current block.

It can be understood that, in the embodiment of the disclosure, the prediction mode parameter may be understood as a flag bit indicating whether the GPM mode or the AWP mode is used. Specifically, at the encoding end, a variable may be used as the prediction mode parameter, so that the prediction mode parameter may be set by setting a value of the variable. Exemplarily, in the disclosure, if the GPM mode or the AWP mode is used for the current block, at the encoding end, a value of the prediction mode parameter may be set to indicate that the GPM mode or the AWP mode is used for the current block. Specifically, the value of the variable may be set to 1 at the encoding end. Exemplarily, in the disclosure, if the GPM mode or the AWP mode is not used for the current block, at the encoding end, the value of the prediction mode parameter may be set to indicate that the GPM mode or the AWP mode is not used for the current block. Specifically, the value of the variable may be set to 0 at the encoding end. Further, in the embodiment of the disclosure, after setting of the prediction mode parameter is completed, at the encoding end, the prediction mode parameter may be signalled into the bitstream and transmitted to the decoding end, so that at the decoding end, the prediction mode parameter may be obtained after parsing the bitstream.

Based on this, at the decoding end, the bitstream is decoded to obtain the prediction mode parameter, whether the GPM mode or the AWP mode is used for the current block is determined according to the prediction mode parameter, and if the GPM mode or the AWP mode is used for prediction of the current block, i. e. K different prediction modes are used, the K initial prediction modes are determined.

It should be noted that, in the embodiment of the disclosure, the GPM mode or the AWP mode is a prediction method. Specifically, K different prediction modes are determined for the current block, K prediction values are determined according to the K different prediction modes respectively, and then weights are determined to combine the K prediction values according to the weights, so as to obtain the prediction value of the current block.

In some embodiments, limitations may be imposed on a size of the current block when applying the GPM mode or the AWP mode. It may be understood that, in the prediction method provided in the embodiment of the disclosure, it is necessary to use the K different prediction modes to generate the K prediction values respectively, which are then weighted to obtain the prediction value of the current block. Therefore, in order to reduce complexity while considering the trade-off between compression performance and complexity, the GPM mode or the AWP mode may not be used for blocks with certain sizes in the embodiment of the disclosure. Therefore, in the disclosure, at the decoding end, a size parameter of the current block may be firstly determined, and then whether to use the GPM mode or the AWP mode for the current block is determined according to the size parameter.

It should be noted that, in the embodiment of the disclosure, the size parameter of the current block may include a height and a width of the current block, and therefore, at the decoding end, the use of the GPM mode or the AWP mode may be restricted based on the height and the width of the current block. Exemplarily, in the disclosure, if the width of the current block is greater than a first threshold and the height of the current block is greater than a second threshold, it is determined that the GPM mode or the AWP mode is used for the current block. As can be seen, one possible limitation is to use the GPM mode or the AWP mode only when the width of the block is greater than (or greater than or equal to) the first threshold and the height of the block is greater than (or greater than or equal to) the second threshold. The value of each of the first threshold and the second threshold may be 8, 16, 32, etc., and the first threshold may be equal to the second threshold. Exemplarily, in the disclosure, if the width of the current block is less than a third threshold and the height of the current block is greater than a fourth threshold, it is determined that the GPM mode or the AWP mode is used for the current block. As can be seen, one possible limitation is to use the GPM mode or the AWP mode only when the width of the block is less than (or less than or equal to) the third threshold and the height of the block is greater than (or greater than or equal to) the fourth threshold. The value of each of the third threshold and the fourth threshold may be 8, 16, 32, etc., and the third threshold may be equal to the fourth threshold.

In some embodiments of the disclosure, limitation on the size of a block for which the GPM mode or the AWP mode can be used may also be implemented through limitations on a sample parameter. Exemplarily, in the disclosure, at the decoding end, a sample parameter of the current block may be firstly determined, and then whether the GPM mode or the AWP mode can be used for the current block may be determined according to the sample parameter and a fifth threshold. As can be seen, one possible limitation is to use the GPM mode or the AWP mode only when the number of samples in the block is greater than (or greater than or equal to) the fifth threshold. The value of the fifth threshold may be 8, 16, 32, etc. That is, in the disclosure, the GPM mode or the AWP mode can be used for the current block only when the size parameter of the current block satisfies a size requirement.

In some embodiments, in the disclosure, a flag of a picture level may be used to determine whether the disclosure is applied to the current decoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

In some embodiments, a flag below the picture level but above a CU level (such as tile, slice, patch, LCU, etc.) may be used to determine whether the disclosure is applied to that region.

S102, the weight derivation mode for the current block is determined according to the K initial prediction modes.

In the disclosure, the weight derivation mode is used to determine weights used for the current block. Specifically, the weight derivation mode may be a mode for deriving the weights. For a block of a given length and width, each weight derivation mode may be used to derive one weight matrix. For blocks of the same size, weight matrices derived from different weight derivation modes may be different.

Exemplarily, in the disclosure, there are 56 weight derivation modes for AWP and 64 weight derivation modes for GPM.

In embodiments of the present disclosure, the decoding end determines the weight derivation mode for the current block according to the K initial prediction modes determined above. In some cases, the encoding end may not signal into the bitstream information related to the weight derivation mode for the current block, so as to saving codewords and reduce encoding cost.

The manner of determining the weight derivation mode for the current block according to the K initial prediction modes at the decoding end is not limited in embodiments of the present disclosure.

In some embodiments, the weight derivation mode for the current block is determined according to the K initial prediction modes at the decoding end based on a template of the current block. Taking VVC as an example, there are 64 weight derivation modes in GPM, and the decoding end analyses the template to estimate which weight derivation modes are more likely to be selected and which are less likely to be selected. Taking inter GPM as an example, a typical scene is 2 objects moving against each other, and GPM can be used for an edge between the 2 objects. Assuming that both the current block and the template contain the edge between the objects, then the edge on the template can be used to infer the edge on the current block. Exemplarily, given 2 motion information, 2 prediction values of the template are obtained based on these 2 motion information respectively, denoted as a first template prediction value and a second template prediction value respectively. Template weights are derived according to a certain weight derivation mode. Based on the first template prediction value, the second template prediction value, and the template weights, the prediction value of the template corresponding to that weight derivation mode is determined. Because the reconstruction values of the template are available, a cost of that weight derivation mode on the template can be obtained based on the prediction value of the template corresponding to that weight derivation mode and the reconstruction value of the template. In this way, a probability of a weight derivation mode being selected can be estimated based on the cost of the weight derivation mode on the template. In one manner, based on the costs of respective weight derivation modes on the template, the weight derivation modes are sorted. A mode with a smaller cost precedes a mode with a larger cost. Since it is considered that the sorted weight derivation modes are arranged roughly from high probability to low probability, variable length encoding can be used. In one possible implementation, a list of weight derivation modes are constructed. The encoding end signals into the bitstream an index of the weight derivation mode selected for the current block, and the decoder parses out the index from the bitstream to determine the weight derivation mode for the current block from the list.

As can be seen from the above, in embodiments of the present disclosure, during determining the weight derivation mode for the current block according to the K initial prediction modes, a template weight needs to be determined according to the weight derivation mode.

In the following, the process of determining the template weight according to the weight derivation mode according to embodiments of the present disclosure is introduced.

In template matching, by utilizing correlation between neighbouring samples, some regions neighbouring the current block are taken as a template. Before coding the current block, blocks on the left and the top of the current block have already been encoded according to a coding order. In inter prediction, a best matching position of the template is found in a reference picture to determine motion information or a motion vector of the current block. In intra prediction, an intra prediction mode of the current block is determined by using the template.

There is no limitation on the shape of the template of the current block in the disclosure.

In some embodiments, the template includes at least one of a top decoded region, a left decoded region, or a top-left decoded region of the current block.

Optionally, a width of the top decoded region is the same as a width of the current block, a height of the left decoded region is the same as a height of the current block, a width of the top-left decoded region is the same as a width of the left decoded region, and a height of the top-left decoded region is the same as a height of the top decoded region.

Figure 16:
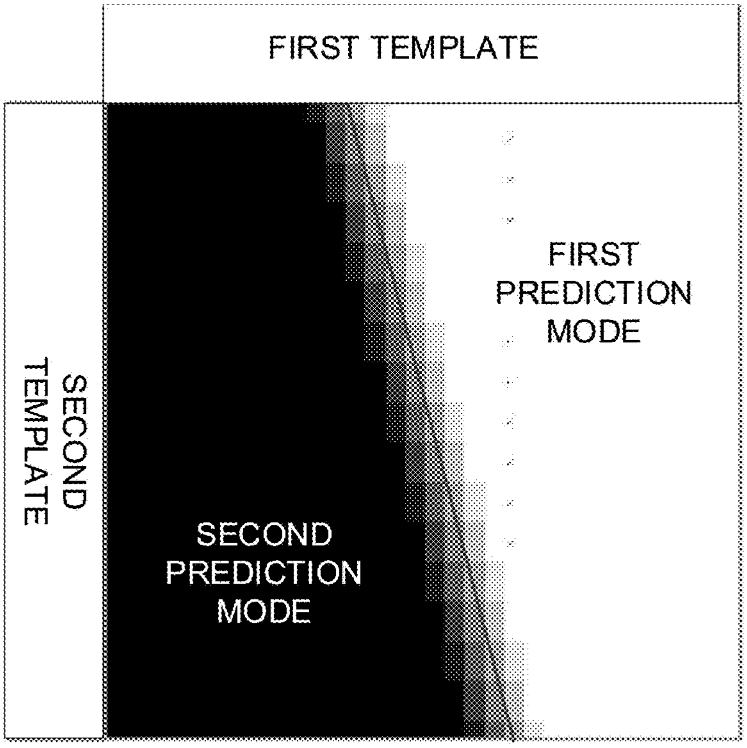
FIG. 16 is a schematic diagram illustrating template partitioning.

As illustrated in Table 5 above, taking K=2 as an example, the K prediction modes include a first prediction mode and a second prediction mode. A template corresponding to the first prediction mode and a template corresponding to the second prediction mode each are a top decoded region of the current block, or a left decoded region of the current block, or a left decoded region and a top decoded region of the current block. For example, as illustrated in FIG. 16, taking a weight derivation mode with a GPM index 2 as an example, a white area in a weight matrix of the current block is a weight corresponding to a prediction value of the first prediction mode, and a black area is a weight corresponding to a prediction value of the second prediction mode. As illustrated in FIG. 16, a first template corresponding to the first prediction mode is a top decoded region of the current block, a second template corresponding to the second prediction mode is a left decoded region of the current block, but a template close to the second prediction mode further includes part of the top decoded region besides the left region. Therefore, in the related art, template partitioning is not fine enough, and as a result, the weight derivation mode for the current block cannot be derived accurately based on the template.

Figure 17A:
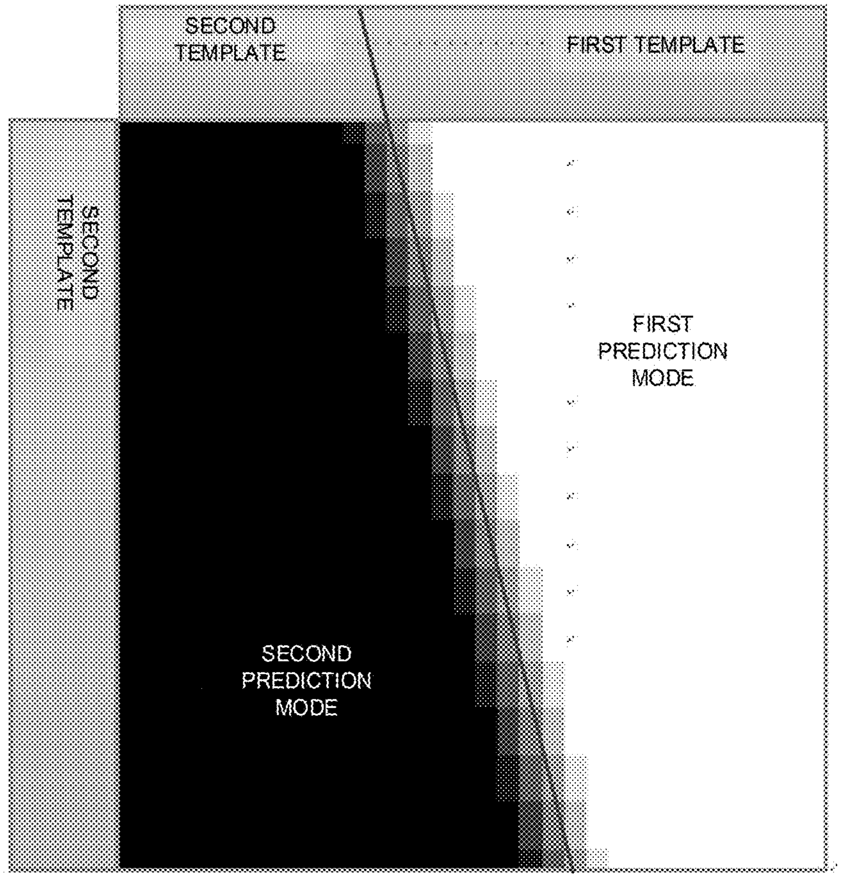
FIG. 17A is another schematic diagram illustrating template partitioning.

In order to solve the technical problem, in the disclosure, a finer partitioning of template can be achieved with aid of the weight derivation mode. For example, as illustrated in FIG. 17A, in the disclosure, a boundary line of a weight matrix corresponding to the weight derivation mode for the current block is extended to a template region for template partitioning. For example, a template on one side of the boundary line is referred to as a first template, and a template on another side of the boundary line is referred to as a second template. The first template corresponds to the first prediction mode, and the second prediction mode corresponds to the second template. A weight of the first template is determined according to a weight corresponding to the first prediction mode, and a weight of the second template is determined according to a weight corresponding to the second prediction mode. For example, the weight of the first template is the same as the weight corresponding to the first prediction mode, and the weight of the second template is the same as the weight corresponding to the second prediction mode.

In some embodiments, each of the first template and the second template partitioned according to the above method may not be a rectangle. For example, as illustrate in FIG. 17A, each of the first template and the second template has an inclined edge. Calculation of a cost for a irregular template is complex.

Figure 17B:
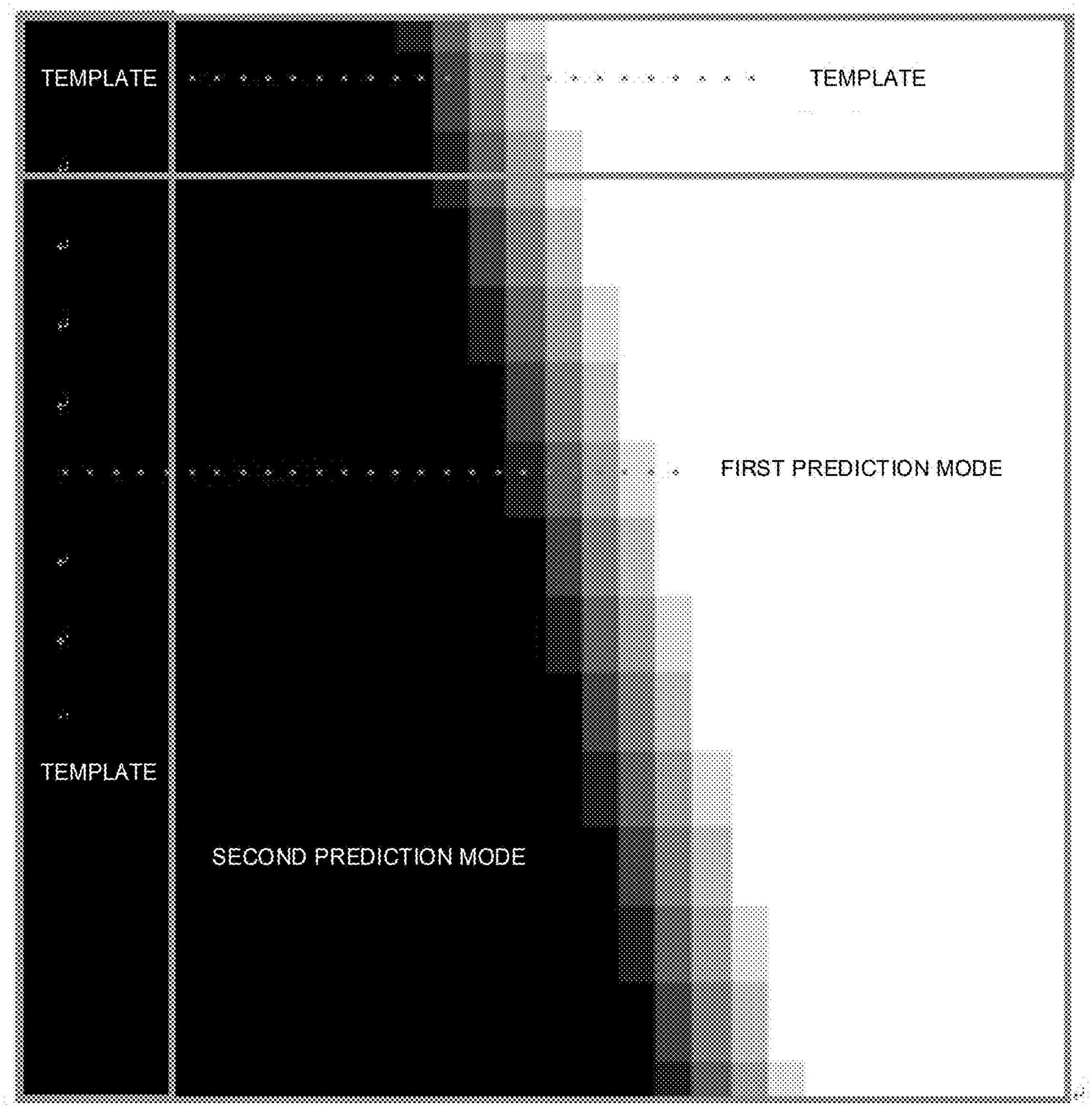
FIG. 17B is another schematic diagram illustrating template partitioning.

In order to reduce complexity of template matching, in some embodiments, the weight matrix may be directly extended towards the template region, for example towards the left and the above, to cover the template so as to determine the weights of the template. For example, as illustrated in FIG. 17B, a rectangular region in the top-left of the current block may be added to the template, so that the template and the current block can constitute a rectangle. Alternatively, only the left part and the top part may be used as the template. As illustrated in FIG. 17B, the top-left region is exemplarily added, and regions in the left, the top-left, and the top in an upside-down L-shaped region form a template region, and a bottom-right rectangular region is the current block. In this case, part of the weight matrix extended to the top-left becomes a weight matrix of the template. In this way, the template does not need to be actually partitioned, but is simulately partitioned according to weights, that is, template partitioning is simulated according to a weight derivation mode, or a template weight is determined according to a weight derivation mode, and a cost of template matching is determined according to the template weight. Template partitioning may differ under different block shapes, but in the disclosure, there is no need to set various rules for blocks of various shapes, for example, there is no need to set a correspondence between prediction modes and templates as illustrated in Table 5. In addition, with regard to accuracy of "partitioning", the simulated partitioning in the disclosure is more precise and accurate than a method in which only a left region and a top region are differentiated.

In some embodiments, the left region and the top region of the current block illustrated in FIG. 17B may be used as the template of the current block, without considering the top-left rectangular region.

During template matching, only one component (Y, Cb, Cr or R, G, B) may be used, for example, Y may be used in a YUV format because Y is dominant. Alternatively, all components may be used. For ease of illustration, one component is taken as an example for illustration in the disclosure, for example, template matching is performed exemplarily on a Y component, and the same applies to other components.

In the embodiment of the disclosure, the process of deriving the template weight according to the weight derivation mode may be combined with the process of deriving a weight of a prediction value, for example, the template weight and the weight of the prediction value are derived at the same time, where the weight of the prediction value may be understood as a weight corresponding to the prediction value. For example, the first prediction value is obtained according to the first prediction mode, the second prediction value is obtained according to the second prediction mode, a first weight of the first prediction value is determined according to the weight derivation mode, a second weight of the second prediction value is determined according to the weight derivation mode, and a sum of a product of the first prediction value and the first weight and a product of the second prediction value and the second weight is determined as a prediction value of the current block.

In the disclosure, in order to distinguish from the template weight, the first weight and the second weight each are referred to as a weight of a prediction value.

In some embodiments, the operation of determining the template weight according to the weight derivation mode includes the following operations.

Operation A, an angle index and a distance index are determined according to the weight derivation mode.

Operation B, the template weight is determined according to the angle index, the distance index, and a size of the template.

In the disclosure, the template weight may be derived in the same manner as deriving a weight of a prediction value. For example, the angle index and the distance index are firstly determined according to the weight derivation mode, where the angle index may be understood as an angle index of a boundary line of weights derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the template weight is determined according to the angle index, the distance index, and the size of the template.

The manner for deriving the template weight according to the weight derivation mode in operation B includes, but is not limited to, the following manners.

Manner I: The template weight is determined directly according to the angle index, the distance index, and the size of the template. In this case, operation B includes the following operations B11 to B13.

Operation B11, a first parameter of a sample in the template is determined according to the angle index, the distance index, and the size of the template.

Operation B12, a weight of the sample in the template is determined according to the first parameter of the sample in the template.

Operation B13, the template weight is determined according to the weight of the sample in the template.

In this implementation, the weight of the sample in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

In a possible implementation, an offset and the first parameter may be determined in the following manner.

Figure 18:
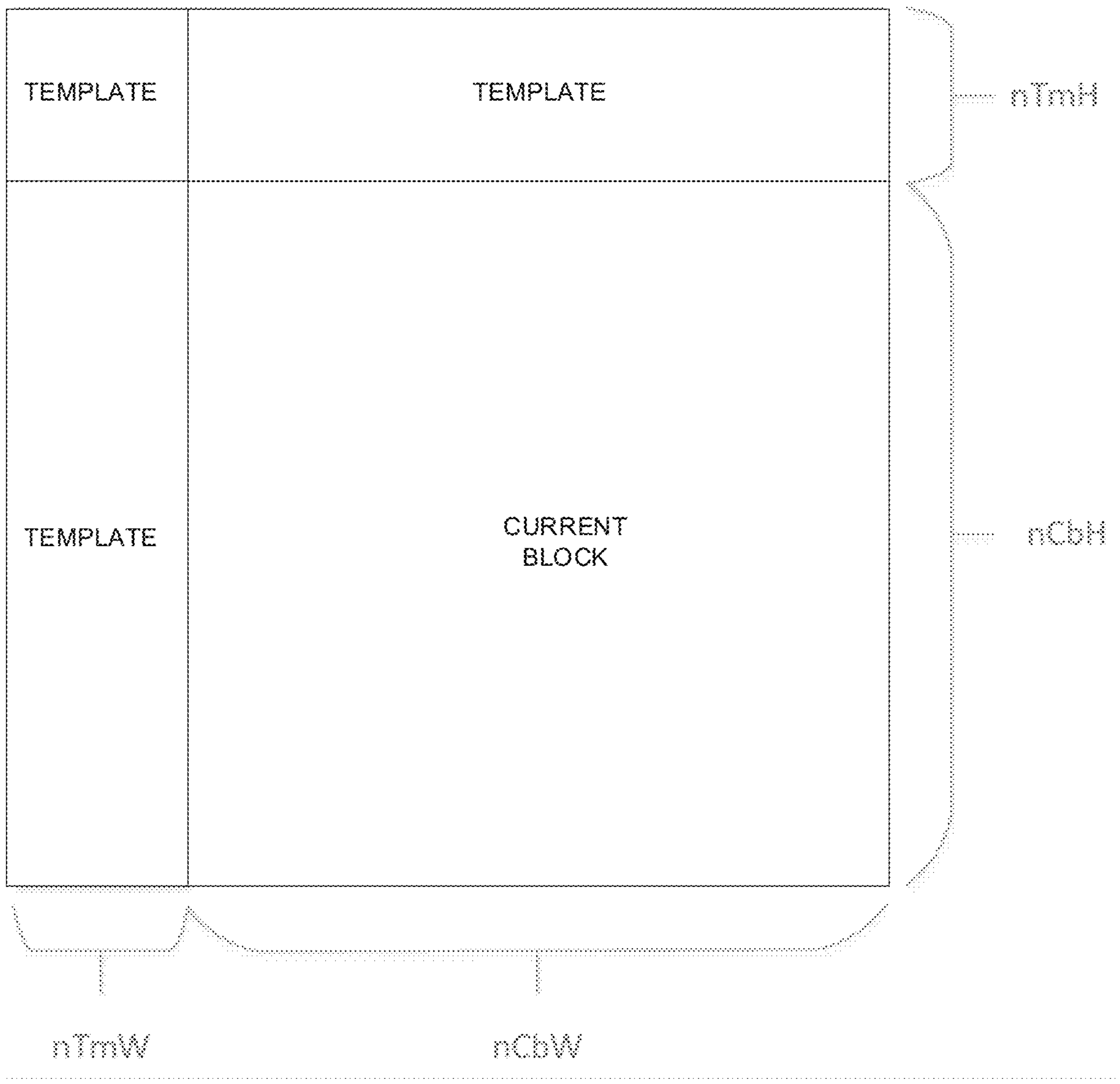
FIG. 18 is a schematic diagram illustrating a size of a template.

Inputs to the process of deriving the template weight are: as illustrated in FIG. 18, the width n (bW of the current block, the height n (bH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

$$nW = (cIdx == 0) ? nCbW : nCbW * SubWidthC$$

$$nH = (cIdx == 0) ? nCbH : nCbH : nCbH * SubWeightC$$

-continued $$\text{shift1} = \text{Max}(5, 17 - BitDepth),$$

where *BitDepth* represents a coding bit depth;

$$\text{offset1} = 1 << (\text{shift1} - 1)$$

$$displacementX = angleIdx$$

$$displacementY = (angleIdx + 8)\ \%\ 32$$

$$partFlip = (angleIdx >= 13\ \&\&\ angleIdx <= 27)\ ?\ 0 : 1$$

$$shiftHor = (angleIdx\ \%\ 16 == 8 \| (angleIdx\ \%\ 16\ != 0\ \&\&\ nH >= nW)) ? 0 : 1$$

Offsets offsetX and offsetY are derived as follows:

if $shiftHor = 0$:

$$offsetX = (-nW) >> 1$$

$$offsetY = ((-nH) >> 1) + (angleIdx < 16 ? (distanceIdx * nH) >> 3 : -((distanceIdx * nH) >> 3))$$

otherwise (i.e. $shiftHor = 1$):

$$offsetX = ((-nW) >> 1) + (angleIdx < 16 ? (distanceIdx * nW) >> 3 : -((distanceIdx * nW) >> 3)$$

$$offsetY = (-nH) >> 1$$

A weight matrix wTemplate Value[x][y] (where x=−nTmW . . . nCbW−1, y=−nTmH . . . nCbH−1, except for the case where x≥0 and y≥0) of the template is derived as follows (it should be noted that in this example, the coordinate of a top-left corner of the current block is (0, 0)):

variables xL and yL are derived as follows:

$$xL = (cIdx == 0) ? x : x * SubWidthC$$

$$yL = (cIdx == 0) ? y : y * SubHeightC$$

disLut is determined according to Table 3 above;

the first parameter weightIdx is derived as follows:

$$weightIdx = (((xL + offsetX) << 1) + 1)(disLut[displacementX] + (((yL + offsetY) << 1) + 1) * disLut[displacementY]$$

After the first parameter weightIdx is determined according to the foregoing method, a weight of a sample (x, y) in the template is determined according to weightIdx.

In the disclosure, the manner for determining the weight of the sample in the template according to the first parameter of the sample in the template in operation B12 includes, but is not limited to, the following manners.

Manner 1: A second parameter of the sample in the template is determined according to the first parameter of the sample in the template, and the weight of the sample in the template is determined according to the second parameter of the sample in the template.

The second parameter is also used for determining a weight. In some embodiments, the second parameter is also referred to as a weight index under a first component, and the first component may be a luma component, a chroma component, or the like.

For example, the weight of the sample in the template is determined according to the following formula:

$$weightIdxL = partFlip\,?\,32 + weightIdx : 32 - weightIdx$$

$$wTemplateValue[x][y] = \text{Clip3}(0, 8, (weightIdxL + 4) >> 3)$$

wTemplateValue[x][y] is the weight of the sample (x, y) in the template. weightIdxL is the second parameter of the sample (x, y) in the template, and is also referred to as a weight index for the first component (for example, a luma component). wTemplateValue[x][y] is the weight of the sample (x, y) in the template. partFlip is an intermediate variable, and is determined according to the angle index angleIdx, for example, partFlip=(angleIdx>=13 && angleIdx<=27)? 0:1 as described above, that is, partFlip=1 or 0. If partFlip=0, weightIdxL=32-weightIdx; and if partFlip=1, weightIdxL=32+weightIdx. It should be noted that, 32 herein is merely an example, and the disclosure is not limited thereto.

Manner 2: The weight of the sample in the template is determined according to the first parameter of the sample in the template, a first preset value, and a second preset value.

In order to reduce complexity of calculating the template weight, in manner 2, the weight of the sample in the template is limited to the first preset value or the second preset value, that is, the weight of the sample in the template is either the first preset value or the second preset value, thereby reducing complexity of calculating the template weight.

The value of each of the first preset value and the second preset value is not limited in the disclosure.

Optionally, the first preset value is 1.

Optionally, the second preset value is 0.

In an example, the weight of the sample in the template may be determined according to the following formula:

$$wTemplateValue[x][y] = (partFlip\,?\,weightIdx : -weightIdx) > 0\,?\,1 : 0$$

wTemplateValue[x][y] is the weight of the sample (x, y) in the template. In the foregoing "1:0", 1 is the first preset value and 0 is the second preset value.

In manner I above, the weight of each sample in the template is determined according to the weight derivation mode, and a weight matrix formed by the weights of all samples in the template is used as the template weight.

Manner II: A weight of the current block and the template weight are determined according to the weight derivation mode. That is, in manner II, a merge region consisting of the current block and the template is taken as a whole, and a weight of a sample in the merge region is derived according to the weight derivation mode. Based on this, operation B includes the following operations B21 and B22.

Operation B21, a weight of a sample in a merge region consisting of the current block and the template is determined according to the angle index, the distance index, the size of the template, and a size of the current block.

Operation B22, the template weight is determined according to the size of the template and the weight of the sample in the merge region.

In manner II, the current block and the template are taken as a whole, the weight of the sample in the merge region consisting of the current block and the template is determined according to the angle index, the distance index, the size of the template, and the size of the current block, and then according to the size of the template, a weight corresponding to the template among the weights of the samples in the merge region is determined as the template weight, for example, as illustrated in FIG. 18, a weight corresponding to an L-shaped template region in the merge region is determined as the template weight.

In manner II, in a weight determination process, the template weight and the weight of a prediction value are determined, i. e. the weight of the prediction value is a weight corresponding to the merge region other than the template weight, so that a subsequent prediction process can be performed according to the weight of the prediction value, and the weight of the prediction value does not need to be determined again, thereby reducing the steps for prediction and improving prediction efficiency.

There is no limitation on the implementation of determining the weight of the sample in the merge region consisting of the current block and the template according to the angle index, the distance index, the size of the template, and the size of current block in the disclosure.

In some embodiments, determining the weight of the sample in the merge region in operation B21 includes the following operations B211 to B212.

Operation B211, a first parameter of the sample in the merge region is determined according to the angle index, the distance index, and a size of the merge region.

Operation B212, the weight of the sample in the merge region is determined according to the first parameter of the sample in the merge region.

In this implementation, the weight of the sample in the merge region is determined according to the angle index, the distance index, and the size of the merge region, and the weight of samples in the merge region form a weight matrix.

In a possible implementation, an offset and the first parameter may be determined in the following manner.

Inputs to the process of deriving the weight of the merge region are: as illustrated in FIG. 18, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

$$nW = (cIdx == 0)\,?\,nCbW : nCbW * SubWidthC$$

$$nH = (cIdx == 0)\,?\,nCbH : nCbH * SubHeightC$$

$$\text{shift1} = \text{Max}(5, 17 - BitDepth),$$

where $BitDepth$ represents a coding bit depth;

$$\text{offset1} = 1 << (\text{shift1} - 1)$$

$$displacementX = angleIdx$$

$$displacementY = (angleIdx + 8)\ \%\ 32$$

$$partFlip = (angleIdx >= 13\ \&\&\ angleIdx <= 27)\,?\,0 : 1$$

$$shiftHor = (angleIdx\ \%\ 16 == 8 \| (angleIdx\ \%\ 16\ != 0\ \&\&\ nH >= nW))\,?\,0 : 1$$

Offsets offsetX and offsetY are derived as follows:

$$\text{if } shiftHor = 0:$$

$$offsetX = (-nW) >> 1$$

$$offsetY = ((-nH) >> 1) + (angleIdx < 16 ? (distanceIdx * nH) >> 3 : -((distanceIdx * nH) >> 3))$$

$$\text{otherwise (i.e. } shiftHor = 1):$$

$$offsetX = ((-nW) >> 1) + (angleIdx < 16 ? (distanceidx * nW) >> 3 : -((distanceIdx * nW) >> 3)$$

$$offsetY = (-nH) >> 1$$

The weight wValueMatrix[x][y] (where x=−nTmW . . . nCbW−1, y=−nTmH . . . nCbH−1) of the sample in the merge region is derived as follows (it should be noted that in this example, the coordinate of a top-left corner of the current block is (0, 0)):

variables xL and yL are derived as follows:

$$xL = (cIdx == 0) ? x : x * SubWidthC$$

$$yL = (cIdx == 0) ? y : y * SubHeightC$$

disLut is determined according to Table 3;

the first parameter weightIdx is derived as follows:

$$weightIdx = (((xL + offsetX) << 1) + 1) * disLut[displacementX] + (((yL + offsetY) << 1) + 1) * disLut[displacementY]$$

After the first parameter weightIdx is determined according to the foregoing method, a weight of a sample (x, y) in the merge region is determined according to weightIdx.

In the disclosure, the manner for determining the weight of the sample in the merge region according to the first parameter of the sample in the merge region in operation B212 includes, but is not limited to, the following manners.

Manner 1: A second parameter of the sample in the merge region is determined according to the first parameter of the sample in the merge region, and the weight of the sample in the merge region is determined according to the second parameter of the sample in the merge region.

For example, the weight of the sample in the merge region is determined according to the following formula:

$$weightIdx = (((xL + offsetX) << 1) + 1) * disLut[displacementX] + (((yL + offsetY) << 1) + 1) * disLut[displacementY]$$

$$weightIdxL = partFlip ? 32 + weightIdx : 32 - weightIdx$$

$$wValueMatrix[x][y] = \text{Clip3}(0, 8, (weightIdxL + 4) >> 3)$$

wValueMatrix[x][y] is the weight of the sample (x, y) in the merge region. weightIdxL is the second parameter of the sample (x, y) in the merge region. wTemplateValue[x][y] is the weight of the sample (x, y) in the merge region.

Manner 2: The weight of the sample in the merge region is determined according to the first parameter of the sample in the merge region, a first preset value, and a second preset value.

Exemplarily, the weight of the sample in the merge region is the first preset value or the second preset value.

In order to reduce complexity of calculating the weight of the merge region, in manner 2, the weight of the sample in the merge region is limited to the first preset value or the second preset value, that is, the weight of the sample in the merge region is either the first preset value or the second preset value, thereby reducing complexity of calculating the weight of the merge region.

The value of each of the first preset value and the second preset value is not limited in the disclosure.

Optionally, the first preset value is 1.

Optionally, the second preset value is 0.

In an example, the weight of the sample in the merge region may be determined according to the following formula:

$$wTemplateValue[x][y] = (partFlip ? weightIdx : -weightIdx) > 0 ? 1 : 0$$

wValueMatrix[x][y] is the weight of the sample (x, y) in the merge region. In the foregoing "1:0", 1 is the first preset value and 0 is the second preset value.

In manner II above, the weight of each sample in the merge region consisting of the current block and the template is determined according to the weight derivation mode, and then a weight corresponding to the template in the merge region is determined as the template weight according to the size of the template. In addition, in manner II, a weight of a prediction value is also determined, and it is unnecessary to perform subsequent steps of determining the weight of the prediction value, thereby reducing the steps for prediction and improving prediction efficiency.

In the above, the process of determining the template weight according to the weight derivation mode is described in detailed. The weight derivation mode may be any weight derivation mode involved in embodiments of the present disclosure, such as the weight derivation mode for the current block, the i-th candidate prediction mode in the N candidate prediction modes, etc.

S103, a prediction value of the current block is determined according to the weight derivation mode for the current block.

In the present disclosure, the manner of determining the prediction value of the current block according to the weight derivation mode for the current block at S103 at the decoding end includes but is not limited to the following manners.

Manner 1, the decoding end determines the prediction value of the current block according to the weight derivation mode for the current block and the K initial prediction modes. Specifically, the decoding end determines weights of prediction values, obtains K prediction values by predicting the current block according to the K initial prediction modes, and obtains the prediction value of the current block by performing weighted averaging on the K prediction values with the weights of prediction values.

It should be noted that, the weights of the prediction values derived according to the weight derivation mode for the current block may be understood as weights each corresponding to a sample in the current block, and may also be understood as a weight matrix corresponding to the current block. During determining the prediction value of the current block based on the weights of the prediction values, for each sample in the current block, K prediction values corresponding to the sample may be determined, and a prediction value corresponding to the sample is determined according to the K prediction values corresponding to the sample and the weights of the prediction values. Then the prediction values respectively corresponding to samples in the current block form the prediction value of the current block. Optionally, the determination of the prediction value of the current block based on the weight of the prediction value may also be performed on a block basis. For example, K prediction values of the current block are determined, and the K prediction values of the current block are weighted according to a weight matrix of the current block, so as to obtain the prediction value of the current block.

Manner 2, the decoding end refines the K initial prediction modes using the weight derivation mode. In this case, the operations at S103 include operations at S103-A and S103-B.

S103-A, K adjusted prediction modes are determined according to the weight derivation mode for the current block.

S103-B, the prediction value of the current block is determined according to the K adjusted prediction modes and the weight derivation mode for the current block.

In embodiments of the present disclosure, it may be considered that the GPM has K+1 elements, that is, a weight derivation mode and K prediction modes. Because a weight derivation mode and K prediction modes are jointly used to generate a prediction block for the current block, there are associations between the elements. For example, a current block contains the edge between two objects that are in relative motion, which is an ideal scenario for inter GPM. Then in theory, the "partition" should occur at the edge between the objects. However, in practice, there are a limited number of possibilities for "partition", and it is impossible to cover every kind of edge. In some cases, an approximate "partition" is selected. There may be more than one kind of approximate "partition". The selection of which "partition" depends on which "partition" generates an optimal result in combination with two prediction modes. Similarly, sometimes the selection of which prediction mode(s) depends on which combination leads to the optimal result, because even for a part for which the prediction mode is used, for a natural video, the part is very difficult to completely match the current block. The finally selected prediction mode may have the highest coding efficiency. Another scenario where GPM is often used is where the current block contains a part where there is relative motion in an object, for example, where twisting and deformation occurs due to swing or the like of an arm. In this case, the "partition" is more fuzzy, and may finally depend on which combination has the optimal result. Yet another scenario is in intra prediction. The texture of some parts in a natural image is very complex, some parts may contain a gradual change from one texture to another texture, and some parts may not be represented in a simple one direction. Intra GPM may provide a more complex prediction block, while an intra-coded block typically has larger residuals relative to an inter-coded block under the same quantization. Thus which prediction mode is selected may ultimately depend on which combination has the optimal result.

It can be seen that the K+1 elements would affect each other. Therefore, the prediction modes may be derived according to the weight derivation mode, and the weight derivation mode may also be derived according to the prediction modes. Further, it can be seen that some mode information may be refined. The "refine" refers to obtaining better mode information based on initial mode information by means of collecting more related information, using more calculation, etc. Generally, the "refinement" is an operation at the decoding end. Also, the motion information may be refined based on the template. In other words, based on initial motion information, searching in a small range is performed at the decoding end, and the motion information is optimized according a matching degree between the found motion information and the template. The matching degree between the found motion information and the template may be understood as the matching degree between the prediction value of the template based on the motion information and the reconstruction value of the template.

Accordingly, in GPM, the weight derivation mode may be first determined according to the prediction mode, and then the prediction mode(s) may be refined according to the weight derivation mode. Alternatively, the prediction mode(s) may be first determined according to the weight derivation mode, and then the weight derivation mode may be refined according to the prediction mode. The above two manners may be implemented alternatively if the complexity allows. The template acts as a link to the implementations of these methods. Further, the template weight acts as a link to the implementations of these methods. In other words, a cost on the template is calculated according to the prediction value of the template under the prediction mode and the weight of the sub-template or template corresponding to the weight derivation mode, and then the prediction mode or the weight derivation mode is derived or determined based on the cost on the template.

That is, in embodiments of the present disclosure, the weight derivation mode for the current block is determined according to the K initial prediction modes, then the initial prediction modes are refined using the weight derivation mode for the current block to obtain K adjusted prediction modes, and finally the prediction value of the current block is determined according to the weight derivation mode for the current block and the K adjusted prediction modes.

In the following, specific embodiments are described in detail for the process of determining the weight derivation mode for the current block according to the K initial prediction modes at S102 and the process of determining the K adjusted prediction modes according to the weight derivation mode for the current block at S103-A.

In some embodiments, operations at S102 include the following operations at S102-A to S102-C.

S102-A, N candidate weight derivation modes are determined, where Nis a positive integer greater than 1.

S102-B, for i-th candidate weight derivation mode in the N candidate weight derivation modes, a first cost corresponding to the i-th candidate weight derivation mode is determined according to the i-th candidate weight derivation mode and the K initial prediction modes, where i is a positive integer from 1 to N.

S102-C, the weight derivation mode for the current block is determined according to first costs respectively corresponding to the N candidate weight derivation modes.

In this embodiment, the decoding end first determines the N candidate weight derivation modes, which form a weight derivation mode list. Then the decoding end calculates the first cost corresponding to each of the N candidate weight derivation modes, and determines the weight derivation mode for the current block from the N candidate weight derivation modes according to the first costs.

For example, a candidate weight derivation mode with the lowest first cost among the N candidate weight derivation modes is determined as the weight derivation mode for the current block.

For another example, the N candidate weight derivation modes are sorted according to the first costs respectively corresponding to the N candidate weight derivation modes, so as to obtain a candidate weight derivation mode list. A weight derivation mode index is obtained by decoding the bitstream. Among the N candidate weight derivation modes, a candidate weight derivation mode corresponding to the weight derivation mode index is determined as the weight derivation mode for the current block.

Optionally, the first cost may be SAD, SATD, or SEE.

For each of the N candidate weight derivation modes, the process of determining the first cost corresponding to the candidate weight derivation mode is the same at the decoding end. For ease of description, the determination of the first cost corresponding to the i-th candidate weight derivation mode in the N candidate weight derivation modes is taken as an example.

The manner of determining the first cost corresponding to the i-th candidate weight derivation mode according to the i-th candidate weight derivation mode and the K initial prediction modes at S102-B includes but is not limited to the following.

Manner I, a template of the current block is predicted using the i-th candidate weight derivation mode and the K initial prediction modes, to obtain a first prediction value of the template, and the first cost corresponding to the i-th candidate weight derivation mode is determined according to the first prediction value of the template and a reconstruction value of the template.

Specifically, a template weight is determined according to the i-th candidate weight derivation mode. K initial prediction modes are used to predict the template separately, so as to obtain K prediction values of the template. The K prediction values corresponding to the template are weighted with the template weight, so as to obtain the prediction value of the template. For ease of description, the prediction value of the template is referred to as the first prediction value of the template. Then, a prediction cost of the i-th candidate weight derivation mode for the template is determined according to the first prediction value of the template and the reconstruction value of the template, where the prediction cost is referred to as the first cost corresponding to the i-th candidate weight derivation mode.

It should be noted that, for a specific process of determining the template weight according to the i-th candidate weight derivation mode, reference may be made to the foregoing description of determining the template weight according to the weight derivation mode, and details are not repeatedly described herein.

According to the method, a first cost corresponding to each of the N candidate weight derivation modes can be determined. Further, from the N candidate weight derivation modes, a candidate weight derivation mode with a lowest first cost is determined as the weight derivation mode for the current block. Alternatively, the N candidate weight derivation modes are sorted according to the first costs respectively corresponding to the N candidate weight derivation modes to obtain a candidate weight derivation mode list, and a candidate weight derivation mode corresponding to a weight derivation mode index in the candidate weight derivation mode list is determined as the weight derivation mode for the current block.

On the basis of the first manner, the determination of the K adjusted prediction modes according to the weight derivation mode for the current block in S103-A includes the following operations.

S103-A1: according to the weight derivation mode for the current block, K initial prediction modes are refined to obtain K adjusted prediction modes.

The implementation of S103-A1 includes, but is not limited to, the following examples.

Example 1, at least one prediction mode associated with the weight derivation mode for the current block is determined, where the at least one prediction mode may be a prediction mode with a prediction angle that is parallel or approximately parallel to a partition line of the weight derivation mode for the current block, or a prediction mode with a prediction angle that is perpendicular or approximately perpendicular to the partition line of the weight derivation mode for the current block. At least one initial prediction mode of the K initial prediction modes is replaced by a prediction mode in the at least one prediction mode associated with the weight derivation mode for the current block, to form multiple new combinations of prediction modes, where each of the combinations includes K prediction modes. For each of the new combinations of prediction modes, the K prediction modes included in that new combination and the weight derivation mode for the current block are used to predict the template, thus obtaining a prediction value of the template. According to the prediction value of the template and the reconstruction value of the template, a cost corresponding to that new combination of prediction modes is determined, thereby obtaining the costs respectively corresponding to the new combinations of prediction modes in the multiple new combinations of prediction modes formed as described above. Similarly, the current block is predicted using the weight derivation mode for the current block and the K initial prediction modes, and the cost corresponding to the K initial prediction modes is determined. In this way, the decoding end may obtain K adjusted prediction modes based on the cost corresponding to the new combination of prediction modes and the cost corresponding to the K initial prediction modes. For example, if the cost corresponding to new combination 1 of prediction modes is the lowest, the K prediction modes included in new combination 1 of prediction modes are determined as the K adjusted prediction modes, where new combination 1 may include at least one initial prediction mode, or may not include the initial prediction mode.

Example 2, the K initial prediction modes are refined by the following operations S103-A11 to S103-A14 to obtain K adjusted prediction modes:

S103-A11, a first template weight is determined according to the weight derivation mode for the current block.

The specific process of determining the first template weight according to the weight derivation mode for the current block can be referred to the specific description of the above embodiment of template weight derivation, which will not be repeated herein. In this case, the weight derivation mode in the above embodiment of template weight derivation is the weight derivation mode for the current block, and the corresponding template weight is the first template weight.

S103-A12: for a j-th initial prediction mode in the K initial prediction modes, M first candidate prediction modes corresponding to the j-th initial prediction mode are determined, where M is a positive integer greater than 1, and j is a positive integer from 1 to K.

It should be noted that the above operations S103-A12 and S103-A11 may be executed in any order, i.e., S103-A12 may be executed after S103-A11, before S103-A11, or in parallel with S103-A11, which is not limited herein.

In the example, the decoding end refines each of the K initial prediction modes using the weight derivation mode for the current block, so as to obtain an adjusted prediction mode corresponding to each of the K initial prediction modes, and thus obtain the K adjusted prediction modes.

The process of determining the corresponding adjusted prediction mode is the same for each of the K initial prediction modes. For ease of description, the embodiment of the present disclosure exemplarily describes the determination of the adjusted prediction mode corresponding to the j-th initial prediction mode among the K initial prediction modes.

In the embodiment of the present application, for a j-th initial prediction mode, a decoding end first determines M first candidate prediction modes corresponding to the j-th initial prediction mode.

The manner of determining the M first candidate prediction modes corresponding to the j-th initial prediction mode at the decoding end includes the following two cases.

Case 1: if the j-th initial prediction mode is an intra prediction mode, M intra prediction modes similar to the j-th initial prediction mode are determined as the M first candidate prediction modes. For example, if the j-th initial prediction mode is an angular prediction mode, M angular prediction modes whose angles are similar to (or close to) that of the j-th initial prediction mode are determined M first candidate prediction modes corresponding to the j-th initial prediction mode.

In case 2, if the j-th initial prediction mode is an inter prediction mode, a search is performed according to the j-th initial prediction mode to obtain M first motion information, and according to these M first motion information, the M first candidate prediction modes corresponding to the j-th initial prediction mode are determined. For example, for the j-th initial prediction mode with a motion vector (xInit, yInit), a search range is set to be, for example, a rectangular region from xInit−sR to xInit+sR in the horizontal direction and from yInit−sR to yInit+sR in the vertical direction, where the sR may be 2, 4, 8, and the like. Each motion vector within this rectangular region may be combined with other information of the j-th initial prediction mode, such as a reference picture index and a prediction list flag, etc., to determine one motion information and thus one prediction mode, such that M first candidate prediction modes corresponding to the j-th initial prediction mode may be obtained.

In some embodiments, one way of the above search according to the j-th initial prediction mode to obtain the M first motion information is as follows. A predetermined search range is searched based on a motion vector corresponding to the j-th initial prediction mode to obtain M offsets, each of which includes an offset in a first direction (e.g., an x-direction) and an offset in a second direction (e.g., a y-direction). Further, based on these M offsets, M first motion information is obtained. For example, for each of the M offsets, the motion vector corresponding to the j-th initial prediction mode is offset based on the offset, so as to obtain one first motion information.

S103-A13, a second cost corresponding to prediction of the template using each of the M first candidate prediction modes is determined according to the first template weight.

After the M first candidate prediction modes corresponding to the j-th initial prediction mode are determined according to the method in Case 1 or Case 2 above, the costs corresponding to these M first candidate prediction modes are determined, and then an adjusted prediction mode corresponding to the j-th initial prediction mode is determined according to the costs. For ease of description, the cost corresponding to the first candidate prediction mode in this case is denoted as the second cost.

Specifically, for each of the M first candidate prediction modes, the first candidate prediction mode is used to predict the template of the current block to obtain a prediction value. Then, the second cost corresponding to the first candidate prediction mode with respect to the template is determined according to the first template weight and the prediction value.

The following exemplarily describes calculation of the second cost of one of the M first candidate prediction modes with respect to the template.

For ease of illustration, taking the i-th sample in the template as an example, the i-th sample may be understood as any sample in the template, that is, the process of determining a second cost is the same for each sample in the template, and reference can be made to the i-th sample. Specifically, the prediction value of the template is obtained by predicting the template using the first candidate prediction mode, the prediction value corresponding to the i-th sample in the prediction value of the template is denoted as an i-th prediction value, and the reconstruction value corresponding to the i-th sample in the reconstruction value of the template is recorded as an i-th reconstruction value. Then, the second cost corresponding to the first candidate prediction mode at the i-th sample is determined according to the i-th prediction value, the i-th reconstruction value, and the weight of the i-th sample in the first template weight. According to the above method, second cost(s) of the first candidate prediction mode at each sample or at multiple samples in the template is determined, and then the second cost of the first candidate prediction mode with respect to the template is determined according to the second cost(s) at each sample or the multiple samples in the template. For example, a sum of second costs of the first candidate prediction mode at samples in the template is determined as the second cost of the first candidate prediction mode with respect to the template.

Exemplarily, taking an SAD cost as an example, the cost of the first candidate prediction mode at the i-th sample (x, y) in the template may be determined according to the following formula (1):

$$tempValueA[x][y] = \mathrm{abs}(predTemplateSamplesCandA([x][y] - recTemplateSamples[x][y]) * wTemplateValue[x][y]1 \quad (1)$$

Exemplarily, the second cost corresponding to the first candidate prediction mode with respect to the template is determined according to the following formula (2):

$$costCandA = \sum tempValueA[x][y] \quad (2)$$

abs(predTemplateSamplesCandA[x][y]−recTemplateSamples[x][y]) is an absolute value of a difference between the prediction value predTemplateSamplesCandA and a reconstruction value recTemplateSamples of sample (x, y) in the template. The absolute value of the difference is referred to as the second cost corresponding to sample (x, y). The value is multiplied by a weight wTemplateValue[x][y] in the first template weight, so as to obtain tempValueA[x][y]. tempValueA[x][y] may be considered as the second cost corresponding to the first candidate prediction mode at sample (x, y). A total second cost costCandA of the first candidate prediction mode in the template is a sum of the second cost at each sample in the template.

It should be noted that, the second cost corresponding to the first candidate prediction mode with respect to the template is determined exemplarily according to the SAD. Optionally, the second cost corresponding to the first candidate prediction mode with respect to the template may also be determined according to calculation methods of cost such as SATD and MSE.

According to the foregoing method, the second cost of each of the M first candidate prediction modes may be determined, and then the following operation S103-A14 is performed.

S103-A14, an adjusted prediction mode corresponding to the j-th initial prediction mode is determined according to the second cost corresponding to each of the M first candidate prediction modes.

For example, a first candidate prediction mode with the lowest second cost among the M first candidate prediction modes is determined as the adjusted prediction mode corresponding to the j-th initial prediction mode.

The above embodiments exemplarily describes determination of the adjusted prediction mode corresponding to the j-th initial prediction mode among the K initial candidate prediction modes. With this reference, for each initial prediction mode among the K initial candidate prediction modes, a corresponding adjusted prediction mode can be determined, so as to obtain K adjusted prediction modes.

In this manner I, the decoding end firstly determines the weight derivation mode for the current block according to the K initial prediction modes, then refines the K initial prediction modes according to the weight derivation mode for the current block, such as by the manner of example 1 or example 2, to obtain K adjusted prediction modes, and finally obtains the prediction value of the current block by predicting the current block using the weight derivation mode for the current block and the K adjusted prediction modes.

In embodiments of the present disclosure, in addition to the above manner I, the decoding end may also determine the weight derivation mode for the current block and the K adjusted prediction modes by using the following manner II.

Manner II, the refinement of the prediction mode and the determination of the weight derivation mode for the current block are fused together and performed in parallel. In this case, the determination of the first cost corresponding to the i-th candidate weight derivation mode in S102-B above, according to the i-th candidate weight derivation mode and the K initial prediction modes, includes the operations at S102-B11 to S102-B12 as follows.

S102-B11, the K initial prediction modes are refined according to the i-th candidate weight derivation mode to obtain K first refined prediction modes corresponding to the i-th candidate weight derivation mode.

In this manner II, for the i-th candidate weight derivation mode among the N candidate weight derivation modes, the K initial prediction modes are first refined using the i-th candidate weight derivation mode, so as to obtain the K refined prediction modes corresponding to the i-th candidate weight derivation mode. For convenience of description, the K refined prediction modes corresponding to the i-th candidate weight derivation mode are denoted herein as K first refined prediction modes. Then the i-th candidate weight derivation mode and the K first refined prediction modes corresponding to the i-th candidate weight derivation mode, are used to determine the first cost corresponding to the i-th candidate weight derivation mode, so that a more accurate weight derivation mode and more accurate K adjusted prediction modes for the current block can be obtained.

The implementation of S102-B11 includes, but is not limited to, the following examples.

Example 1, at least one prediction mode associated with the i-th candidate weight derivation mode is determined, where the at least one prediction mode may be a prediction mode with a prediction angle that is parallel or approximately parallel to a partition line of the i-th candidate weight derivation mode or a prediction mode with a prediction angle that is perpendicular or approximately perpendicular to the partition line of the i-th candidate weight derivation mode. At least one initial prediction mode of the K initial prediction modes is replaced by a prediction mode in the at least one prediction mode associated with the i-th candidate weight derivation mode, to form multiple new combinations of prediction modes, where each of the combinations includes K prediction modes. For each of the new combinations of prediction modes, the K prediction modes included in that new combination and the i-th candidate weight derivation mode are used to predict the template, thus obtaining a prediction value of the template. According to the prediction value of the template and the reconstruction value of the template, a cost corresponding to that new combination of prediction modes is determined, thereby obtaining the cost corresponding to each of the new combinations of prediction modes in the multiple new combinations of prediction modes formed as described above. Similarly, the current block is predicted using the i-th candidate weight derivation mode and the K initial prediction modes, and the cost corresponding to the K initial prediction modes is determined. In this way, the decoding side may obtain K first refined prediction modes based on the cost corresponding to the new combination of prediction modes and the cost corresponding to the K initial prediction modes. For example, if the cost corresponding to new combination 1 of prediction modes is the lowest, the K prediction modes included in new combination 1 of prediction modes are determined as the K first refined prediction modes, where new combination 1 may include at least one initial prediction mode, or may not include the initial prediction mode.

Example 2, the refinement of the K initial prediction modes is performed by the operations of S102-B11-1 to S102-B11-4 below to obtain the K first refined prediction modes corresponding to the i-th candidate weight derivation mode.

S102-B11-1, a second template weight is determined according to the i-th candidate weight derivation mode.

The specific process of determining the second template weight according to the i-th candidate weight derivation mode can be referred to the specific description of the above embodiment of template weight derivation, which will not be repeated herein. In this case, the weight derivation mode is the i-th candidate weight derivation mode, and the corresponding template weight is the second template weight.

S102-B11-2, for an j-th initial prediction mode among the K initial prediction modes, determine M first candidate prediction modes corresponding to the j-th initial prediction mode, where M is a positive integer, and j is a positive integer from 1 to K.

It should be noted that the above operations S102-B11-2 and S102-B11-1 may be executed in any order, i.e., S102-B11-2 may be executed after S102-B11-1, before S102-B11-1, or in parallel with S102-B11-1, which is not limited herein.

In the example, the decoding end refines each of the K initial prediction modes using the i-th candidate weight derivation mode, so as to obtain a first refined prediction mode corresponding to each of the K initial prediction modes under the i-th candidate weight derivation mode, and thus obtain the K first refined prediction modes.

The process of determining the corresponding first refined prediction mode is the same for each of the K initial prediction modes. For ease of description, the embodiment of the present disclosure exemplarily describes the determination of the first refined prediction mode corresponding to the j-th initial prediction mode among the K initial prediction modes.

In the embodiment of the present application, for the j-th initial prediction mode, the decoding end first determines M first candidate prediction modes corresponding to the j-th initial prediction mode.

The manner of determining the M first candidate prediction modes corresponding to the j-th initial prediction mode at the decoding end includes the following two cases.

Case 1, if the j-th initial prediction mode is an intra prediction mode, M intra prediction modes similar to the j-th initial prediction mode are determined as the M first candidate prediction modes.

Case 2, if the j-th initial prediction mode is an inter prediction mode, a search is performed according to the j-th initial prediction mode to obtain M first motion information, and according to these M first motion information, the M first candidate prediction modes corresponding to the j-th initial prediction mode are determined.

In some embodiments, one way of the above search according to the j-th initial prediction mode to obtain the M first motion information is as follows. A predetermined search range is searched based on a motion vector corresponding to the j-th initial prediction mode to obtain M offsets, each of which includes an offset in a first direction (e.g., an x-direction) and an offset in a second direction (e.g., a y-direction). Further, based on these M offsets, M first motion information is obtained. For example, for each of the M offsets, the motion vector corresponding to the j-th initial prediction mode is offset based on the offset, so as to obtain one first motion information.

S102-B11-3, a third cost corresponding to prediction of the template using each of the M first candidate prediction modes is determined according to the second template weight.

After the M first candidate prediction modes corresponding to the j-th initial prediction mode are determined according to the method in Case 1 or Case 2 above, the cost corresponding to these M first candidate prediction modes is determined, and then the first refined prediction mode corresponding to the j-th initial prediction mode is determined according to the cost. For ease of description, the cost corresponding to the first candidate prediction mode in this case is denoted as the third cost.

Specifically, for each of the M first candidate prediction modes, the template of the current block is predicted using the first candidate prediction mode to obtain a prediction value, and then a third cost of the first candidate prediction mode with respect to the template according to the second template weight and the prediction value.

The following is an example of calculating the third cost of one of the M first candidate prediction modes with respect to the template.

For ease of description, the i-th sample in the template is taken as an example. The i-th sample can be understood as any point in the template, which means that the process of determining the third cost is the same for each point in the template and reference may be made to the i-th sample. Specifically, the template is predicted using the first candidate prediction mode to obtain prediction values of the template. A prediction value corresponding to the i-th sample in the prediction values of the template is denoted as the i-th prediction value, a reconstruction value corresponding to the i-th sample in the reconstruction values of the template is denoted as the i-th reconstruction value, and then, according to the i-th prediction value and the i-th reconstruction value as well as a weight of the i-th sample in the second template weights, a third cost of the first candidate prediction mode at the i-th sample is determined. According to the above method, the third cost(s) of the first candidate prediction mode at each sample or multiple samples in the template is determined, and thus a third cost of the first candidate prediction mode with respect to the template is determined according to the third cost(s) at each sample or multiple samples in the template. For example, the sum of the third costs of the first candidate prediction mode at samples in the template is determined as the third cost of the first candidate prediction mode with respect to the template.

Exemplarily, the third cost of the first candidate prediction mode with respect to the template may be determined with reference to the above formulas (1) and (2). Specifically, wTemplateValue[x][y] in the above formula (1) is replaced with the corresponding weight value of the sample (x, y) in the second template weights.

According to the above method, the third cost corresponding to each of the M first candidate prediction modes can be determined, and then, the following S102-B11-4 is performed.

S102-B11-4, a first refined prediction mode corresponding to the j-th initial prediction mode is determined according to the third cost corresponding to each of the M first candidate prediction modes.

For example, a first candidate prediction mode with the lowest third cost among the M first candidate prediction modes is determined as the first refined prediction mode corresponding to the j-th initial prediction mode.

The above embodiment exemplarily describes determination of the first refined prediction mode corresponding to the j-th initial prediction mode among the K initial prediction modes. With reference to the above description, the first refined prediction mode corresponding to each initial prediction mode among the K initial prediction modes can be determined, thus obtaining the K first refined prediction modes under the i-th candidate weight derivation mode.

S102-B12, a first cost corresponding to the i-th candidate weight derivation mode is determined according to the i-th candidate weight derivation mode and the K first improved prediction modes.

Exemplarily, the template of the current block is predicted using the i-th candidate weight derivation mode and the K first refined prediction modes to obtain a second prediction value of the template, and a first cost corresponding to the i-th candidate weight derivation mode is determined according to the second prediction value of the template and the reconstruction value of the template. For example, a second template weight is derived using the i-th candidate weight derivation mode, the template is predicted using the K first refined prediction modes respectively to obtain K prediction values, the K prediction values are weighted using the second template weight to obtain a second prediction value of the template, and according to the second prediction value of the template and the reconstruction value of the template, the first cost corresponding to the i-th candidate weight derivation mode is determined.

The above describes exemplarily the determination of the first cost corresponding to the i-th candidate weight derivation mode. For each candidate weight derivation mode among the N candidate weight derivation modes, the above manner for determination of the first cost corresponding to the i-th candidate weight derivation mode can be used, so as to determine the first cost corresponding to each of the N candidate weight derivation modes, and then determine the weight derivation mode for the current block according to the first cost corresponding to each of among the N candidate weight derivation modes.

For example, the candidate weight derivation mode with the lowest first cost among the N candidate weight derivation modes is determined as the weight derivation mode for the current block.

For another example, according to the first cost corresponding to each of the N candidate weight derivation modes, the N candidate weight derivation modes are sorted to obtain a candidate weight derivation mode list. The bitstream is decoded to obtain a weight derivation mode index. A weight derivation mode corresponding to the candidate weight derivation mode index in the candidate weight derivation mode list is determined to be the weight derivation mode for the current block.

In this manner II, K first refined prediction modes corresponding to each of the N candidate weight derivation modes are determined. Based on this, determination of the K adjusted prediction modes according to the weight derivation mode for the current block in the above S103-A includes the following operations.

S103-A2, the K first refined prediction modes corresponding to the weight derivation mode for the current block are determined as the K adjusted prediction modes.

In this manner II, the refinement of the prediction modes and the determination of the weight derivation mode for the current block are fused together, i.e., during determining the first costs corresponding to the N candidate weight derivation modes, the K first refined prediction modes corresponding to each candidate weight derivation mode are determined. Therefore, after determining the weight derivation mode for the current block according to the first cost, the K first refined prediction modes corresponding to the weight derivation mode for the current block may be determined as K adjusted prediction modes, and then the current block may be predicted using the weight derivation mode for the current block and the K adjusted prediction modes to obtain the prediction value of the current block.

In this manner II, for each candidate weight derivation mode among the N candidate weight derivation modes, K first refined prediction modes corresponding to the candidate weight derivation mode are determined, and then the template is predicted according to each candidate weight derivation mode and its corresponding K first refined prediction modes to determine first costs, based on which the weight derivation mode for the current block can be more accurately determined from the N candidate weight derivation modes.

In embodiments of the present application, in addition to the above manner I and manner II, the decoding end may determine the weight derivation mode for the current block and the K adjusted prediction modes in the following manner III.

Manner III, in order to reduce the computational complexity, for the refinement of initial prediction modes, instead of using each of the candidate weight derivation modes to refine the initial prediction modes, simple P sub-templates, such as an all template, a left template, and an above template of the current block, are used to refine the initial prediction modes, so as to reduce the computational amount of refinement of the initial prediction modes. In this case, the determination of the first cost corresponding to the i-th candidate weight derivation mode according to the i-th candidate weight derivation mode and the K initial prediction modes in the above S102-B includes the operations of S102-B21 to S102-B23 as follows.

S102-B21, for the j-th initial prediction mode in the K initial prediction modes, second refined prediction modes for the j-th initial prediction mode with respect to P sub-templates respectively are determined, where P is a positive integer and j is a positive integer from 1 to K.

In this manner III, the decoding end refines the K initial prediction modes using the P sub-templates to obtain second refined prediction modes for each of the K initial prediction modes with respect to the P sub-templates. For each candidate weight derivation mode among the N candidate weight derivation modes, according to a correspondence between the candidate weight derivation mode and the P sub-templates, from the second refined prediction modes of each initial prediction mode among the K initial prediction modes with respect to the P sub-templates, the K second refined prediction modes corresponding to the candidate weight derivation mode are obtained, and then the template of the current block is predicted according to the candidate weight derivation mode and its corresponding K second prediction modes, so as to determine the first cost corresponding to that candidate weight derivation mode. Finally, a weight derivation mode for the current block is determined according to the first cost corresponding to each of the N candidate weight derivation modes. In manner III, the candidate prediction modes are no longer used individually to refine the K initial prediction modes, thus reducing the complexity of refinement of the initial prediction modes.

Exemplarily, the P sub-templates include at least one of the left template TM_L, the above template TM_A, and the all template TM_AL of the current block, where the all template TM_AL includes the left template TM_L and the above template TM_A.

In embodiments of the present disclosure, for each of the K initial prediction modes, the process of determining second refined prediction modes with respect to the P sub-templates at the decoding end is the same. For ease of description, the embodiments of the present application exemplarily describes the determination of second refined prediction modes of the j-th initial prediction mode in the K initial prediction modes with respect to the P sub-templates.

In one example, assuming that the P sub-templates include the left template TM_L, the above template TM_A, and the all template TM_AL of the current block, determination of second refined prediction modes of the j-th initial prediction mode with respect to the P sub-templates includes the following. A second refined prediction mode corresponding to the j-th initial prediction mode with respect to the left template TM_L is determined, a second refined prediction mode corresponding to the j-th initial prediction mode with respect to the above template TM_A is determined, and a second refined prediction mode corresponding to the j-th initial prediction mode with respect to the all template TM_AL is determined. That is, in this operation, with respect to each of the P sub-templates, the decoding end determines one second refined prediction mode corresponding to the j-th initial prediction mode.

The specific manner of determining the second refined prediction modes of the j-th initial prediction mode with respect to the P sub-templates is not limited in embodiments of the present disclosure.

In some embodiments, S102-B21 includes S102-B21-1 to S102-B21-3 as follows.

S102-B21-1, M first candidate prediction modes corresponding to the j-th initial prediction mode are determined, where M is a positive integer greater than 1.

The manner of determining the M first candidate prediction modes corresponding to the j-th initial prediction mode at the decoding end includes the following two cases.

Case 1, if the j-th initial prediction mode is an intra prediction mode, M intra prediction modes similar to the j-th initial prediction mode are determined as M first candidate prediction modes.

In case 2, if the j-th initial prediction mode is an inter prediction mode, a search is performed according to the j-th initial prediction mode to obtain M first motion information, and based on these M first motion information, M first candidate prediction modes corresponding to the j-th initial prediction mode are determined.

In some embodiments, searching according to the j-th initial prediction mode to obtain M first motion information includes: searching according to the i-th initial prediction mode to obtain M offsets, and obtaining M first motion information according to the M offsets.

S102-B21-2, for the p-th sub-template in the P sub-templates, fourth costs corresponding to prediction of the p-th sub-template using the M first candidate prediction modes respectively are determined, where p is a positive integer from 1 to P.

After determining the M first candidate prediction modes corresponding to the j-th initial prediction mode according to the method in Case 1 or Case 2 above, the decoding end determines the cost corresponding to each of these M first candidate prediction modes with respect to each of the P sub-templates, and then determines the second refined prediction mode corresponding to the j-th initial prediction mode with respect to each of the P sub-templates according to the costs. For ease of description, the cost corresponding to the first candidate prediction mode in this case is denoted as the fourth cost.

Specifically, taking the p-th sub-template among the P sub-templates as an example, for any the M first candidate prediction modes, the p-th sub-template is predicted using the first candidate prediction mode to obtain a prediction value of the p-th sub-template. According to the prediction value of the p-th sub-template and a reconstruction value of the p-th sub-template, a fourth cost of the first candidate prediction mode with respect to the p-th sub-template is determined. With reference to the method, for each of the M first candidate prediction modes, fourth costs with respect to the P sub-templates respectively may be determined.

By way of example, assume that the j-th initial prediction mode corresponds to three first candidate prediction modes, denoted as first candidate prediction mode 1, first candidate prediction mode 2, and first candidate prediction mode 3, respectively, and assume that the P sub-templates include the left template TM_L, the above template TM_A, and the all template TM_AL. Firstly, for the left template TM_L, the left template TM_L is predicted using first candidate prediction mode 1, first candidate prediction mode 2, and first candidate prediction mode 3 respectively, so as to obtain prediction value 1, prediction value 2, and prediction value 3 respectively. Next, a fourth cost of first candidate prediction mode 1 with respect to the left template TM_L is determined according to prediction value 1 and a reconstruction value of the left template TM_L, a fourth cost of first candidate prediction mode 2 with respect to the left template TM_L is determined according to prediction value 2 and the reconstruction value of the left template TM_L, and a fourth cost of first candidate prediction mode 3 with respect to the left template TM_L is determined according to prediction value 3 and the reconstruction value of the left template TM_L.

Similarly, for the above template TM_A, the above template TM_A is predicted using first candidate prediction mode 1, first candidate prediction mode 2, and first candidate prediction mode 3 respectively, so as to obtain prediction value 4, prediction value 5, and prediction value 6 respectively. Next, a fourth cost of first candidate prediction mode 1 with respect to the above template TM_A is determined according to prediction value 4 and a reconstruction value of the above template TM_A, a fourth cost of first candidate prediction mode 2 with respect to the above template TM_A is determined according to prediction value 5 and the reconstruction value of the above template TM_A, and a fourth cost of first candidate prediction mode 3 with respect to the above template TM_A is determined according to prediction value 6 and the reconstruction value of the above template TM_A.

Similarly, for the all template TM_AL, the all template TM_AL is predicted using first candidate prediction mode 1, first candidate prediction mode 2, and first candidate prediction mode 3 respectively, so as to obtain prediction value 7, prediction value 8, and prediction value 9 respectively. Next, a fourth cost of first candidate prediction mode 1 with respect to the all template TM_AL is determined according to prediction value 7 and a reconstruction value of the all template TM_AL, a fourth cost of first candidate prediction mode 2 with respect to the all template TM_AL is determined according to prediction value 8 and the reconstruction value of the all template TM_AL, and a fourth cost of first candidate prediction mode 3 with respect to the all template TM_AL is determined according to prediction value 9 and the reconstruction value of the all template TM_AL.

According to the above method, for each of the M first candidate prediction modes corresponding to the j-th initial prediction mode, the fourth costs with respect to the P sub-templates are determined respectively, and then the following S102-B21-3 is performed.

S102-B21-3, a second refined prediction mode for the j-th initial prediction mode with respect to the p-th sub-template is determined according to the fourth costs of the M first candidate prediction modes with respect to the p-th sub-template, respectively.

For example, among the M first candidate prediction modes, a first candidate prediction mode corresponding to the lowest fourth cost with respect to the p-th sub-template is determined as the second refined prediction mode corresponding to the j-th initial prediction mode with respect to the p-th sub-template.

Continuing with the above example, assume that the j-th initial prediction mode corresponds to three first candidate prediction modes, denoted as first candidate prediction mode 1, first candidate prediction mode 2, and first candidate prediction mode 3, respectively, and assume that the P sub-templates include the left template TM_L, the above template TM_A, and the all template TM_AL. For the left template TM_L, assume that a fourth cost of first candidate prediction mode 1 with respect to the left template TM_L is lower than a fourth cost of first candidate prediction mode 2 with respect to the left template TM_L, and the fourth cost of first candidate prediction mode 2 with respect to the left template TM_L is lower than a fourth cost of first candidate prediction mode 3 with respect to the left template TM_L, then first candidate prediction mode 1 may be determined as a second refined prediction mode corresponding to the j-th initial prediction mode with respect to the left template TM_L.

Similarly, for the above template TM_A, assume that a fourth cost of first candidate prediction mode 2 with respect to the above template TM_A is lower than a fourth cost of first candidate prediction mode 1 with respect to the above template TM_A, and the fourth cost of first candidate prediction mode 1 with respect to the above template TM_A is lower than a fourth cost of first candidate prediction mode 3 with respect to the above template TM_A, then first candidate prediction mode 2 may be determined as a second refined prediction mode corresponding to the j-th initial prediction mode with respect to the above template TM_A.

Similarly, for the all template TM_AL, assume that a fourth cost of first candidate prediction mode 2 with respect to the all template TM_AL is lower than a fourth cost of first candidate prediction mode 1 with respect to the all template TM_AL, and the fourth cost of first candidate prediction mode 1 with respect to the all template TM_AL is lower than a fourth cost of first candidate prediction mode 3 with respect to the all template TM_AL, then first candidate prediction mode 2 may be determined as a second refined prediction mode corresponding to the j-th initial prediction mode with respect to the all template TM_AL.

According to the above method, a second refined prediction mode with respect to each of the P sub-templates may be determined for each of the K initial prediction modes.

Exemplarily, assume that K=2, i.e., the 2 initial prediction modes are denoted as the first prediction mode and the second prediction mode, and assume that the P sub-templates are the left template TM_L, the above template TM_A, and the all template TM_AL. According to the method described above, second refined prediction modes for each of the first prediction mode and the second prediction mode with respect to the left template TM_L, the above template TM_A, and the all templates respectively are determined and shown in Table 6.

TABLE 6

| | Left template TM_L | Above template TM_A | All Template TM_AL |
|---|---|---|---|
| Second refined prediction mode corresponding to the first prediction mode | Second refined prediction mode 11 | Second refined prediction mode 12 | Second refined prediction mode 13 |
| Second refined prediction mode corresponding to the second prediction mode | Second refined prediction mode 21 | Second refined prediction mode 22 | Second refined prediction mode 23 |

S102-B22, according to the i-th candidate weight derivation mode, K second refined prediction modes corresponding to the i-th candidate weight derivation mode are determined from the K second refined prediction modes of the K initial prediction modes with respect to the P sub-templates, respectively.

Specifically, for an i-th candidate weight derivation mode among the N candidate weight derivation modes, according to the sub-template corresponding to the i-th candidate weight derivation mode, K second refined prediction modes corresponding to the i-th candidate weight derivation mode are determined from the second refined prediction modes of each of the K initial prediction modes with respect to the P sub-templates.

For example, taking K=2 as an example, the sub-templates corresponding to the i-th candidate weight derivation mode are the above template TM_A and the all template TM_AL. Referring to the above Table 6, it can be determined that the second refined prediction mode corresponding to the first prediction mode with respect to the above template TM_A is second refined prediction mode 12, and the second refined prediction mode corresponding to the second prediction mode with respect to the all template TM_AL is second refined prediction mode 23. Therefore, the two second refined prediction modes corresponding to the i-th candidate weight derived mode may be determined as second refined prediction mode 12 and second refined prediction mode 23.

In one possible implementation, the decoding end determines a partition angle corresponding to the i-th candidate weight derivation mode, and according to the correspondence between the partition angles and the templates of the prediction modes (with specific reference to Table 5 above), determines the K second refined prediction modes corresponding to the i-th candidate weight derivation mode from the second refined prediction modes of the K initial prediction modes with respect to the P sub-templates, respectively.

Exemplarily, taking K=2 as an example, according to the above Table 2, an angle index corresponding to the i-th candidate weight derivation mode is determined. For example, if the i-th candidate weight derivation mode is 27, the corresponding angle index is 12. In the correspondence between the partition angles and templates of the prediction modes illustrated in the above Table 5, a template corresponding to the first prediction mode and a template corresponding to the second prediction mode under the angle index are queried. Then, according to the template corresponding to the first prediction mode and the template corresponding to the second prediction mode, two second refined prediction modes corresponding to the i-th candidate weight derivation mode are determined from the above Table 6. For example, it is found from Table 5 that the template corresponding to the first prediction mode is the above template TM_A, and the template corresponding to the second prediction mode under the angle index is the all template TM_AL, and then from Table 6, second refined prediction mode 12 corresponding to the above template TM_A in the second refined prediction modes corresponding to the first prediction mode, and second refined prediction mode 23 corresponding to the all template TM_AL in the second refined prediction modes corresponding to the second prediction mode corresponding to the second prediction mode, are determined as the two second refined prediction modes corresponding to the i-th candidate weights derivation mode.

According to the above method, K second refined prediction modes corresponding to the i-th candidate weight mode among the N candidate weight derivation modes are determined, and then S102-B23 is performed as follows.

S102-B23, according to the i-th candidate weight derivation mode and the K second refined prediction modes corresponding to the i-th candidate weight derivation mode, a first cost corresponding to the i-th candidate weight derivation mode is determined.

Specifically, the template of the current block is predicted using the i-th candidate weight derivation mode and the K second refined prediction modes to obtain a third prediction value of the template, and a first cost corresponding to the i-th candidate weight derivation mode is determined according to the third prediction value of the template and the reconstruction value of the template. For example, the template weights are determined based on the i-th candidate weight derivation mode, the template of the current block are predicted using the K second refined prediction modes respectively to obtain K prediction values, the K prediction values are weighted using the determined template weights to obtain a prediction value of the template corresponding to the i-th candidate weight derivation mode, and then the first cost corresponding to the i-th candidate weight derivation mode is determined according to the prediction value and the reconstruction value of the template.

The above exemplarily describes determination of the first cost corresponding to the i-th candidate weight derivation mode. For each candidate weight derivation mode among the N candidate weight derivation modes, the above manner of determining the first cost corresponding to the i-th candidate weight derivation mode may be used, so as to determine the first costs corresponding to the N candidate weight derivation modes respectively. Then the weight derivation mode for the current block is determined according to the first costs corresponding to the N candidate weight derivation modes respectively.

For example, a candidate weight derivation mode with the lowest first cost among the N candidate weight derivation modes is determined as the weight derivation mode for the current block.

For another example, according to the first cost corresponding to each of the N candidate weight derivation modes, the N candidate weight derivation modes are sorted to obtain a candidate weight derivation mode list. The bitstream is decoded to obtain a weight derivation mode index. A candidate weight derivation mode corresponding to the weight derivation mode index in the candidate weight derivation mode list is determined to be the weight derivation mode for the current block.

In this manner III, the K initial prediction modes are refined using the P sub-templates to obtain a second refined prediction mode for each of the K initial prediction modes with respect to each of the P sub-templates. In this way, in subsequent determination of the first cost corresponding to each candidate weight derivation mode among the N candidate weight derivation modes, the K initial prediction modes are no longer refined separately according to the different candidate weight derivation modes, but the K second refined prediction modes corresponding to each candidate weight derivation mode are queried from the second refined prediction modes for each of the K initial prediction mode with respect to each of the P sub-templates, thereby reducing the complexity of refining the initial prediction modes and increasing the speed of calculating the first cost corresponding to each candidate weight derivation mode, so that the weight derivation mode for the current block can be quickly determined from the N candidate weight derivation modes.

In this manner III, based on the P sub-templates, K second refined prediction modes corresponding to each of the N candidate weight derivation modes are determined. Based on this, the manner of determining the K adjusted prediction modes according to the weight derivation mode for the current block in the above S103-A includes, but is not limited to, the following.

Manner 1, the K second refined prediction modes corresponding to the weight derivation mode for the current block are determined as the K adjusted prediction modes.

In manner III above, during determining the first cost corresponding to each of the N candidate weight derivation modes, K second refined prediction modes corresponding to each candidate weight derivation mode are determined. In this case, after determining the weight derivation mode for the current block according to the first cost, the K second refined prediction modes corresponding to the weight derivation mode for the current block can be directly determined as the K adjusted prediction modes.

Manner 2, in order to further improve the accuracy of the K adjusted prediction modes, the K second refined prediction modes corresponding to the weight derivation mode for the current block are refined to obtain the K adjusted prediction modes. In this case, the above S103-A includes the following operations.

S103-A3, the K second refined prediction modes are refined according to the weight derivation mode for the current block to obtain the K adjusted prediction modes.

The implementation of S103-A3 includes, but is not limited to, the following examples.

Example 1, at least one prediction mode associated with the weight derivation mode for the current block is determined, where the at least one prediction mode may be a prediction mode with a prediction angle that is parallel or approximately parallel to a partition line of the weight derivation mode for the current block or a prediction mode with a prediction angle that is perpendicular or approximately perpendicular to the partition line of the weight derivation mode for the current block. At least one of the K second refined prediction modes is replaced by a prediction mode in the at least one prediction mode associated with the weight derivation mode for the current block, to form multiple new combinations of prediction modes, where each of the combinations includes K prediction modes. For each of the new combinations of prediction modes, the K prediction modes included in that new combination and the weight derivation mode for the current block are used to predict the template, thus obtaining a prediction value of the template. According to the prediction value of the template and the reconstruction value of the template, a cost corresponding to that new combination of prediction modes is determined, thereby obtaining the cost corresponding to each of the new combinations of prediction modes in the multiple new combinations of prediction modes formed as described above. Similarly, the current block is predicted using the weight derivation mode for the current block and the K initial prediction modes, and the cost corresponding to the K second refined prediction modes is determined. In this way, the decoding side may obtain K adjusted prediction modes based on the cost corresponding to the new combination of prediction modes and the costs corresponding to the K second refined prediction modes. For example, if the cost corresponding to new combination 1 of prediction modes is the lowest, the K prediction modes included in new combination 1 of prediction modes are determined as the K adjusted prediction modes, where new combination 1 may include at least one initial prediction mode, or may not include the initial prediction mode.

In Example 2, the K second prediction modes are refined to obtain the K adjusted prediction modes according to the operations from S103-A31 to S103-A34 as follows.

S103-A31, the first template weight is determined according to the weight derivation mode for the current block.

S103-A32, for the k-th second refined prediction mode among the K second refined prediction modes, P second candidate prediction modes corresponding to the k-th second refined prediction mode are determined, where P is a positive integer greater than 1, and k is a positive integer from 1 to K.

It should be noted that the above operations S103-A32 and S103-A31 may be executed in any order, i.e., S103-A32 may be executed after S103-A31, before S103-A31, or in parallel with S103-A31, which is not limited herein.

In this example, the decoding end refines each of the K second refined prediction modes using the weight derivation mode for the current block to obtain an adjusted prediction mode corresponding to each of the K second refined prediction modes, and thus the K adjusted prediction modes are obtained.

The process of determining the adjusted prediction mode is the same for each second refined prediction mode among the K second refined prediction modes. For ease of description, the embodiments of the present application exemplarily describes the determination of the adjusted prediction mode corresponding to the k-th second refined prediction mode among the K second refined prediction modes.

In an embodiment of the present application, for the k-th second refined prediction mode, the decoding end first determines P second candidate prediction modes corresponding to the k-th second refined prediction mode.

The manner for the decoding end to determine the P second candidate prediction modes corresponding to the k-th second refined prediction mode includes the following two cases.

Case 1, if the k-th second refined prediction mode is an intra prediction mode, P intra prediction modes that are similar to the k-th second refined prediction mode are determined as the P second candidate prediction modes. For example, if the k-th second refined prediction mode is an angular prediction mode, P angular prediction modes with angles that are similar (or close) to the angle of the k-th second refined prediction mode are determined as the P second candidate prediction modes corresponding to the k-th second refined prediction mode.

Case 2, if the k-th second refined prediction mode is an inter prediction mode, a search is performed based on the k-th second refined prediction mode to obtain P second motion information, and based on these P second motion information, P second candidate prediction modes corresponding to the k-th second refined prediction mode are determined. For example, for the k-th second refined prediction mode with a motion vector (xInit, yInit), a search range is set to be, for example, a rectangular region from xInit−sR to xInit+sR in the horizontal direction and from yInit−sR to yInit+sR in the vertical direction, where the sR may be 2, 4, 8, and the like. Each motion vector within this rectangular region may be combined with other information of the k-th second refined prediction mode, such as a reference picture index and a prediction list flag, etc., to determine one motion information and thus one prediction mode, such that P second candidate prediction modes corresponding to the k-th second refined prediction mode may be obtained.

In some embodiments, one way of the above search according to the k-th second refined prediction mode to obtain the P second motion information is as follows. A predetermined search range is searched based on a motion vector corresponding to the k-th second refined prediction mode to obtain P offsets, each of which includes an offset in a first direction (e.g., an x-direction) and an offset in a second direction (e.g., a y-direction). Further, based on these P offsets, P second motion information is obtained. For example, for each of the P offsets, the motion vector corresponding to the k-th second refined prediction mode is offset based on the offset, so as to obtain one second motion information.

S103-A33, a fifth cost corresponding to prediction of the template using each of the P second candidate prediction modes is determined according to the second template weight.

After the P second candidate prediction modes corresponding to the k-th second refined prediction mode are determined according to the method in Case 1 or Case 2 above, the costs corresponding to these P second candidate prediction modes are determined, and then an adjusted prediction mode corresponding to the k-th second refined prediction mode is determined according to the costs. For ease of description, the cost corresponding to the second candidate prediction mode in this case is denoted as the fifth cost.

Specifically, for each of the P second candidate prediction modes, the template of the current block is predicted using the second candidate prediction mode to obtain one prediction value, and then a fifth cost of the second candidate prediction mode with respect to the template is determined based on the second template weight and the prediction value. Taking a sample on the template as an example, the sample is predicted using the second candidate prediction mode to obtain a prediction value of the sample, a template weight corresponding to the sample is determined from the first template weight, and a product of the prediction value and the template weight of the sample is determined to be a prediction value under the second candidate prediction mode at the sample. With reference to the manner, prediction values under the second candidate prediction mode at each sample in the template can be obtained, and these prediction values form prediction values of the template corresponding to the second candidate prediction mode, and based on the prediction values and the reconstruction values of the template, a fifth cost corresponding to the second candidate prediction mode is determined.

According to the above method, a fifth cost corresponding to each of the P second candidate prediction modes can be determined, and then the following S103-A14 are performed.

S103-A34, the adjusted prediction mode corresponding to the k-th second refined prediction mode is determined according to the fifth costs corresponding to the P second candidate prediction modes.

For example, a second candidate prediction mode with the fifth lowest cost among the P second candidate prediction modes is determined as the adjusted prediction mode corresponding to the k-th second refined prediction mode.

The above embodiment exemplarily describes determination of an adjusted prediction mode corresponding to a k-th second refined prediction mode among the K second refined prediction modes, and with reference to the above description, the adjusted prediction mode corresponding to each of the K second refined prediction modes can be determined, and thus K adjusted prediction modes can be obtained.

In this manner 2, the decoding end first refines the K initial prediction modes using the P sub-templates to obtain the K second refined prediction modes corresponding to the weight derivation mode for the current block, and then refines the K second refined prediction modes corresponding to the weight derivation mode for the current block using the weight derivation mode for the current block, so as to obtain the accurate K adjusted prediction modes. In this way, when the current block is predicted using these K adjusted prediction modes and the weight derivation mode for the current block, the accuracy of the prediction can be further improved.

In embodiments of the present application, by the method described above, the weight derivation mode and K adjusted prediction modes for the current block can be determined, and then the prediction value of the current block can be obtained by predicting the current block using the weight derivation mode and the K adjusted prediction modes for the current block.

In the disclosure, the manner for determining the weight derivation mode and K adjusted prediction modes for the current block includes, but is not limited to, the following manners.

Manner I: during determination of the first template weight according to the weight derivation mode for the current block, if the first template weight is determined according to the weight derivation mode but a weight corresponding to a sample in the current block is not yet determined, the foregoing operation S103-B includes the following operations.

S103-B11, K prediction values are determined according to the K adjusted prediction modes.

S103-B12, weights of the prediction values are determined according to the weight derivation mode for the current block.

S103-B13, the prediction value of the current block is determined according to the K prediction values and the weights of the K prediction values.

It should be noted that, in the disclosure, the weight derivation mode for the current block is used to determine weights of prediction values used for the current block. Specifically, the weight derivation mode for the current block may be a mode for deriving the weights of the prediction values. For a block of a given length and width, each weight derivation mode may be used to derive one weight matrix of prediction values. For blocks of the same size, weight matrices of prediction values derived from different weight derivation modes may be different.

It can be understood that, in the embodiment of the disclosure, at the decoding end, when determining the prediction value of the current block based on the K adjusted prediction modes and the weights of the prediction values, the K prediction values may be firstly determined according to the K adjusted prediction modes, and then weighted averaging is performed on the K prediction values according to the weights of the prediction values, so as to obtain the prediction value of the current block.

In this manner I, it may be understood that determination of first template weight and determination of weights of the prediction values according to the weight derivation mode for the current block, are two independent processes, which do not interfere with each other.

In some embodiments, the prediction value of the current block may also be determined in the following manner II.

Manner II: If a weight of a sample in a merge region consisting of a template region and the current block is determined according to the weight derivation mode for the current block during determination of the first template weight, S103-B includes the following operations.

S103-B21, K prediction values are determined according to the K adjusted prediction modes.

S103-B22, weights of the K prediction values are determined according to the weight of the sample in the merge region.

S103-B23, the prediction value of the current block is determined according to the K prediction values and the weights of the K prediction values.

In manner II, during weight derivation, the weight of the sample in the merge region is derived according to the weight derivation mode for the current block, where the merge region includes the current block and the template region of the current block, so that weights corresponding to the current block in the merge region are determined as the weights of the prediction values, and a weight corresponding to the template region in the merge region is determined as the first template weight. That is, in manner II, the template region and the current block are taken as a whole, so that the first template weight and the weights of the prediction values are derived in one step, thereby reducing steps for weight derivation and improving prediction effect.

In some embodiments, the foregoing prediction process is performed on a sample basis, and accordingly, the weight is a weight corresponding to a sample. In this case, when predicting the current block, sample A in the current block is predicted with each of the K adjusted prediction modes, so as to obtain K prediction values at sample A for the K adjusted prediction modes; weights of the K prediction values at sample A are determined according to the weight derivation mode for the current block; and the K prediction values are weighted so as to obtain a final prediction value of sample A. The foregoing steps are performed on each sample in the current block, and a prediction value of each sample in the current block can be obtained, where the prediction value of each sample in the current block forms a prediction value of the current block. For example, K=2, sample A in the current block is predicted with the first prediction mode, to obtain a first prediction value of sample A; sample A is predicted with the second prediction mode, to obtain a second prediction value of sample A; and the first prediction value and the second prediction value are weighted according to weights of prediction values corresponding to sample A, to obtain a prediction value of sample A.

In an example, for example, K=2, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to weights of prediction values to obtain the prediction value of the current block. For example, sample A is predicted with the first intra prediction mode to obtain a first prediction value of sample A, sample A is predicted with the second intra prediction mode to obtain a second prediction value of sample A, and the first prediction value and the second prediction value are weighted according to weights of prediction values corresponding to sample A, so as to obtain the prediction value of sample A.

In some embodiments, if the j-th adjusted prediction mode in the K adjusted prediction modes is an inter prediction mode, determining the prediction value of the current block according to the K adjusted prediction modes and the weight derivation mode for the current block in S103-B includes the following operations.

S103-B31, motion information is determined according to the j-th adjusted prediction mode.

S103-B32, a j-th prediction value is determined according to the motion information.

S103-B33, (K−1) prediction values are determined according to prediction modes other than the j-th adjusted prediction mode in the K adjusted prediction modes.

S103-B34, weights of the K prediction values are determined according to the weight derivation mode for the current block.

S103-B35, the prediction value of the current block is determined according to the j-th prediction value, the (K−1) prediction values, and the weights of the K prediction values.

For example, K=2, if the first prediction mode is an intra prediction mode and the second prediction mode is an inter prediction mode, the intra prediction mode is used for prediction to obtain a first prediction value, the inter prediction mode is used for prediction to obtain a second prediction value, and the first prediction value and the second prediction value are weighted according to weights of prediction values to obtain the prediction value of the current block. In this example, the intra prediction mode is used for prediction of each sample in the current block, so as to obtain a prediction value of each sample in the current block, and the prediction value of each sample in the current block constitutes a first prediction value of the current block. The inter prediction mode is used to determine motion information, a best matching block of the current block is determined according to the motion information, and the best matching block is determined as a second prediction value of the current block. According to weights of prediction values of samples in the current block, the first prediction value and the second prediction value of the current block are weighted on a sample basis, so as to obtain the prediction value of the current block. For example, for sample A in the current block, a first prediction value corresponding to sample A in the first prediction value of the current block and a second prediction value corresponding to sample A in the second prediction value of the current block are weighted according to weights of prediction values of sample A, so as to obtain a prediction value of sample A.

In some embodiments, if K>2, weights of prediction values corresponding to any two adjusted prediction modes in the K adjusted prediction modes may be determined according to the weight derivation mode for the current block, and a weight(s) of a prediction value(s) corresponding to other adjusted prediction mode(s) in the K adjusted prediction modes may be a preset value(s). For example, K=3, a weight of a prediction value corresponding to the first prediction mode and a weight of a prediction value corresponding to the second prediction mode are derived according to the weight derivation mode for the current block, and a weight of a prediction value corresponding to a third prediction mode is a preset value. In some embodiments, if a total prediction-value weight (that is, total weight of prediction values) corresponding to the K prediction modes is constant, for example, is 8, a weight of a prediction value corresponding to each of the K adjusted prediction modes may be determined according to a preset weight proportion. Assuming that the weight of the prediction value corresponding to the third prediction mode accounts for ¼ of the total prediction-value weight, it may be determined that the weight of the prediction value of the third prediction mode is 2, and the remaining ¾ of the total prediction-value weight is allocated to the first prediction mode and the second prediction mode. Exemplarily, if a weight of the prediction value corresponding to the first prediction mode derived according to the weight derivation mode for the current block is 3, it is determined that the weight of the prediction value corresponding to the first prediction mode is (¾)*3, and the weight of the prediction value corresponding to the second prediction mode is (¾)*5.

According to the above method, the prediction value of the current block is determined at the decoding end. Further, by decoding the bitstream, quantization coefficients of the current block are obtained, and the quantization coefficients are de-quantized to obtain transform coefficients, which are then inverse-transformed to obtain a residual value of the current block. The residual value and the prediction value of the current block are added to obtain a reconstruction value of the current block.

According to the prediction method provided in the embodiments of the present disclosure, the decoding end decodes the bitstream to obtain K initial prediction modes, determines the weight derivation mode for the current block according to the K initial prediction modes, and determines the prediction value of the current block according to the weight derivation mode for the current block. That is, the present disclosure determines the weight derivation mode for the current block through the K initial prediction modes, which can enrich the determination manners for the weight derivation mode. In addition, in this disclosure, transmission of an index of the weight derivation mode through the bitstream is not needed at the encoding end, and the decoding end can determine the weight derivation mode for the current block according to the K initial prediction modes, thus saving codewords and reducing the coding cost.

The prediction method is described above taking the decoding end as an example. In the following, the encoding end is taken as an example for describing the method.

Figure 19:
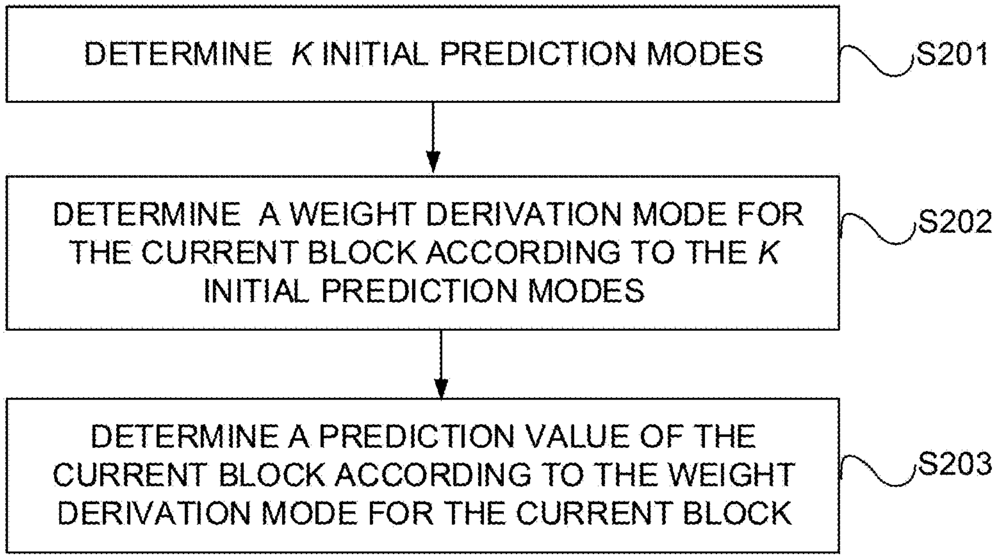
FIG. 19 is a schematic flowchart of a prediction method provided in an embodiment of the disclosure.

FIG. 19 is a schematic flowchart of a prediction method according to an embodiment of the present disclosure. The embodiment of the present disclosure is applied to a video encoder illustrated in FIG. 1 and FIG. 2. As illustrated in FIG. 19, the method in the embodiment of the present disclosure includes the following.

S201, K initial prediction modes are determined.

It should be noted that in embodiments of the disclosure, a video picture may be partitioned into multiple picture blocks, and a current block refers to each picture block to be encoded currently, which may be referred to as a coding block (CB). Here, each CB may include a first colour component, a second colour component, and a third colour component. Specifically, in this disclosure, if first prediction is performed and the first colour component is a luma component, that is, a to-be-predicted colour component is the luma component, then the CB to be predicted may be referred to as a luma block. Alternatively, if second prediction is performed and the second colour component is a chroma component, that is, a to-be-predicted colour component is the chroma component, then the CB to be predicted may be referred to as a chroma block As can be seen from the above, in order to further improve prediction accuracy, multiple prediction modes may be used to predict a current block. In this case, in order to maintain the consistency of prediction between the encoding and decoding ends, in some embodiments, the encoding end needs to indicate a weight derivation mode in the bitstream, such as signalling an index of the weight derivation mode into the bitstream. Taking VVC as an example, 64 weight derivation modes in GPM are encoded with equal probability, that is, an equal length of 6 bits is used for each of the 64 weight derivation modes during binarization and inverse binarization, which would increase the coding cost.

In the embodiments of the present disclosure, in order to reduce the coding cost, the decoding end derives the weight derivation mode according to prediction modes. Specifically, K initial prediction modes are determined by decoding the bitstream at the decoding end. Then, according to these K initial prediction modes, the weight derivation mode for the current block is determined, and a prediction value of the current block is determined according to the weight derivation mode for the current block. Correspondingly, the same prediction method is used at the encoding end. That is, K initial prediction modes are determined, then the weight derivation mode for the current block is determined according to these K initial prediction modes, and a prediction value of the current block is determined according to the weight derivation mode for the current block.

In some embodiments, for ease of description, the weight derivation mode for the current block is denoted as the weight derivation mode for the current block.

Examples of the K initial prediction modes of the current block include the following.

Example 1, all of the K initial prediction modes are inter prediction modes.

Example 2, all of the K initial prediction modes are intra prediction modes.

Example 3, the K initial prediction modes include at least one intra prediction mode and at least one inter prediction mode.

Example 4, the K initial prediction modes include at least one intra prediction mode and at least one non-intra and non-inter prediction mode, such as an intra block copy (IBC) prediction mode or a palette prediction mode.

Example 5, the K initial prediction modes include at least one inter prediction mode and at least one non-intra and non-inter prediction mode, such as an IBC prediction mode or a palette prediction mode.

Example 6, none of the K initial prediction modes is an intra prediction mode or an inter prediction. For example, the K initial prediction modes include an IBC prediction mode and a palette prediction mode.

It should be noted that the specific types of the K initial prediction modes are not limited in the embodiments of the present disclosure.

The manner of decoding the bitstream to obtain the K initial prediction modes at the encoding end at S201 includes, but is not limited to, the following manners.

Manner 1, the K initial prediction modes are K prediction modes that are predetermined.

Manner 2, the operation S201 includes operations from S201-A1 to S201-A2 as follows.

S101-A1, an alternative prediction mode list is determined, where the alternative prediction mode list includes at least two alternative prediction modes.

S101-A2, the K initial prediction modes are determined from the alternative prediction mode list.

In some embodiments, if all of the K initial prediction modes are intra prediction modes, all of alternative prediction modes included in the alternative prediction mode list are intra prediction modes. For example, the alternative prediction mode list includes at least one of a direct current (DC) mode, a PLANAR mode, or an angular mode. Optionally, the alternative prediction mode list further includes an intra prediction mode in a MPM list.

In some embodiments, if all of the K initial prediction modes are inter prediction modes, all of alternative prediction modes included in the alternative prediction mode list are inter prediction modes. For example, the alternative prediction mode list includes at least one of a skip mode, a merge mode, or a normal inter prediction mode.

In some embodiments, if the K initial prediction modes include both an inter prediction mode and an intra prediction mode, the alternative prediction mode list includes at least one intra prediction mode and at least one inter prediction mode.

Optionally, the alternative prediction mode list further includes an IBC mode, a palette mode, or the like.

Optionally, the alternative prediction mode list further includes a uni-directional prediction mode, a bi-directional prediction mode, a multiple-hypothesis prediction mode, or the like.

The types and number of alternative prediction modes included in the above alternative prediction mode list are not limited in embodiments of the present disclosure.

The manner of determining the alternative prediction mode list is not limited in embodiments of the present disclosure.

In an example, the alternative prediction modes included in the alternative prediction mode list are preset modes.

In an example, the alternative prediction mode list is the MPM list.

In an example, the alternative prediction mode list is a set of prediction modes determined based on certain rules, such as equidistant filtering.

In an example, it is default at both the encoding end and the decoding end that the alternative prediction modes included in the alternative prediction mode list are determined by template matching. For example, the encoding end uses a prediction mode to predict a template of the current block to obtain a prediction value of the template, and determines a cost, such as SAD cost, SATD cost, or MSE cost, of the prediction mode based on the prediction value of the template and a reconstruction value of the template. In this way, the decoding end can sort the prediction modes according to their costs so as to obtain the alternative prediction mode list. For example, multiple prediction modes with the lowest cost(s) may be determined as alternative prediction modes to form the alternative prediction mode list.

In the present embodiment, after the alternative prediction mode list is determined according to the above method, K alternative prediction modes are selected from the alternative prediction mode list, as the K initial prediction modes.

For example, the encoding end randomly selects K alternative prediction modes from the alternative prediction mode list, as the K initial prediction modes.

For example, the encoding end determines K alternative prediction modes with the lowest cost(s) from the alternative prediction mode list, as the K initial prediction modes.

After the encoding end determines the K initial prediction modes, prediction mode index is signalled into a bitstream, where the prediction mode index may be an index of at least one initial prediction mode out of the K initial prediction modes. For example, the prediction mode index is indexes of the K initial prediction modes, or an index of the first initial prediction mode out of the K initial prediction modes. In this way, the decoding end decodes the bitstream to obtain the prediction mode index, and determines the K initial prediction modes from the above-determined alternative prediction mode list according to the prediction mode index.

In the embodiments of the present disclosure, the encoding end determines the K initial prediction modes according to the above operations, determines the weight derivation mode for the current block based on these K initial prediction modes, and then predicts the current block based on the weight derivation mode for the current block to determine the prediction value of the current block.

In some embodiments, at the encoding end, before determination of the K initial prediction modes, whether to use K different prediction modes for weighted prediction of the current block needs to be determined. If it is determined at the encoding end that K different prediction modes are used for weighted prediction of the current block, S201 is performed to determine the K initial prediction modes.

In a possible implementation, at the encoding end, whether to use two different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether K different prediction modes can be used for prediction of the current block.

It can be understood that, in the embodiment of the disclosure, the prediction mode parameter may be understood as a flag bit indicating whether the GPM mode or the AWP mode is used. Specifically, at the encoding end, a variable may be used as the prediction mode parameter, so that the prediction mode parameter may be set by setting a value of the variable. Exemplarily, in the disclosure, if the GPM mode or the AWP mode is used for the current block, at the encoding end, a value of the prediction mode parameter may be set to indicate that the GPM mode or the AWP mode is used for the current block. Specifically, the value of the variable may be set to 1 at the encoding end. Exemplarily, in the disclosure, if the GPM mode or the AWP mode is not used for the current block, at the encoding end, the value of the prediction mode parameter may be set to indicate that the GPM mode or the AWP mode is not used for the current block. Specifically, the value of the variable may be set to 0 at the encoding end. Further, in the embodiment of the disclosure, after setting of the prediction mode parameter is completed, at the encoding end, the prediction mode parameter may be signalled into the bitstream and transmitted to the decoding end, so that at the decoding end, the prediction mode parameter may be obtained after parsing the bitstream.

Based on this, at the encoding end, whether the GPM mode or the AWP mode is used for the current block is determined according to the prediction mode parameter, and if the GPM mode or the AWP mode is used for prediction of the current block, i. e. K different prediction modes are used, the K initial prediction modes are determined.

It should be noted that, in the embodiment of the disclosure, the GPM mode or the AWP mode is a prediction method. Specifically, K different prediction modes are determined for the current block, K prediction values are determined according to the K different prediction modes respectively, and then weights are determined to combine the K prediction values according to the weights, so as to obtain the prediction value of the current block.

In some embodiments, limitations may be imposed on a size of the current block when applying the GPM mode or the AWP mode. It may be understood that, in the prediction method provided in the embodiment of the disclosure, it is necessary to use the K different prediction modes to generate the K prediction values respectively, which are then weighted to obtain the prediction value of the current block. Therefore, in order to reduce complexity while considering the trade-off between compression performance and complexity, the GPM mode or the AWP mode may not be used for blocks with certain sizes in the embodiment of the disclosure. Therefore, in the disclosure, at the encoding end, a size parameter of the current block may be firstly determined, and then whether to use the GPM mode or the AWP mode for the current block is determined according to the size parameter.

It should be noted that, in the embodiment of the disclosure, the size parameter of the current block may include a height and a width of the current block, and therefore, at the encoding end, the use of the GPM mode or the AWP mode may be restricted based on the height and the width of the current block. Exemplarily, in the disclosure, if the width of the current block is greater than a first threshold and the height of the current block is greater than a second threshold, it is determined that the GPM mode or the AWP mode is used for the current block. As can be seen, one possible limitation is to use the GPM mode or the AWP mode only when the width of the block is greater than (or greater than or equal to) the first threshold and the height of the block is greater than (or greater than or equal to) the second threshold. The value of each of the first threshold and the second threshold may be 8, 16, 32, etc., and the first threshold may be equal to the second threshold. Exemplarily, in the disclosure, if the width of the current block is less than a third threshold and the height of the current block is greater than a fourth threshold, it is determined that the GPM mode or the AWP mode is used for the current block. As can be seen, one possible limitation is to use the GPM mode or the AWP mode only when the width of the block is less than (or less than or equal to) the third threshold and the height of the block is greater than (or greater than or equal to) the fourth threshold. The value of each of the third threshold and the fourth threshold may be 8, 16, 32, etc., and the third threshold may be equal to the fourth threshold.

In some embodiments of the disclosure, limitation on the size of a block for which the GPM mode or the AWP mode can be used may also be implemented through limitations on a sample parameter. Exemplarily, in the disclosure, at the encoding end, a sample parameter of the current block may be firstly determined, and then whether the GPM mode or the AWP mode can be used for the current block may be determined according to the sample parameter and a fifth threshold. As can be seen, one possible limitation is to use the GPM mode or the AWP mode only when the number of samples in the block is greater than (or greater than or equal to) the fifth threshold. The value of the fifth threshold may be 8, 16, 32, etc. That is, in the disclosure, the GPM mode or the AWP mode can be used for the current block only when the size parameter of the current block satisfies a size requirement.

In some embodiments, in the disclosure, a flag of a picture level may be used to determine whether the disclosure is applied to the current decoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

In some embodiments, a flag below the picture level but above a CU level (such as tile, slice, patch, LCU, etc.) may be used to determine whether the disclosure is applied to that region.

S202, the weight derivation mode for the current block is determined according to the K initial prediction modes.

In the disclosure, the weight derivation mode is used to determine weights used for the current block. Specifically, the weight derivation mode may be a mode for deriving the weights. For a block of a given length and width, each weight derivation mode may be used to derive one weight matrix. For blocks of the same size, weight matrices derived from different weight derivation modes may be different.

Exemplarily, in the disclosure, there are 56 weight derivation modes for AWP and 64 weight derivation modes for GPM.

It should be noted that, for ease of description, the weight derivation mode that is finally determined for prediction of the current block is denoted as the weight derivation mode for the current block.

In embodiments of the present disclosure, the encoding end determines the weight derivation mode for the current block according to the K initial prediction modes determined above. In some cases, the encoding end may not signal into the bitstream information related to the weight derivation mode for the current block, so as to saving codewords and reduce encoding cost.

The manner of determining the weight derivation mode for the current block according to the K initial prediction modes at the encoding end is not limited in embodiments of the present disclosure.

In some embodiments, the weight derivation mode for the current block is determined according to the K initial prediction modes at the encoding end based on a template of the current block. Taking VVC as an example, there are 64 weight derivation modes in GPM, and the encoding end analyses the template to estimate which weight derivation modes are more likely to be selected and which are less likely to be selected. Taking inter GPM as an example, a typical scene is 2 objects moving against each other, and GPM can be used for an edge between the 2 objects. Assuming that both the current block and the template contain the edge between the objects, then the edge on the template can be used to infer the edge on the current block. Exemplarily, given 2 motion information, 2 prediction values of the template are obtained based on these 2 motion information respectively, denoted as a first template prediction value and a second template prediction value respectively. Template weights are derived according to a certain weight derivation mode. Based on the first template prediction value, the second template prediction value, and the template weights, the prediction value of the template corresponding to that weight derivation mode is determined. Because the reconstruction values of the template are available, a cost of that weight derivation mode on the template can be obtained based on the prediction value of the template corresponding to that weight derivation mode and the reconstruction value of the template. In this way, a probability of a weight derivation mode being selected can be estimated based on the cost of the weight derivation mode on the template. In one manner, based on the costs of respective weight derivation modes on the template, the weight derivation modes are sorted. A mode with a smaller cost precedes a mode with a larger cost. Since it is considered that the sorted weight derivation modes are arranged roughly from high probability to low probability, variable length encoding can be used. In one possible implementation, a list of weight derivation modes are constructed. The encoding end signals into the bitstream an index of the weight derivation mode selected for the current block, and the decoder parses out the index from the bitstream to determine the weight derivation mode for the current block from the list.

As can be seen from the above, in embodiments of the present disclosure, during determining the weight derivation mode for the current block according to the K initial prediction modes, a template weight needs to be determined according to the weight derivation mode.

In the following, the process of determining the template weight according to the weight derivation mode according to embodiments of the present disclosure is introduced.

In template matching, by utilizing correlation between neighbouring samples, some regions neighbouring the current block are taken as a template. Before coding the current block, blocks on the left and the top of the current block have already been encoded according to a coding order. In inter prediction, a best matching position of the template is found in a reference picture to determine motion information or a motion vector of the current block. In intra prediction, an intra prediction mode of the current block is determined by using the template.

There is no limitation on the shape of the template of the current block in the disclosure.

In some embodiments, the template includes at least one of a top decoded region, a left decoded region, or a top-left decoded region of the current block.

Optionally, a width of the top decoded region is the same as a width of the current block, a height of the left decoded region is the same as a height of the current block, a width of the top-left decoded region is the same as a width of the left encoded region, and a height of the top-left decoded region is the same as a height of the top encoded region.

As illustrated in Table 5 above, taking K=2 as an example, the K prediction modes include a first prediction mode and a second prediction mode. A template corresponding to the first prediction mode and a template corresponding to the second prediction mode each are a top decoded region of the current block, or a left decoded region of the current block, or a left decoded region and a top decoded region of the current block. For example, as illustrated in FIG. 16, taking a weight derivation mode with a GPM index 2 as an example, a white area in a weight matrix of the current block is a weight corresponding to a prediction value of the first prediction mode, and a black area is a weight corresponding to a prediction value of the second prediction mode. As illustrated in FIG. 16, a first template corresponding to the first prediction mode is a top decoded region of the current block, a second template corresponding to the second prediction mode is a left decoded region of the current block, but a template close to the second prediction mode further includes part of the top decoded region besides the left region. Therefore, in the related art, template partitioning is not fine enough, and as a result, the weight derivation mode for the current block cannot be derived accurately based on the template.

In order to solve the technical problem, in the disclosure, a finer partitioning of template can be achieved with aid of the weight derivation mode. For example, as illustrated in FIG. 17A, in the disclosure, a boundary line of a weight matrix corresponding to the weight derivation mode for the current block is extended to a template region for template partitioning. For example, a template on one side of the boundary line is referred to as a first template, and a template on another side of the boundary line is referred to as a second template. The first template corresponds to the first prediction mode, and the second prediction mode corresponds to the second template. A weight of the first template is determined according to a weight corresponding to the first prediction mode, and a weight of the second template is determined according to a weight corresponding to the second prediction mode. For example, the weight of the first template is the same as the weight corresponding to the first prediction mode, and the weight of the second template is the same as the weight corresponding to the second prediction mode.

In some embodiments, each of the first template and the second template partitioned according to the above method may not be a rectangle. For example, as illustrate in FIG. 17A, each of the first template and the second template has an inclined edge. Calculation of a cost for a irregular template is complex.

In order to reduce complexity of template matching, in some embodiments, the weight matrix may be directly extended towards the template region, for example towards the left and the above, to cover the template so as to determine the weights of the template. For example, as illustrated in FIG. 17B, a rectangular region in the top-left of the current block may be added to the template, so that the template and the current block can constitute a rectangle. Alternatively, only the left part and the top part may be used as the template. As illustrated in FIG. 17B, the top-left region is exemplarily added, and regions in the left, the top-left, and the top in an upside-down L-shaped region form a template region, and a bottom-right rectangular region is the current block. In this case, part of the weight matrix extended to the top-left becomes a weight matrix of the template. In this way, the template does not need to be actually partitioned, but is simulately partitioned according to weights, that is, template partitioning is simulated according to a weight derivation mode, or a template weight is determined according to a weight derivation mode, and a cost of template matching is determined according to the template weight. Template partitioning may differ under different block shapes, but in the disclosure, there is no need to set various rules for blocks of various shapes, for example, there is no need to set a correspondence between prediction modes and templates as illustrated in Table 5. In addition, with regard to accuracy of "partitioning", the simulated partitioning in the disclosure is more precise and accurate than a method in which only a left region and a top region are differentiated.

In some embodiments, the left region and the top region of the current block illustrated in FIG. 17B may be used as the template of the current block, without considering the top-left rectangular region.

During template matching, only one component (Y, Cb, Cr or R, G, B) may be used, for example, Y may be used in a YUV format because Y is dominant. Alternatively, all components may be used. For ease of illustration, one component is taken as an example for illustration in the disclosure, for example, template matching is performed exemplarily on a Y component, and the same applies to other components.

In the embodiment of the disclosure, the process of deriving the template weight according to the weight derivation mode may be combined with the process of deriving a weight of a prediction value, for example, the template weight and the weight of the prediction value are derived at the same time, where the weight of the prediction value may be understood as a weight corresponding to the prediction value. For example, the first prediction value is obtained according to the first prediction mode, the second prediction value is obtained according to the second prediction mode, a first weight of the first prediction value is determined according to the weight derivation mode, a second weight of the second prediction value is determined according to the weight derivation mode, and a sum of a product of the first prediction value and the first weight and a product of the second prediction value and the second weight is determined as a prediction value of the current block.

In the disclosure, in order to distinguish from the template weight, the first weight and the second weight each are referred to as a weight of a prediction value.

In some embodiments, the operation of determining the template weight according to the weight derivation mode includes the following operations.

Operation A, an angle index and a distance index are determined according to the weight derivation mode.

Operation B, the template weight is determined according to the angle index, the distance index, and a size of the template.

In the disclosure, the template weight may be derived in the same manner as deriving a weight of a prediction value. For example, the angle index and the distance index are firstly determined according to the weight derivation mode, where the angle index may be understood as an angle index of a boundary line of weights derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the template weight is determined according to the angle index, the distance index, and the size of the template.

The manner for deriving the template weight according to the weight derivation mode in operation B includes, but is not limited to, the following manners.

Manner I: The template weight is determined directly according to the angle index, the distance index, and the size of the template. In this case, operation B includes the following operations B11 to B13.

Operation B11, a first parameter of a sample in the template is determined according to the angle index, the distance index, and the size of the template.

Operation B12, a weight of the sample in the template is determined according to the first parameter of the sample in the template.

Operation B13, the template weight is determined according to the weight of the sample in the template.

In this implementation, the weight of the sample in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

In a possible implementation, an offset and the first parameter may be determined in the manner described in the above embodiments, and reference may be made to description of the above embodiments, which will not be repeated herein.

After the first parameter weightIdx is determined according to the foregoing method, a weight of a sample (x, y) in the template is determined according to weightIdx.

In the disclosure, the manner for determining the weight of the sample in the template according to the first parameter of the sample in the template in operation B12 includes, but is not limited to, the following manners.

Manner 1: A second parameter of the sample in the template is determined according to the first parameter of the sample in the template, and the weight of the sample in the template is determined according to the second parameter of the sample in the template.

The second parameter is also used for determining a weight. In some embodiments, the second parameter is also referred to as a weight index under a first component, and the first component may be a luma component, a chroma component, or the like.

Manner 2: The weight of the sample in the template is determined according to the first parameter of the sample in the template, a first preset value, and a second preset value.

In order to reduce complexity of calculating the template weight, in manner 2, the weight of the sample in the template is limited to the first preset value or the second preset value, that is, the weight of the sample in the template is either the first preset value or the second preset value, thereby reducing complexity of calculating the template weight.

The value of each of the first preset value and the second preset value is not limited in the disclosure.

Optionally, the first preset value is 1.

Optionally, the second preset value is 0.

In manner I above, the weight of each sample in the template is determined according to the weight derivation mode, and a weight matrix formed by the weights of all samples in the template is used as the template weight.

Manner II: A weight of the current block and the template weight are determined according to the weight derivation mode. That is, in manner II, a merge region consisting of the current block and the template is taken as a whole, and a weight of a sample in the merge region is derived according to the weight derivation mode. Based on this, operation B includes the following operations B21 and S202-B22.

Operation B21, a weight of a sample in a merge region consisting of the current block and the template is determined according to the angle index, the distance index, the size of the template, and a size of the current block.

Operation B22, the template weight is determined according to the size of the template and the weight of the sample in the merge region.

In manner II, the current block and the template are taken as a whole, the weight of the sample in the merge region consisting of the current block and the template is determined according to the angle index, the distance index, the size of the template, and the size of the current block, and then according to the size of the template, a weight corresponding to the template among the weights of the samples in the merge region is determined as the template weight, for example, as illustrated in FIG. 18, a weight corresponding to an L-shaped template region in the merge region is determined as the template weight.

In manner II, in a weight determination process, the template weight and the weight of a prediction value are determined, i. e. the weight of the prediction value is a weight corresponding to the merge region other than the template weight, so that a subsequent prediction process can be performed according to the weight of the prediction value, and the weight of the prediction value does not need to be determined again, thereby reducing the steps for prediction and improving prediction efficiency.

There is no limitation on the implementation of determining the weight of the sample in the merge region consisting of the current block and the template according to the angle index, the distance index, the size of the template, and the size of current block in the disclosure.

In some embodiments, determining the weight of the sample in the merge region in operation B21 includes the following operations B211 to B212.

Operation B211, a first parameter of the sample in the merge region is determined according to the angle index, the distance index, and a size of the merge region.

Operation B212, the weight of the sample in the merge region is determined according to the first parameter of the sample in the merge region.

In this implementation, the weight of the sample in the merge region is determined according to the angle index, the distance index, and the size of the merge region, and the weight of samples in the merge region form a weight matrix.

Specifically, reference may be made to the above embodiments, which will not be repeated herein.

In the disclosure, the manner for determining the weight of the sample in the merge region according to the first parameter of the sample in the merge region in operation B212 includes, but is not limited to, the following manners.

Manner 1: A second parameter of the sample in the merge region is determined according to the first parameter of the sample in the merge region, and the weight of the sample in the merge region is determined according to the second parameter of the sample in the merge region.

Manner 2: The weight of the sample in the merge region is determined according to the first parameter of the sample in the merge region, a first preset value, and a second preset value.

Exemplarily, the weight of the sample in the merge region is the first preset value or the second preset value.

In order to reduce complexity of calculating the weight of the merge region, in manner 2, the weight of the sample in the merge region is limited to the first preset value or the second preset value, that is, the weight of the sample in the merge region is either the first preset value or the second preset value, thereby reducing complexity of calculating the weight of the merge region.

The value of each of the first preset value and the second preset value is not limited in the disclosure.

Optionally, the first preset value is 1.

Optionally, the second preset value is 0.

In manner II above, the weight of each sample in the merge region consisting of the current block and the template is determined according to the weight derivation mode, and then a weight corresponding to the template in the merge region is determined as the template weight according to the size of the template. In addition, in manner II, a weight of a prediction value is also determined, and it is unnecessary to perform subsequent steps of determining the weight of the prediction value, thereby reducing the steps for prediction and improving prediction efficiency. In the above, the process of determining the template weight according to the weight derivation mode is described in detailed. The weight derivation mode may be any weight derivation mode involved in embodiments of the present disclosure, such as the weight derivation mode for the current block, the i-th candidate weight derivation mode in the N candidate weight derivation modes, etc.

S203, a prediction value of the current block is determined according to the weight derivation mode for the current block.

In the present disclosure, the manner of determining the prediction value of the current block according to the weight derivation mode for the current block at S203 at the encoding end includes but is not limited to the following manners.

Manner 1, the encoding end determines the prediction value of the current block according to the weight derivation mode for the current block and the K initial prediction modes. Specifically, the encoding end determines weights of prediction values, obtains K prediction values by predicting the current block according to the K initial prediction modes, and obtains the prediction value of the current block by performing weighted averaging on the K prediction values with the weights of prediction values.

It should be noted that, the weights of the prediction values derived according to the weight derivation mode for the current block may be understood as weights each corresponding to a sample in the current block, and may also be understood as a weight matrix corresponding to the current block. During determining the prediction value of the current block based on the weights of the prediction values, for each sample in the current block, K prediction values corresponding to the sample may be determined, and a prediction value corresponding to the sample is determined according to the K prediction values corresponding to the sample and the weights of the prediction values. Then the prediction values respectively corresponding to samples in the current block form the prediction value of the current block. Optionally, the determination of the prediction value of the current block based on the weight of the prediction value may also be performed on a block basis. For example, K prediction values of the current block are determined, and the K prediction values of the current block are weighted according to a weight matrix of the current block, so as to obtain the prediction value of the current block.

Manner 2, the encoding end refines the K initial prediction modes using the weight derivation mode. In this case, the operations at S203 include operations at S203-A and S203-B.

S203-A, K adjusted prediction modes are determined according to the weight derivation mode for the current block.

S203-B, the prediction value of the current block is determined according to the K adjusted prediction modes and the weight derivation mode for the current block.

In embodiments of the present disclosure, it may be considered that the GPM has K+1 elements, that is, a weight derivation mode and K prediction modes. Because a weight derivation mode and K prediction modes are jointly used to generate a prediction block for the current block, there are associations between the elements. For example, a current block contains the edge between two objects that are in relative motion, which is an ideal scenario for inter GPM. Then in theory, the "partition" should occur at the edge between the objects. However, in practice, there are a limited number of possibilities for "partition", and it is impossible to cover every kind of edge. In some cases, an approximate "partition" is selected. There may be more than one kind of approximate "partition". The selection of which "partition" depends on which "partition" generates an optimal result in combination with two prediction modes. Similarly, sometimes the selection of which prediction mode(s) depends on which combination leads to the optimal result, because even for a part for which the prediction mode is used, for a natural video, the part is very difficult to completely match the current block. The finally selected prediction mode may have the highest coding efficiency. Another scenario where GPM is often used is where the current block contains a part where there is relative motion in an object, for example, where twisting and deformation occurs due to swing or the like of an arm. In this case, the "partition" is more fuzzy, and may finally depend on which combination has the optimal result. Yet another scenario is in intra prediction. The texture of some parts in a natural image is very complex, some parts may contain a gradual change from one texture to another texture, and some parts may not be represented in a simple one direction. Intra GPM may provide a more complex prediction block, while an intra-coded block typically has larger residuals relative to an inter-coded block under the same quantization. Thus which prediction mode is selected may ultimately depend on which combination has the optimal result.

It can be seen that the K+1 elements would affect each other. Therefore, the prediction modes may be derived according to the weight derivation mode, and the weight derivation mode may also be derived according to the prediction modes. Further, it can be seen that some mode information may be refined. The "refine" refers to obtaining better mode information based on initial mode information by means of collecting more related information, using more calculation, etc. Generally, the "refinement" is an operation at the encoding end. Also, the motion information may be refined based on the template. In other words, based on initial motion information, searching in a small range is performed at the encoding end, and the motion information is optimized according a matching degree between the found motion information and the template. The matching degree between the found motion information and the template may be understood as the matching degree between the prediction value of the template based on the motion information and the reconstruction value of the template.

Accordingly, in GPM, the weight derivation mode may be first determined according to the prediction mode, and then the prediction mode(s) may be refined according to the weight derivation mode. Alternatively, the prediction mode(s) may be first determined according to the weight derivation mode, and then the weight derivation mode may be refined according to the prediction mode. The above two manners may be implemented alternatively if the complexity allows. The template acts as a link to the implementations of these methods. Further, the template weight acts as a link to the implementations of these methods. In other words, a cost on the template is calculated according to the prediction value of the template under the prediction mode and the weight of the sub-template or template corresponding to the weight derivation mode, and then the prediction mode or the weight derivation mode is derived or determined based on the cost on the template.

That is, in embodiments of the present disclosure, the weight derivation mode for the current block is determined according to the K initial prediction modes, then the initial prediction modes are refined using the weight derivation mode for the current block to obtain K adjusted prediction modes, and finally the prediction value of the current block is determined according to the weight derivation mode for the current block and the K adjusted prediction modes.

For the specific process of determining the prediction value of the current block according to the weight derivation mode for the current block and the K adjusted prediction modes, reference may be made to the following description of determining the prediction value of the current block by predicting the current block according to the weight derivation mode and the K prediction modes, which will not be repeated herein.

In the following, specific embodiments are described in detail for the process of determining the weight derivation mode for the current block according to the K initial prediction modes at S202 and the process of determining the K adjusted prediction modes according to the weight derivation mode for the current block at S203-A.

In some embodiments, operations at S202 include the following operations at S202-A to S202-C.

S202-A, N candidate weight derivation modes are determined, where Nis a positive integer greater than 1.

S202-B, for i-th candidate weight derivation mode in the N candidate weight derivation modes, a first cost corresponding to the i-th candidate weight derivation mode is determined according to the i-th candidate weight derivation mode and the K initial prediction modes, where i is a positive integer from 1 to N.

S202-C, the weight derivation mode for the current block is determined according to first costs respectively corresponding to the N candidate weight derivation modes.

In this embodiment, the encoding end first determines the N candidate weight derivation modes, which form a weight derivation mode list. Then the encoding end calculates the first cost corresponding to each of the N candidate weight derivation modes, and determines the weight derivation mode for the current block from the N candidate weight derivation modes according to the first costs.

For example, a candidate weight derivation mode with the lowest first cost among the N candidate weight derivation modes is determined as the weight derivation mode for the current block.

For another example, the N candidate weight derivation modes are sorted according to the first costs respectively corresponding to the N candidate weight derivation modes, so as to obtain a candidate weight derivation mode list. The weight derivation mode for the current block is determined according to the candidate weight derivation mode list. For example, any one candidate weight derivation mode in the candidate weight derivation mode list is determined as the weight derivation mode for the current block. In this implementation, at the encoding end, a weight derivation mode index corresponding to the weight derivation mode for the current block is signalled into the bitstream, so that the encoding end can determine the weight derivation mode for the current block from the candidate weight derivation mode list according to the weight derivation mode index.

Optionally, the first cost may be SAD, SATD, or SEE.

For each of the N candidate weight derivation modes, the process of determining the first cost corresponding to the candidate weight derivation mode is the same at the encoding end. For ease of description, the determination of the first cost corresponding to the i-th candidate weight derivation mode in the N candidate weight derivation modes is taken as an example.

The manner of determining the first cost corresponding to the i-th candidate weight derivation mode according to the i-th candidate weight derivation mode and the K initial prediction modes at S202-B includes but is not limited to the following.

Manner I, a template of the current block is predicted using the i-th candidate weight derivation mode and the K initial prediction modes, to obtain a first prediction value of the template, and the first cost corresponding to the i-th candidate weight derivation mode is determined according to the first prediction value of the template and a reconstruction value of the template.

Specifically, a template weight is determined according to the i-th candidate weight derivation mode. K initial prediction modes are used to predict the template separately, so as to obtain K prediction values of the template. The K prediction values corresponding to the template are weighted with the template weight, so as to obtain the prediction value of the template. For ease of description, the prediction value of the template is referred to as the first prediction value of the template. Then, a prediction cost of the i-th candidate weight derivation mode for the template is determined according to the first prediction value of the template and the reconstruction value of the template, where the prediction cost is referred to as the first cost corresponding to the i-th candidate weight derivation mode.

It should be noted that, for a specific process of determining the template weight according to the i-th candidate weight derivation mode, reference may be made to the foregoing description of determining the template weight according to the weight derivation mode, and details are not repeatedly described herein.

According to the method, a first cost corresponding to each of the N candidate weight derivation modes can be determined. Further, from the N candidate weight derivation modes, a candidate weight derivation mode with a lowest first cost is determined as the weight derivation mode for the current block. Alternatively, the N candidate weight derivation modes are sorted according to the first costs respectively corresponding to the N candidate weight derivation modes to obtain a candidate weight derivation mode list, and a candidate weight derivation mode corresponding to a weight derivation mode index in the candidate weight derivation mode list is determined as the weight derivation mode for the current block.

On the basis of the first manner, the determination of the K adjusted prediction modes according to the weight derivation mode for the current block in S203-A includes the following operations.

S203-A1: according to the weight derivation mode for the current block, K initial prediction modes are refined to obtain K adjusted prediction modes.

The implementation of S203-A1 includes, but is not limited to, the following examples.

Example 1, at least one prediction mode associated with the weight derivation mode for the current block is determined, where the at least one prediction mode may be a prediction mode with a prediction angle that is parallel or approximately parallel to a partition line of the weight derivation mode for the current block, or a prediction mode with a prediction angle that is perpendicular or approximately perpendicular to the partition line of the weight derivation mode for the current block. At least one initial prediction mode of the K initial prediction modes is replaced by a prediction mode in the at least one prediction mode associated with the weight derivation mode for the current block, to form multiple new combinations of prediction modes, where each of the combinations includes K prediction modes. For each of the new combinations of prediction modes, the K prediction modes included in that new combination and the weight derivation mode for the current block are used to predict the template, thus obtaining a prediction value of the template. According to the prediction value of the template and the reconstruction value of the template, a cost corresponding to that new combination of prediction modes is determined, thereby obtaining the costs respectively corresponding to the new combinations of prediction modes in the multiple new combinations of prediction modes formed as described above. Similarly, the current block is predicted using the weight derivation mode for the current block and the K initial prediction modes, and the cost corresponding to the K initial prediction modes is determined. In this way, the encoding end may obtain K adjusted prediction modes based on the cost corresponding to the new combination of prediction modes and the cost corresponding to the K initial prediction modes. For example, if the cost corresponding to new combination 1 of prediction modes is the lowest, the K prediction modes included in new combination 1 of prediction modes are determined as the K adjusted prediction modes, where new combination 1 may include at least one initial prediction mode, or may not include the initial prediction mode.

Example 2, the K initial prediction modes are refined by the following operations S203-A11 to S203-A14 to obtain K adjusted prediction modes:

S203-A11, a first template weight is determined according to the weight derivation mode for the current block.

The specific process of determining the first template weight according to the weight derivation mode for the current block can be referred to the specific description of the following embodiment of template weight derivation, which will not be repeated herein.

S203-A12: for a j-th initial prediction mode in the K initial prediction modes, M first candidate prediction modes corresponding to the j-th initial prediction mode are determined, where M is a positive integer greater than 1, and j is a positive integer from 1 to K.

It should be noted that the above operations S203-A12 and S203-A11 may be executed in any order, i.e., S203-A12 may be executed after S203-A11, before S203-A11, or in parallel with S203-A11, which is not limited herein.

In the example, the encoding end refines each of the K initial prediction modes using the weight derivation mode for the current block, so as to obtain an adjusted prediction mode corresponding to each of the K initial prediction modes, and thus obtain the K adjusted prediction modes.

The process of determining the corresponding adjusted prediction mode is the same for each of the K initial prediction modes. For ease of description, the embodiment of the present disclosure exemplarily describes the determination of the adjusted prediction mode corresponding to the j-th initial prediction mode among the K initial prediction modes.

In the embodiment of the present application, for a j-th initial prediction mode, the encoding end first determines M first candidate prediction modes corresponding to the j-th initial prediction mode.

The manner of determining the M first candidate prediction modes corresponding to the j-th initial prediction mode at the encoding end includes the following two cases.

Case 1: if the j-th initial prediction mode is an intra prediction mode, M intra prediction modes similar to the j-th initial prediction mode are determined as the M first candidate prediction modes. For example, if the j-th initial prediction mode is an angular prediction mode, M angular prediction modes whose angles are similar to (or close to) that of the j-th initial prediction mode are determined M first candidate prediction modes corresponding to the j-th initial prediction mode.

In case 2, if the j-th initial prediction mode is an inter prediction mode, a search is performed according to the j-th initial prediction mode to obtain M first motion information, and according to these M first motion information, the M first candidate prediction modes corresponding to the j-th initial prediction mode are determined. For example, for the j-th initial prediction mode with a motion vector (xInit, yInit), a search range is set to be, for example, a rectangular region from xInit−sR to xInit+sR in the horizontal direction and from yInit−sR to yInit+sR in the vertical direction, where the sR may be 2, 4, 8, and the like. Each motion vector within this rectangular region may be combined with other information of the j-th initial prediction mode, such as a reference picture index and a prediction list flag, etc., to determine one motion information and thus one prediction mode, such that M first candidate prediction modes corresponding to the j-th initial prediction mode may be obtained.

In some embodiments, the above search according to the j-th initial prediction mode to obtain the M first motion information is as follows. A search is performed according to the j-th initial prediction mode to obtain M offsets. Based on these M offsets, M first motion information is obtained.

S203-A13, a second cost corresponding to prediction of the template using each of the M first candidate prediction modes is determined according to the first template weight.

After the M first candidate prediction modes corresponding to the j-th initial prediction mode are determined according to the method in Case 1 or Case 2 above, the costs corresponding to these M first candidate prediction modes are determined, and then an adjusted prediction mode corresponding to the j-th initial prediction mode is determined according to the costs. For ease of description, the cost corresponding to the first candidate prediction mode in this case is denoted as the second cost.

Specifically, for each of the M first candidate prediction modes, the first candidate prediction mode is used to predict the template of the current block to obtain a prediction value. Then, the second cost corresponding to the first candidate prediction mode with respect to the template is determined according to the first template weight and the prediction value.

The following exemplarily describes calculation of the second cost of one of the M first candidate prediction modes with respect to the template.

For ease of illustration, taking the i-th sample in the template as an example, the i-th sample may be understood as any sample in the template, that is, the process of determining a second cost is the same for each sample in the template, and reference can be made to the i-th sample. Specifically, the prediction value of the template is obtained by predicting the template using the first candidate prediction mode, the prediction value corresponding to the i-th sample in the prediction value of the template is denoted as an i-th prediction value, and the reconstruction value corresponding to the i-th sample in the reconstruction value of the template is recorded as an i-th reconstruction value. Then, the second cost corresponding to the first candidate prediction mode at the i-th sample is determined according to the i-th prediction value, the i-th reconstruction value, and the weight of the i-th sample in the first template weight. According to the above method, second cost(s) of the first candidate prediction mode at each sample or at multiple samples in the template is determined, and then the second cost of the candidate prediction mode with respect to the template is determined according to the second cost(s) at each sample or the multiple samples in the template. For example, a sum of second costs of the first candidate prediction mode at samples in the template is determined as the second cost of the candidate prediction mode with respect to the template.

Exemplarily, taking an SAD cost as an example, the cost of the first candidate prediction mode at the i-th sample (x, y) in the template may be determined according to the above formula (1).

It should be noted that, the second cost corresponding to the first candidate prediction mode with respect to the template is determined exemplarily according to the SAD. Optionally, the second cost corresponding to the first candidate prediction mode with respect to the template may also be determined according to calculation methods of cost such as SATD and MSE.

According to the foregoing method, the second cost of each of the M first candidate prediction modes may be determined, and then the following operation S203-A14 is performed.

S203-A14, an adjusted prediction mode corresponding to the j-th initial prediction mode is determined according to the second cost corresponding to each of the M first candidate prediction modes.

For example, a first candidate prediction mode with the lowest second cost among the M first candidate prediction modes is determined as the adjusted prediction mode corresponding to the j-th initial prediction mode.

The above embodiments exemplarily describe determination of the adjusted prediction mode corresponding to the j-th initial prediction mode among the K initial candidate prediction modes. With this reference, for each initial prediction mode among the K initial candidate prediction modes, a corresponding adjusted prediction mode can be determined, so as to obtain K adjusted prediction modes.

In this manner I, the encoding end firstly determines the weight derivation mode for the current block according to the K initial prediction modes, then refines the K initial prediction modes according to the weight derivation mode for the current block, such as by the manner of example 1 or example 2, to obtain K adjusted prediction modes, and finally obtains the prediction value of the current block by predicting the current block using the weight derivation mode for the current block and the K adjusted prediction modes.

In embodiments of the present disclosure, in addition to the above manner I, the encoding end may also determine the weight derivation mode for the current block and the K adjusted prediction modes by using the following manner II.

Manner II, the refinement of the prediction mode and the determination of the weight derivation mode for the current block are fused together and performed in parallel. In this case, the determination of the first cost corresponding to the i-th candidate weight derivation mode in S202-B above, according to the i-th candidate weight derivation mode and the K initial prediction modes, includes the operations at S202-B11 to S202-B12 as follows.

S202-B11, the K initial prediction modes are refined according to the i-th candidate weight derivation mode to obtain K first refined prediction modes corresponding to the i-th candidate weight derivation mode.

In this manner II, for the i-th candidate weight derivation mode among the N candidate weight derivation modes, the K initial prediction modes are first refined using the i-th candidate weight derivation mode, so as to obtain the K refined prediction modes corresponding to the i-th candidate weight derivation mode. For convenience of description, the K refined prediction modes corresponding to the i-th candidate weight derivation mode are denoted herein as K first refined prediction modes. Then the i-th candidate weight derivation mode and the K first refined prediction modes corresponding to the i-th candidate weight derivation mode, are used to determine the first cost corresponding to the i-th candidate weight derivation mode, so that a more accurate weight derivation mode and more accurate K adjusted prediction modes for the current block can be obtained.

The implementation of S202-B11 includes, but is not limited to, the following examples.

Example 1, at least one prediction mode associated with the i-th candidate weight derivation mode is determined, where the at least one prediction mode may be a prediction mode with a prediction angle that is parallel or approximately parallel to a partition line of the i-th candidate weight derivation mode or a prediction mode with a prediction angle that is perpendicular or approximately perpendicular to the partition line of the i-th candidate weight derivation mode. At least one initial prediction mode of the K initial prediction modes is replaced by a prediction mode in the at least one prediction mode associated with the i-th candidate weight derivation mode, to form multiple new combinations of prediction modes, where each of the combinations includes K prediction modes. For each of the new combinations of prediction modes, the K prediction modes included in that new combination and the i-th candidate weight derivation mode are used to predict the template, thus obtaining a prediction value of the template. According to the prediction value of the template and the reconstruction value of the template, a cost corresponding to that new combination of prediction modes is determined, thereby obtaining the cost corresponding to each of the new combinations of prediction modes in the multiple new combinations of prediction modes formed as described above. Similarly, the current block is predicted using the i-th candidate weight derivation mode and the K initial prediction modes, and the cost corresponding to the K initial prediction modes is determined. In this way, the encoding end may obtain K first refined prediction modes based on the cost corresponding to the new combination of prediction modes and the cost corresponding to the K initial prediction modes. For example, if the cost corresponding to new combination 1 of prediction modes is the lowest, the K prediction modes included in new combination 1 of prediction modes are determined as the K first refined prediction modes, where new combination 1 may include at least one initial prediction mode, or may not include the initial prediction mode.

Example 2, the refinement of the K initial prediction modes is performed by the operations of S202-B11-1 to S202-B11-4 below to obtain the K first refined prediction modes corresponding to the i-th candidate weight derivation mode.

S202-B11-1, a second template weight is determined according to the i-th candidate weight derivation mode.

The specific process of determining the second template weight according to the i-th candidate weight derivation mode can be referred to the specific description of the following embodiment of template weight derivation, which will not be repeated herein.

S202-B11-2, for an j-th initial prediction mode among the K initial prediction modes, determine M first candidate prediction modes corresponding to the j-th initial prediction mode, where M is a positive integer, and j is a positive integer from 1 to K.

It should be noted that the above operations S202-B11-2 and S202-B11-1 may be executed in any order, i.e., S202-B11-2 may be executed after S202-B11-1, before S202-B11-1, or in parallel with S202-B11-1, which is not limited herein.

In the example, the encoding end refines each of the K initial prediction modes using the i-th candidate weight derivation mode, so as to obtain a first refined prediction mode corresponding to each of the K initial prediction modes under the i-th candidate weight derivation mode, and thus obtain the K first refined prediction modes.

The process of determining the corresponding first refined prediction mode is the same for each of the K initial prediction modes. For ease of description, the embodiment of the present disclosure exemplarily describes the determination of the first refined prediction mode corresponding to the j-th initial prediction mode among the K initial prediction modes.

In the embodiment of the present application, for the j-th initial prediction mode, the encoding end first determines M first candidate prediction modes corresponding to the j-th initial prediction mode.

The manner of determining the M first candidate prediction modes corresponding to the j-th initial prediction mode at the encoding end includes the following two cases.

Case 1, if the j-th initial prediction mode is an intra prediction mode, M intra prediction modes similar to the j-th initial prediction mode are determined as the M first candidate prediction modes.

Case 2, if the j-th initial prediction mode is an inter prediction mode, a search is performed according to the j-th initial prediction mode to obtain M first motion information, and according to these M first motion information, the M first candidate prediction modes corresponding to the j-th initial prediction mode are determined.

In some embodiments, the above search according to the j-th initial prediction mode to obtain the M first motion information is as follows. A search is performed based on a motion vector corresponding to the j-th initial prediction mode to obtain M offsets. Further, based on these M offsets, M first motion information is obtained.

S202-B11-3, a third cost corresponding to prediction of the template using each of the M first candidate prediction modes is determined according to the second template weight.

After the M first candidate prediction modes corresponding to the j-th initial prediction mode are determined according to the method in Case 1 or Case 2 above, the cost corresponding to these M first candidate prediction modes is determined, and then the first refined prediction mode corresponding to the j-th initial prediction mode is determined according to the cost. For ease of description, the cost corresponding to the first candidate prediction mode in this case is denoted as the third cost.

Specifically, for each of the M first candidate prediction modes, the template of the current block is predicted using the first candidate prediction mode to obtain a prediction value, and then a third cost of the first candidate prediction mode with respect to the template according to the second template weight and the prediction value.

The following is an example of calculating the third cost of one of the M first candidate prediction modes with respect to the template.

For ease of description, the i-th sample in the template is taken as an example. The i-th sample can be understood as any point in the template, which means that the process of determining the third cost is the same for each point in the template and reference may be made to the i-th sample. Specifically, the template is predicted using the first candidate prediction mode to obtain prediction values of the template. A prediction value corresponding to the i-th sample in the prediction values of the template is denoted as the i-th prediction value, a reconstruction value corresponding to the i-th sample in the reconstruction values of the template is denoted as the i-th reconstruction value, and then, according to the i-th prediction value and the i-th reconstruction value as well as a weight of the i-th sample in the second template weights, a third cost of the first candidate prediction mode at the i-th sample is determined. According to the above method, the third cost(s) of the first candidate prediction mode at each sample or multiple samples in the template is determined, and thus a third cost of the first candidate prediction mode with respect to the template is determined according to the third cost(s) at each sample or multiple samples in the template. For example, the sum of the third costs of the first candidate prediction mode at samples in the template is determined as the third cost of the first candidate prediction mode with respect to the template.

Exemplarily, the third cost of the first candidate prediction mode with respect to the template may be determined with reference to the above formulas (1) and (2). Specifically, wTemplateValue[x][y] in the above formula (1) is replaced with the corresponding weight value of the sample (x, y) in the second template weights.

According to the above method, the third cost corresponding to each of the M first candidate prediction modes can be determined, and then, the following S202-B11-4 is performed.

S202-B11-4, a refined prediction mode corresponding to the j-th initial prediction mode is determined according to the third cost corresponding to each of the M first candidate prediction modes.

For example, a first candidate prediction mode with the lowest third cost among the M first candidate prediction modes is determined as the first refined prediction mode corresponding to the j-th initial prediction mode.

The above embodiment exemplarily describes determination of the first refined prediction mode corresponding to the j-th initial prediction mode among the K initial prediction modes. With reference to the above description, the first refined prediction mode corresponding to each initial prediction mode among the K initial prediction modes can be determined, thus obtaining the K first refined prediction modes under the i-th candidate weight derivation mode.

S202-B12, a first cost corresponding to the i-th candidate weight derivation mode is determined according to the i-th candidate weight derivation mode and the K first improved prediction modes.

Exemplarily, the template of the current block is predicted using the i-th candidate weight derivation mode and the K first refined prediction modes to obtain a second prediction value of the template, and a first cost corresponding to the i-th candidate weight derivation mode is determined according to the second prediction value of the template and the reconstruction value of the template. For example, a second template weight is derived using the i-th candidate weight derivation mode, the template is predicted using the K first refined prediction modes respectively to obtain K prediction values, the K prediction values are weighted using the second template weight to obtain a second prediction value of the template, and according to the second prediction value of the template and the reconstruction value of the template, the first cost corresponding to the i-th candidate weight derivation mode is determined.

The above describes exemplarily the determination of the first cost corresponding to the i-th candidate weight derivation mode. For each candidate weight derivation mode among the N candidate weight derivation modes, the above manner for determination of the first cost corresponding to the i-th candidate weight derivation mode can be used, so as to determine the first cost corresponding to each of the N candidate weight derivation modes, and then determine the weight derivation mode for the current block according to the first cost corresponding to each of among the N candidate weight derivation modes.

For example, the candidate weight derivation mode with the lowest first cost among the N candidate weight derivation modes is determined as the weight derivation mode for the current block.

For another example, according to the first cost corresponding to each of the N candidate weight derivation modes, the N candidate weight derivation modes are sorted to obtain a candidate weight derivation mode list. The weight derivation mode for the current block is determined according to the candidate weight derivation mode index in the candidate weight derivation mode list.

In this manner II, K first refined prediction modes corresponding to each of the N candidate weight derivation modes are determined. Based on this, determination of the K adjusted prediction modes according to the weight derivation mode for the current block in the above S203-A includes the following operations.

S203-A2, the K first refined prediction modes corresponding to the weight derivation mode for the current block are determined as the K adjusted prediction modes.

In this manner II, the refinement of the prediction modes and the determination of the weight derivation mode for the current block are fused together, i.e., during determining the first costs corresponding to the N candidate weight derivation modes, the K first refined prediction modes corresponding to each candidate weight derivation mode are determined. Therefore, after determining the weight derivation mode for the current block according to the first cost, the K first refined prediction modes corresponding to the weight derivation mode for the current block may be determined as K adjusted prediction modes, and then the current block may be predicted using the weight derivation mode for the current block and the K adjusted prediction modes to obtain the prediction value of the current block.

In this manner II, for each candidate weight derivation mode among the N candidate weight derivation modes, K first refined prediction modes corresponding to the candidate weight derivation mode are determined, and then the template is predicted according to each candidate weight derivation mode and its corresponding K first refined prediction modes to determine first costs, based on which the weight derivation mode for the current block can be more accurately determined from the N candidate weight derivation modes.

In embodiments of the present application, in addition to the above manner I and manner II, the encoding end may determine the weight derivation mode for the current block and the K adjusted prediction modes in the following manner III.

Manner III, in order to reduce the computational complexity, for the refinement of initial prediction modes, instead of using each of the candidate weight derivation modes to refine the initial prediction modes, simple P sub-templates, such as an all template, a left template, and an above template of the current block, are used to refine the initial prediction modes, so as to reduce the computational amount of refinement of the initial prediction modes. In this case, the determination of the first cost corresponding to the i-th candidate weight derivation mode according to the i-th candidate weight derivation mode and the K initial prediction modes in the above S202-B includes the operations of S202-B21 to S202-B23 as follows.

S202-B21, for the j-th initial prediction mode in the K initial prediction modes, second refined prediction modes for the j-th initial prediction mode with respect to P sub-templates respectively are determined, where P is a positive integer and j is a positive integer from 1 to K.

In this manner III, the encoding end refines the K initial prediction modes using the P sub-templates to obtain second refined prediction modes for each of the K initial prediction modes with respect to the P sub-templates. For each candidate weight derivation mode among the N candidate weight derivation modes, according to a correspondence between the candidate weight derivation mode and the P sub-templates, from the second refined prediction modes of each initial prediction mode among the K initial prediction modes with respect to the P sub-templates, the K second refined prediction modes corresponding to the candidate weight derivation mode are obtained, and then the template of the current block is predicted according to the candidate weight derivation mode and its corresponding K second prediction modes, so as to determine the first cost corresponding to that candidate weight derivation mode. Finally, a weight derivation mode for the current block is determined according to the first cost corresponding to each of the N candidate weight derivation modes. In manner III, the candidate prediction modes are no longer used individually to refine the K initial prediction modes, thus reducing the complexity of refinement of the initial prediction modes.

Exemplarily, the P sub-templates include at least one of the left template TM_L, the above template TM_A, and the all template TM_AL of the current block, where the all template TM_AL includes the left template TM_L and the above template TM_A.

In embodiments of the present disclosure, for each of the K initial prediction modes, the process of determining second refined prediction modes with respect to the P sub-templates at the encoding end is the same. For ease of description, the embodiments of the present application exemplarily describes the determination of second refined prediction modes of the j-th initial prediction mode in the K initial prediction modes with respect to the P sub-templates.

In one example, assuming that the P sub-templates include the left template TM_L, the above template TM_A, and the all template TM_AL of the current block, determination of second refined prediction modes of the j-th initial prediction mode with respect to the P sub-templates includes the following. A second refined prediction mode corresponding to the j-th initial prediction mode with respect to the left template TM_L is determined, a second refined prediction mode corresponding to the j-th initial prediction mode with respect to the above template TM_A is determined, and a second refined prediction mode corresponding to the j-th initial prediction mode with respect to the all template TM_AL is determined. That is, in this operation, with respect to each of the P sub-templates, the encoding end determines one second refined prediction mode corresponding to the j-th initial prediction mode.

The specific manner of determining the second refined prediction modes of the j-th initial prediction mode with respect to the P sub-templates is not limited in embodiments of the present disclosure.

In some embodiments, S202-B21 includes S202-B21-1 to S202-B21-3 as follows.

S202-B21-1, M first candidate prediction modes corresponding to the j-th initial prediction mode are determined, where M is a positive integer greater than 1.

The manner of determining the M first candidate prediction modes corresponding to the j-th initial prediction mode at the encoding end includes the following two cases.

Case 1, if the j-th initial prediction mode is an intra prediction mode, M intra prediction modes similar to the j-th initial prediction mode are determined as M first candidate prediction modes.

In case 2, if the j-th initial prediction mode is an inter prediction mode, a search is performed according to the j-th initial prediction mode to obtain M first motion information, and based on these M first motion information, M first candidate prediction modes corresponding to the j-th initial prediction mode are determined.

In some embodiments, searching according to the j-th initial prediction mode to obtain M first motion information includes: searching according to the j-th initial prediction mode to obtain M offsets, and obtaining M first motion information according to the M offsets.

S202-B21-2, for the p-th sub-template in the P sub-templates, fourth costs corresponding to prediction of the p-th sub-template using the M first candidate prediction modes respectively are determined, where p is a positive integer from 1 to P.

After determining the M first candidate prediction modes corresponding to the j-th initial prediction mode according to the method in Case 1 or Case 2 above, the encoding end determines the cost corresponding to each of these M first candidate prediction modes with respect to each of the P sub-templates, and then determines the second refined prediction mode corresponding to the j-th initial prediction mode with respect to each of the P sub-templates according to the costs. For ease of description, the cost corresponding to the first candidate prediction mode in this case is denoted as the fourth cost.

Specifically, taking the p-th sub-template among the P sub-templates as an example, for any the M first candidate prediction modes, the p-th sub-template is predicted using the first candidate prediction mode to obtain a prediction value of the p-th sub-template. According to the prediction value of the p-th sub-template and a reconstruction value of the p-th sub-template, a fourth cost of the first candidate prediction mode with respect to the p-th sub-template is determined. With reference to the method, for each of the M first candidate prediction modes, fourth costs with respect to the P sub-templates respectively may be determined.

By way of example, assume that the j-th initial prediction mode corresponds to three first candidate prediction modes, denoted as first candidate prediction mode 1, first candidate prediction mode 2, and first candidate prediction mode 3, respectively, and assume that the P sub-templates include the left template TM_L, the above template TM_A, and the all template TM_AL. Firstly, for the left template TM_L, the left template TM_L is predicted using first candidate prediction mode 1, first candidate prediction mode 2, and first candidate prediction mode 3 respectively, so as to obtain prediction value 1, prediction value 2, and prediction value 3 respectively. Next, a fourth cost of first candidate prediction mode 1 with respect to the left template TM_L is determined according to prediction value 1 and a reconstruction value of the left template TM_L, a fourth cost of first candidate prediction mode 2 with respect to the left template TM_L is determined according to prediction value 2 and the reconstruction value of the left template TM_L, and a fourth cost of first candidate prediction mode 3 with respect to the left template TM_L is determined according to prediction value 3 and the reconstruction value of the left template TM_L.

Similarly, for the above template TM_A, the above template TM_A is predicted using first candidate prediction mode 1, first candidate prediction mode 2, and first candidate prediction mode 3 respectively, so as to obtain prediction value 4, prediction value 5, and prediction value 6 respectively. Next, a fourth cost of first candidate prediction mode 1 with respect to the above template TM_A is determined according to prediction value 4 and a reconstruction value of the above template TM_A, a fourth cost of first candidate prediction mode 2 with respect to the above template TM_A is determined according to prediction value 5 and the reconstruction value of the above template TM_A, and a fourth cost of first candidate prediction mode 3 with respect to the above template TM_A is determined according to prediction value 6 and the reconstruction value of the above template TM_A.

Similarly, for the all template TM_AL, the all template TM_AL is predicted using first candidate prediction mode 1, first candidate prediction mode 2, and first candidate prediction mode 3 respectively, so as to obtain prediction value 7, prediction value 8, and prediction value 9 respectively. Next, a fourth cost of first candidate prediction mode 1 with respect to the all template TM_AL is determined according to prediction value 7 and a reconstruction value of the all template TM_AL, a fourth cost of first candidate prediction mode 2 with respect to the all template TM_AL is determined according to prediction value 8 and the reconstruction value of the all template TM_AL, and a fourth cost of first candidate prediction mode 3 with respect to the all template TM_AL is determined according to prediction value 9 and the reconstruction value of the all template TM_AL.

According to the above method, for each of the M first candidate prediction modes corresponding to the j-th initial prediction mode, the fourth costs with respect to the P sub-templates are determined respectively, and then the following S202-B21-3 is performed.

S202-B21-3, a second refined prediction mode for the j-th initial prediction mode with respect to the p-th sub-template is determined according to the fourth costs of the M first candidate prediction modes with respect to the p-th sub-template, respectively.

For example, among the M first candidate prediction modes, a first candidate prediction mode corresponding to the lowest fourth cost with respect to the p-th sub-template is determined as the second refined prediction mode corresponding to the j-th initial prediction mode with respect to the p-th sub-template.

Continuing with the above example, assume that the j-th initial prediction mode corresponds to three first candidate prediction modes, denoted as first candidate prediction mode 1, first candidate prediction mode 2, and first candidate prediction mode 3, respectively, and assume that the P sub-templates include the left template TM_L, the above template TM_A, and the all template TM_AL. For the left template TM_L, assume that a fourth cost of first candidate prediction mode 1 with respect to the left template TM_L is lower than a fourth cost of first candidate prediction mode 2 with respect to the left template TM_L, and the fourth cost of first candidate prediction mode 2 with respect to the left template TM_L is lower than a fourth cost of first candidate prediction mode 3 with respect to the left template TM_L, then first candidate prediction mode 1 may be determined as a second refined prediction mode corresponding to the j-th initial prediction mode with respect to the left template TM_L.

Similarly, for the above template TM_A, assume that a fourth cost of first candidate prediction mode 2 with respect to the above template TM_A is lower than a fourth cost of first candidate prediction mode 1 with respect to the above template TM_A, and the fourth cost of first candidate prediction mode 1 with respect to the above template TM_A is lower than a fourth cost of first candidate prediction mode 3 with respect to the above template TM_A, then first candidate prediction mode 2 may be determined as a second refined prediction mode corresponding to the j-th initial prediction mode with respect to the above template TM_A.

Similarly, for the all template TM_AL, assume that a fourth cost of first candidate prediction mode 2 with respect to the all template TM_AL is lower than a fourth cost of first candidate prediction mode 1 with respect to the all template TM_AL, and the fourth cost of first candidate prediction mode 1 with respect to the all template TM_AL is lower than a fourth cost of first candidate prediction mode 3 with respect to the all template TM_AL, then first candidate prediction mode 2 may be determined as a second refined prediction mode corresponding to the j-th initial prediction mode with respect to the all template TM_AL.

According to the above method, a second refined prediction mode with respect to each of the P sub-templates may be determined for each of the K initial prediction modes.

Exemplarily, assume that K=2, i.e., the 2 initial prediction modes are denoted as the first prediction mode and the second prediction mode, and assume that the P sub-templates are the left template TM_L, the above template TM_A, and the all template TM_AL. According to the method described above, second refined prediction modes for each of the first prediction mode and the second prediction mode with respect to the left template TM_L, the above template TM_A, and the all templates respectively are determined and shown in Table 6.

S202-B22, according to the i-th candidate weight derivation mode, K second refined prediction modes corresponding to the i-th candidate weight derivation mode are determined from the K second refined prediction modes of the K initial prediction modes with respect to the P sub-templates, respectively.

Specifically, for an i-th candidate weight derivation mode among the N candidate weight derivation modes, according to the sub-template corresponding to the i-th candidate weight derivation mode, K second refined prediction modes corresponding to the i-th candidate weight derivation mode are determined from the second refined prediction modes of each of the K initial prediction modes with respect to the P sub-templates.

For example, taking K=2 as an example, the sub-templates corresponding to the i-th candidate weight derivation mode are the above template TM_A and the all template TM_AL. Referring to the above Table 6, it can be determined that the second refined prediction mode corresponding to the first prediction mode with respect to the above template TM_A is second refined prediction mode 12, and the second refined prediction mode corresponding to the second prediction mode with respect to the all template TM_AL is second refined prediction mode 23. Therefore, the two second refined prediction modes corresponding to the i-th candidate weight derived mode may be determined as second refined prediction mode 12 and second refined prediction mode 23.

In one possible implementation, the encoding end determines a partition angle corresponding to the i-th candidate weight derivation mode, and according to the correspondence between the partition angles and the templates of the prediction modes (with specific reference to Table 5 above), determines the K second refined prediction modes corresponding to the i-th candidate weight derivation mode from the second refined prediction modes of the K initial prediction modes with respect to the P sub-templates, respectively.

Exemplarily, taking K=2 as an example, according to the above Table 2, an angle index corresponding to the i-th candidate weight derivation mode is determined. For example, if the i-th candidate weight derivation mode is 27, the corresponding angle index is 12. In the correspondence between the partition angles and templates of the prediction modes illustrated in the above Table 5, a template corresponding to the first prediction mode and a template corresponding to the second prediction mode under the angle index are queried. Then, according to the template corresponding to the first prediction mode and the template corresponding to the second prediction mode, two second refined prediction modes corresponding to the i-th candidate weight derivation mode are determined from the above Table 6. For example, it is found from Table 5 that the template corresponding to the first prediction mode is the above template TM_A, and the template corresponding to the second prediction mode under the angle index is the all template TM_AL, and then from Table 6, second refined prediction mode 12 corresponding to the above template TM_A in the second refined prediction modes corresponding to the first prediction mode, and second refined prediction mode 23 corresponding to the all template TM_AL in the second refined prediction modes corresponding to the second prediction mode corresponding to the second prediction mode, are determined as the two second refined prediction modes corresponding to the i-th candidate weights derivation mode.

According to the above method, K second refined prediction modes corresponding to the i-th candidate weight mode among the N candidate weight derivation modes are determined, and then S202-B23 is performed as follows.

S202-B23, according to the i-th candidate weight derivation mode and the K second refined prediction modes corresponding to the i-th candidate weight derivation mode, a first cost corresponding to the i-th candidate weight derivation mode is determined.

Specifically, the template of the current block is predicted using the i-th candidate weight derivation mode and the K second refined prediction modes to obtain a third prediction value of the template, and a first cost corresponding to the i-th candidate weight derivation mode is determined according to the third prediction value of the template and the reconstruction value of the template. For example, the template weights are determined based on the i-th candidate weight derivation mode, the template of the current block are predicted using the K second refined prediction modes respectively to obtain K prediction values, the K prediction values are weighted using the determined template weights to obtain a prediction value of the template corresponding to the i-th candidate weight derivation mode, and then the first cost corresponding to the i-th candidate weight derivation mode is determined according to the prediction value and the reconstruction value of the template.

The above exemplarily describes determination of the first cost corresponding to the i-th candidate weight derivation mode. For each candidate weight derivation mode among the N candidate weight derivation modes, the above manner of determining the first cost corresponding to the i-th candidate weight derivation mode may be used, so as to determine the first costs corresponding to the N candidate weight derivation modes respectively. Then the weight derivation mode for the current block is determined according to the first costs corresponding to the N candidate weight derivation modes respectively.

For example, a candidate weight derivation mode with the lowest first cost among the N candidate weight derivation modes is determined as the weight derivation mode for the current block.

For another example, according to the first cost corresponding to each of the N candidate weight derivation modes, the N candidate weight derivation modes are sorted to obtain a candidate weight derivation mode list. The weight derivation mode for the current block is determined according to the candidate weight derivation mode list.

In this manner III, the K initial prediction modes are refined using the P sub-templates to obtain a second refined prediction mode for each of the K initial prediction modes with respect to each of the P sub-templates. In this way, in subsequent determination of the first cost corresponding to each candidate weight derivation mode among the N candidate weight derivation modes, the K initial prediction modes are no longer refined separately according to the different candidate weight derivation modes, but the K second refined prediction modes corresponding to each candidate weight derivation mode are queried from the second refined prediction modes for each of the K initial prediction mode with respect to each of the P sub-templates, thereby reducing the complexity of refining the initial prediction modes and increasing the speed of calculating the first cost corresponding to each candidate weight derivation mode, so that the weight derivation mode for the current block can be quickly determined from the N candidate weight derivation modes.

In this manner III, based on the P sub-templates, K second refined prediction modes corresponding to each of the N candidate weight derivation modes are determined. Based on this, the manner of determining the K adjusted prediction modes according to the weight derivation mode for the current block in the above S203-A includes, but is not limited to, the following.

Manner 1, the K second refined prediction modes corresponding to the weight derivation mode for the current block are determined as the K adjusted prediction modes.

In manner III above, during determining the first cost corresponding to each of the N candidate weight derivation modes, K second refined prediction modes corresponding to each candidate weight derivation mode are determined. In this case, after determining the weight derivation mode for the current block according to the first cost, the K second refined prediction modes corresponding to the weight derivation mode for the current block can be directly determined as the K adjusted prediction modes.

Manner 2, in order to further improve the accuracy of the K adjusted prediction modes, the K second refined prediction modes corresponding to the weight derivation mode for the current block are refined to obtain the K adjusted prediction modes. In this case, the above S203-A includes the following operations.

S203-A3, the K second refined prediction modes are refined according to the weight derivation mode for the current block to obtain the K adjusted prediction modes.

The implementation of S203-A3 includes, but is not limited to, the following examples.

Example 1, at least one prediction mode associated with the weight derivation mode for the current block is determined, where the at least one prediction mode may be a prediction mode with a prediction angle that is parallel or approximately parallel to a partition line of the weight derivation mode for the current block or a prediction mode with a prediction angle that is perpendicular or approximately perpendicular to the partition line of the weight derivation mode for the current block. At least one of the K second refined prediction modes is replaced by a prediction mode in the at least one prediction mode associated with the weight derivation mode for the current block, to form multiple new combinations of prediction modes, where each of the combinations includes K prediction modes. For each of the new combinations of prediction modes, the K prediction modes included in that new combination and the weight derivation mode for the current block are used to predict the template, thus obtaining a prediction value of the template. According to the prediction value of the template and the reconstruction value of the template, a cost corresponding to that new combination of prediction modes is determined, thereby obtaining the cost corresponding to each of the new combinations of prediction modes in the multiple new combinations of prediction modes formed as described above. Similarly, the current block is predicted using the weight derivation mode for the current block and the K initial prediction modes, and the cost corresponding to the K second refined prediction modes is determined. In this way, the encoding end may obtain K adjusted prediction modes based on the cost corresponding to the new combination of prediction modes and the costs corresponding to the K second refined prediction modes. For example, if the cost corresponding to new combination 1 of prediction modes is the lowest, the K prediction modes included in new combination 1 of prediction modes are determined as the K adjusted prediction modes, where new combination 1 may include at least one initial prediction mode, or may not include the initial prediction mode.

In Example 2, the K second prediction modes are refined to obtain the K adjusted prediction modes according to the operations from S203-A31 to S203-A34 as follows.

S203-A31, the first template weight is determined according to the weight derivation mode for the current block.

For the specific process of determining the first template weight according to the weight derivation mode for the current block, reference may be made to the embodiment of template weight derivation, which will not be repeated herein.

S203-A32, for the k-th second refined prediction mode among the K second refined prediction modes, P second candidate prediction modes corresponding to the k-th second refined prediction mode are determined, where P is a positive integer greater than 1, and k is a positive integer from 1 to K.

It should be noted that the above operations S203-A32 and S203-A31 may be executed in any order, i.e., S203-A32 may be executed after S203-A31, before S203-A31, or in parallel with S203-A31, which is not limited herein.

In this example, the encoding end refines each of the K second refined prediction modes using the weight derivation mode for the current block to obtain an adjusted prediction mode corresponding to each of the K second refined prediction modes, and thus the K adjusted prediction modes are obtained.

The process of determining the adjusted prediction mode is the same for each second refined prediction mode among the K second refined prediction modes. For ease of description, the embodiments of the present application exemplarily describe the determination of the adjusted prediction mode corresponding to the k-th second refined prediction mode among the K second refined prediction modes.

In an embodiment of the present application, for the k-th second refined prediction mode, the encoding end first determines P second candidate prediction modes corresponding to the k-th second refined prediction mode.

The manner for the encoding end to determine the P second candidate prediction modes corresponding to the k-th second refined prediction mode includes the following two cases.

Case 1, if the k-th second refined prediction mode is an intra prediction mode, P intra prediction modes that are similar to the k-th second refined prediction mode are determined as the P second candidate prediction modes. For example, if the k-th second refined prediction mode is an angular prediction mode, P angular prediction modes with angles that are similar (or close) to the angle of the k-th second refined prediction mode are determined as the P second candidate prediction modes corresponding to the k-th second refined prediction mode.

Case 2, if the k-th second refined prediction mode is an inter prediction mode, a search is performed based on the k-th second refined prediction mode to obtain P second motion information, and based on these P second motion information, P second candidate prediction modes corresponding to the k-th second refined prediction mode are determined. For example, for the k-th second refined prediction mode with a motion vector (xInit, yInit), a search range is set to be, for example, a rectangular region from xInit−sR to xInit+sR in the horizontal direction and from yInit−sR to yInit+sR in the vertical direction, where the sR may be 2, 4, 8, and the like. Each motion vector within this rectangular region may be combined with other information of the k-th second refined prediction mode, such as a reference picture index and a prediction list flag, etc., to determine one motion information and thus one prediction mode, such that P second candidate prediction modes corresponding to the k-th second refined prediction mode may be obtained.

In some embodiments, the above search according to the k-th second refined prediction mode to obtain the P second motion information is as follows. A search is performed based on a motion vector corresponding to the k-th second refined prediction mode to obtain P offsets. Further, based on these P offsets, P second motion information is obtained.

S203-A33, a fifth cost corresponding to prediction of the template using each of the P second candidate prediction modes is determined according to the second template weight.

After the P second candidate prediction modes corresponding to the k-th second refined prediction mode are determined according to the method in Case 1 or Case 2 above, the costs corresponding to these P second candidate prediction modes are determined, and then an adjusted prediction mode corresponding to the k-th second refined prediction mode is determined according to the costs. For ease of description, the cost corresponding to the second candidate prediction mode in this case is denoted as the fifth cost.

Specifically, for each of the P second candidate prediction modes, the template of the current block is predicted using the second candidate prediction mode to obtain one prediction value, and then a fifth cost of the second candidate prediction mode with respect to the template is determined based on the second template weight and the prediction value. Taking a sample on the template as an example, the sample is predicted using the second candidate prediction mode to obtain a prediction value of the sample, a template weight corresponding to the sample is determined from the first template weight, and a product of the prediction value and the template weight of the sample is determined to be a prediction value of the second candidate prediction mode at the sample. With reference to the manner, prediction values under the second candidate prediction mode at each sample in the template can be obtained, and these prediction values form prediction values of the template corresponding to the second candidate prediction mode, and based on the prediction values and the reconstruction values of the template, a fifth cost corresponding to the second candidate prediction mode is determined.

According to the above method, a fifth cost corresponding to each of the P second candidate prediction modes can be determined, and then the following S203-A14 are performed.

S203-A34, the adjusted prediction mode corresponding to the k-th second refined prediction mode is determined according to the fifth costs corresponding to the P second candidate prediction modes.

For example, a second candidate prediction mode with the fifth lowest cost among the P second candidate prediction modes is determined as the adjusted prediction mode corresponding to the k-th second refined prediction mode.

The above embodiment exemplarily describes determination of an adjusted prediction mode corresponding to a k-th second refined prediction mode among the K second refined prediction modes, and with reference to the above description, the adjusted prediction mode corresponding to each of the K second refined prediction modes can be determined, and thus K adjusted prediction modes can be obtained.

In this manner 2, the encoding end first refines the K initial prediction modes using the P sub-templates to obtain the K second refined prediction modes corresponding to the weight derivation mode for the current block, and then refines the K second refined prediction modes corresponding to the weight derivation mode for the current block using the weight derivation mode for the current block, so as to obtain the accurate K adjusted prediction modes. In this way, when the current block is predicted using these K adjusted prediction modes and the weight derivation mode for the current block, the accuracy of the prediction can be further improved.

In embodiments of the present application, by the method described above, the weight derivation mode and K adjusted prediction modes for the current block can be determined, and then the prediction value of the current block can be obtained by predicting the current block using the weight derivation mode and the K adjusted prediction modes for the current block.

In the disclosure, the manner for determining the weight derivation mode and K adjusted prediction modes for the current block includes, but is not limited to, the following manners.

Manner I: during determination of the first template weight according to the weight derivation mode for the current block, if the first template weight is determined according to the weight derivation mode but a weight corresponding to a sample in the current block is not yet determined, the foregoing operation S103-B includes the following operations.

S203-B11, K prediction values are determined according to the K adjusted prediction modes.

S203-B12, weights of the prediction values are determined according to the weight derivation mode for the current block.

S203-B13, the prediction value of the current block is determined according to the K prediction values and the weights of the K prediction values.

It should be noted that, in the disclosure, the weight derivation mode for the current block is used to determine weights of prediction values used for the current block. Specifically, the weight derivation mode for the current block may be a mode for deriving the weights of the prediction values. For a block of a given length and width, each weight derivation mode may be used to derive one weight matrix of prediction values. For blocks of the same size, weight matrices of prediction values derived from different weight derivation modes may be different.

It can be understood that, in the embodiment of the disclosure, at the encoding end, when determining the prediction value of the current block based on the K adjusted prediction modes and the weights of the prediction values, the K prediction values may be firstly determined according to the K adjusted prediction modes, and then weighted averaging is performed on the K prediction values according to the weights of the prediction values, so as to obtain the prediction value of the current block.

In this manner I, it may be understood that determination of first template weight and determination of weights of the prediction values according to the weight derivation mode for the current block, are two independent processes, which do not interfere with each other.

In some embodiments, the prediction value of the current block may also be determined in the following manner II.

Manner II: If a weight of a sample in a merge region consisting of a template region and the current block is determined according to the weight derivation mode for the current block during determination of the first template weight, S203-B includes the following operations.

S203-B21, K prediction values are determined according to the K adjusted prediction modes.

S203-B22, weights of the K prediction values are determined according to the weight of the sample in the merge region.

S203-B23, the prediction value of the current block is determined according to the K prediction values and the weights of the K prediction values.

In manner II, during weight derivation, the weight of the sample in the merge region is derived according to the weight derivation mode for the current block, where the merge region includes the current block and the template region of the current block, so that weights corresponding to the current block in the merge region are determined as the weights of the prediction values, and a weight corresponding to the template region in the merge region is determined as the first template weight. That is, in manner II, the template region and the current block are taken as a whole, so that the first template weight and the weights of the prediction values are derived in one step, thereby reducing steps for weight derivation and improving prediction effect.

In some embodiments, the foregoing prediction process is performed on a sample basis, and accordingly, the weight is a weight corresponding to a sample. In this case, when predicting the current block, sample A in the current block is predicted with each of the K adjusted prediction modes, so as to obtain K prediction values at sample A for the K adjusted prediction modes; weights of the K prediction values at sample A are determined according to the weight derivation mode for the current block; and the K prediction values are weighted so as to obtain a final prediction value of sample A. The foregoing steps are performed on each sample in the current block, and a prediction value of each sample in the current block can be obtained, where the prediction value of each sample in the current block forms a prediction value of the current block. For example, K=2, sample A in the current block is predicted with the first prediction mode, to obtain a first prediction value of sample A; sample A is predicted with the second prediction mode, to obtain a second prediction value of sample A; and the first prediction value and the second prediction value are weighted according to weights of prediction values corresponding to sample A, to obtain a prediction value of sample A.

In an example, for example, K=2, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to weights of prediction values to obtain the prediction value of the current block. For example, sample A is predicted with the first intra prediction mode to obtain a first prediction value of sample A, sample A is predicted with the second intra prediction mode to obtain a second prediction value of sample A, and the first prediction value and the second prediction value are weighted according to weights of prediction values corresponding to sample A, so as to obtain the prediction value of sample A.

In some embodiments, if the j-th adjusted prediction mode in the K adjusted prediction modes is an inter prediction mode, determining the prediction value of the current block according to the K adjusted prediction modes and the weight derivation mode for the current block in S203-B includes the following operations.

S203-B31, motion information is determined according to the j-th adjusted prediction mode.

S203-B32, a j-th prediction value is determined according to the motion information.

S203-B33, (K−1) prediction values are determined according to prediction modes other than the j-th adjusted prediction mode in the K adjusted prediction modes.

S203-B34, weights of the K prediction values are determined according to the weight derivation mode for the current block.

S203-B35, the prediction value of the current block is determined according to the j-th prediction value, the (K−1) prediction values, and the weights of the K prediction values.

For example, K=2, if the first prediction mode is an intra prediction mode and the second prediction mode is an inter prediction mode, the intra prediction mode is used for prediction to obtain a first prediction value, the inter prediction mode is used for prediction to obtain a second prediction value, and the first prediction value and the second prediction value are weighted according to weights of prediction values to obtain the prediction value of the current block. In this example, the intra prediction mode is used for prediction of each sample in the current block, so as to obtain a prediction value of each sample in the current block, and the prediction value of each sample in the current block constitutes a first prediction value of the current block. The inter prediction mode is used to determine motion information, a best matching block of the current block is determined according to the motion information, and the best matching block is determined as a second prediction value of the current block. According to weights of prediction values of samples in the current block, the first prediction value and the second prediction value of the current block are weighted on a sample basis, so as to obtain the prediction value of the current block. For example, for sample A in the current block, a first prediction value corresponding to sample A in the first prediction value of the current block and a second prediction value corresponding to sample A in the second prediction value of the current block are weighted according to weights of prediction values of sample A, so as to obtain a prediction value of sample A.

In some embodiments, if K>2, weights of prediction values corresponding to any two adjusted prediction modes in the K adjusted prediction modes may be determined according to the weight derivation mode for the current block, and a weight(s) of a prediction value(s) corresponding to other adjusted prediction mode(s) in the K adjusted prediction modes may be a preset value(s). For example, K=3, a weight of a prediction value corresponding to the first prediction mode and a weight of a prediction value corresponding to the second prediction mode are derived according to the weight derivation mode for the current block, and a weight of a prediction value corresponding to a third prediction mode is a preset value. In some embodiments, if a total prediction-value weight (that is, total weight of prediction values) corresponding to the K prediction modes is constant, for example, is 8, a weight of a prediction value corresponding to each of the K adjusted prediction modes may be determined according to a preset weight proportion. Assuming that the weight of the prediction value corresponding to the third prediction mode accounts for ¼ of the total prediction-value weight, it may be determined that the weight of the prediction value of the third prediction mode is 2, and the remaining ¾ of the total prediction-value weight is allocated to the first prediction mode and the second prediction mode. Exemplarily, if a weight of the prediction value corresponding to the first prediction mode derived according to the weight derivation mode for the current block is 3, it is determined that the weight of the prediction value corresponding to the first prediction mode is (¾)*3, and the weight of the prediction value corresponding to the second prediction mode is (¾)*5.

According to the above method, at the encoding end, the prediction value of the current block is determined, then a difference between the current block and the prediction value is determined as a residual value of the current block. The residual value of the current block is transformed to obtain transform coefficients, which are then quantized to obtain quantization coefficients. The quantization coefficients are encoded to obtain the bitstream.

According to the prediction method provided in the embodiments of the present disclosure, the encoding end determines K initial prediction modes, determines the weight derivation mode for the current block according to the K initial prediction modes, and determines the prediction value of the current block according to the weight derivation mode for the current block. That is, the present disclosure determines the weight derivation mode for the current block through the K initial prediction modes, which can enrich the determination manners for the weight derivation mode. In addition, in this disclosure, transmission of an index of the weight derivation mode through the bitstream is not needed at the encoding end, thus saving codewords and reducing the coding cost.

It should be understood that, FIG. 14 to FIG. 19 are merely examples of the disclosure, and should not be construed as limitations on the disclosure.

Preferable implementations of the disclosure have been described in detail above with reference to the accompanying drawings. However, the disclosure is not limited to the details described in the foregoing implementations. Within the scope of the technical concept of the disclosure, various simple modifications can be made to the technical solutions of the disclosure, and these simple modifications all fall within the protection scope of the disclosure. For example, various technical features described in the foregoing implementations may be combined in any suitable manner without contradiction, and in order to avoid unnecessary redundancy, various possible combinations are not further described in the disclosure. For another example, various implementations of the disclosure may also be combined in any manner, and as long as the combinations do not depart from the idea of the disclosure, they should also be considered as contents disclosed in the disclosure.

It should also be understood that, in various method embodiments of the disclosure, the magnitude of a sequence number of each of the foregoing processes does not mean an execution order, and an execution order of each process should be determined according to a function and an internal logic of the process, which shall not constitute any limitation on an implementation process of embodiments of the disclosure. In addition, the term "and/or" herein only describes an association between associated objects, which means that there can be three relationships. Specifically, A and/or B can mean A alone, both A and B exist, and B alone. Besides, the character "/" herein generally indicates that the associated objects are in an "or" relationship.

The method embodiments of the disclosure are described in detail above with reference to FIG. 14 to FIG. 19, and the apparatus embodiments of the disclosure are described in detail below with reference to FIG. 20 to FIG. 22.

Figure 20:
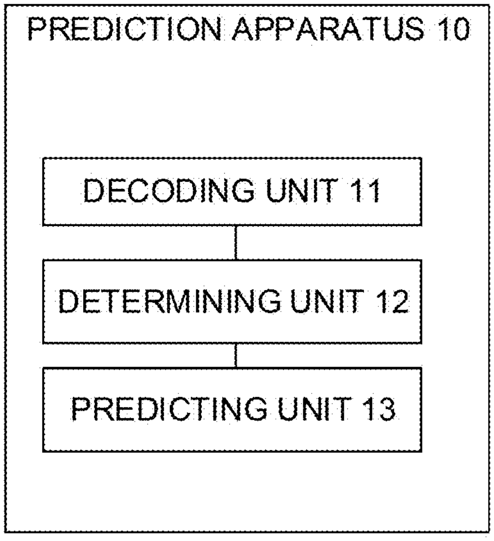
FIG. 20 is a schematic block diagram of a prediction apparatus provided in an embodiment of the disclosure.

FIG. 20 is a schematic block diagram of a prediction apparatus provided in an embodiment of the disclosure. The prediction apparatus 10 is applied to the foregoing video decoder.

As illustrated in FIG. 20, the prediction apparatus 10 includes a decoding unit 11, a determining unit 12, and a predicting unit 13.

The decoding unit is configured to decode a bitstream to determine K initial prediction modes, K being an integer greater than 1

The determining unit 12 is configured to determine a weight derivation mode for a current block according to the K initial prediction modes.

The predicting unit 13 is configured to determine a prediction value of the current block according to the weight derivation mode for the current block.

In some embodiments, the predicting unit 13 is specifically configured to determine K adjusted prediction modes according to the weight derivation mode for the current block, and determine the prediction value of the current block according to the K adjusted prediction modes and the weight derivation mode for the current block.

In some embodiments, the determining unit 12 is specifically configured to: determine N candidate weight derivation modes, N being an integer greater than 1; for an i-th candidate weight derivation mode in the N candidate weight derivation modes, determine a first cost corresponding to the i-th candidate weight derivation mode according the i-th candidate weight derivation mode and the K initial prediction modes, i being a positive integer from 1 to N; and determine the weight derivation mode for the current block according to first costs respectively corresponding to the N candidate weight derivation modes.

In some embodiments, the determining unit 12 is specifically configured to: predict a template of the current block using the i-th candidate weight derivation mode and the K initial prediction modes, to obtain a first prediction value of the template; and determine the first cost corresponding to the i-th candidate weight derivation mode according to the first prediction value of the template and a reconstruction value of the template.

In some embodiments, the determining unit 12 is specifically configured to obtain the K adjusted prediction modes by refining the K initial prediction modes according to the weight derivation mode for the current block.

In some embodiments, the determining unit 12 is specifically configured to: determine a first template weight according to the weight derivation mode for the current block; for a j-th initial prediction mode in the K initial prediction modes, determine M first candidate prediction modes corresponding to the j-th initial prediction mode, M being a positive integer greater than 1, and j being a positive integer from 1 to K; determine, according to the first template weight, a second cost corresponding to prediction of the template using each of the M first candidate prediction modes; and determine an adjusted prediction mode corresponding to the j-th initial prediction mode according to second costs respectively corresponding to the M first candidate prediction modes.

In some embodiments, the determining unit 12 is specifically configured to determine, among the M first candidate prediction modes, a first candidate prediction mode with a lowest second cost as the adjusted prediction mode corresponding to the j-th initial prediction mode.

In some embodiments, the determining unit 12 is specifically configured to: obtain K first refined prediction modes corresponding to the i-th candidate weight derivation mode by refining the K initial prediction modes according to the i-th candidate weight derivation mode; and determine the first cost corresponding to the i-th candidate weight derivation mode according to the i-th candidate weight derivation mode and the K first refined prediction modes.

In some embodiments, the determining unit 12 is specifically configured to determine a second template weight according to the i-th candidate weight derivation mode; for a j-th initial prediction mode in the K initial prediction modes, determine M first candidate prediction modes corresponding to the j-th initial prediction mode, M being a positive integer greater than 1, and j being a positive integer from 1 to K; determine, according to the second template weight, a third cost corresponding to prediction of the template using each of M first candidate prediction modes; and determine a first refined prediction mode corresponding to the j-th initial prediction mode according to third costs respectively corresponding to the M first candidate prediction modes.

In some embodiments, the determining unit 12 is specifically configured to determine, among the M first candidate prediction modes, a first candidate prediction mode with a lowest third cost as the first refined prediction mode corresponding to the j-th initial prediction mode.

In some embodiments, the determining unit 12 is specifically configured to: obtain a second prediction value of the template by predicting the template of the current block using the i-th candidate weight derivation mode and the K first refined prediction modes; and determine the first cost corresponding to the i-th candidate weight derivation mode according to the second prediction value of the template and a reconstruction value of the template.

In some embodiments, the determining unit 12 is specifically configured to determine K first refined prediction modes corresponding to the weight derivation mode for the current block as the K adjusted prediction modes.

In some embodiments, the determining unit 12 is specifically configured to: for a j-th initial prediction mode in the K initial prediction modes, determine a second refined prediction mode corresponding to the j-th initial prediction mode with respect to P sub-templates, P being a positive integer, j being a positive integer from 1 to K; determine, from second refined prediction modes respectively corresponding to the K initial prediction modes with respect to the P sub-templates, K second refined prediction modes corresponding to the i-th candidate weight derivation mode according to the i-th candidate weight derivation mode; and determine the first cost corresponding to the i-th candidate weight derivation mode according to the i-th candidate weight derivation mode and the K second refined prediction modes.

In some embodiments, the determining unit 12 is specifically configured to: determine a partition angle corresponding to the i-th candidate weight derivation mode; and determine, from the second refined prediction modes respectively corresponding to the K initial prediction modes with respect to the P sub-templates, K second refined prediction modes corresponding to the i-th candidate weight derivation mode according to correspondence between partition angles and templates corresponding to prediction modes.

Optionally, the P sub-templates include at least one of a left template, an above template, or an all template for the current block.

In some embodiments, the determining unit 12 is specifically configured to determine M first candidate prediction modes corresponding to the j-th initial prediction mode, M being a positive integer greater than 1; for a p-th sub-template of the P sub-templates, determine a fourth cost corresponding to prediction of the p-th sub-template using each of the M first candidate prediction modes, p being a positive integer from 1 to P; and determine the second refined prediction mode corresponding to the j-th initial prediction mode with respect to the p-th sub-template according to fourth costs respectively corresponding to the M first candidate prediction modes with respect to the p-th sub-template.

In some embodiments, the determining unit 12 is specifically configured to determine, among the M first candidate prediction modes, a first candidate prediction mode with a lowest fourth cost with respect to the p-th sub-template as the second refined prediction mode corresponding to the j-th initial prediction mode with respect to the p-th sub-template.

In some embodiments, the determining unit 12 is specifically configured to: for any first candidate prediction mode of the M first candidate prediction modes, obtain a prediction value of the p-th sub-template by predicting the p-th sub-template using the first candidate prediction mode; and determine the fourth cost corresponding to the first candidate prediction mode with respect to the p-th sub-template according to the prediction value of the p-th sub-template and a reconstruction value of the p-th sub-template.

In some embodiments, the determining unit 12 is specifically configured to: obtain a third prediction value of the template by predicting the template of the current block using the i-th candidate weight derivation mode and the K second refined prediction modes; and determine the first cost corresponding to the i-th candidate weight derivation mode according to the third prediction value of the template and a reconstruction value of the template.

In some embodiments, the determining unit 12 is specifically configured to determine the K adjusted prediction modes according to K second refined prediction modes corresponding to the weight derivation mode for the current block.

In some embodiments, the determining unit 12 is specifically configured to determine the K second refined prediction modes corresponding to the weight derivation mode for the current block as the K adjusted prediction modes.

In some embodiments, the determining unit 12 is specifically configured to obtain the K adjusted prediction modes by refining the K second refined prediction modes according to the weight derivation mode for the current block.

In some embodiments, the determining unit 12 is specifically configured to: determine a first template weight according to the weight derivation mode for the current block; for a k-th second refined prediction mode in the K second refined prediction modes, determine P second candidate prediction modes corresponding to the k-th second refined prediction mode, P being a positive integer greater than 1, and k being a positive integer from 1 to K; determine, according to the first template weight, a fifth cost corresponding to prediction of the template using each of the P second candidate prediction modes; and determine an adjusted prediction mode corresponding to the k-th second refined prediction mode according to fifth costs respectively corresponding to the P second candidate prediction modes.

In some embodiments, the determining unit 12 is specifically configured to determine, among the P second candidate prediction modes, a second candidate prediction mode with a lowest fifth cost as the adjusted prediction mode corresponding to the k-th second refined prediction mode.

In some embodiments, when the j-th initial prediction mode is an intra prediction mode, the determining unit 12 is specifically configured to determine M intra prediction modes similar to the j-th initial prediction mode as the M first candidate prediction modes.

In some embodiments, when the j-th initial prediction mode is an inter prediction mode, the determining unit 12 is specifically configured to: obtain M first motion information by searching according to the j-th initial prediction mode; and obtain the M first candidate prediction modes according to the M first motion information.

In some embodiments, the determining unit 12 is specifically configured to: obtain M offsets by searching according to the j-th initial prediction mode; and obtain the M first motion information according to the M offsets.

In some embodiments, the determining unit 12 is specifically configured to determine P intra prediction modes similar to the k-th second refined prediction mode as the P second candidate prediction modes.

In some embodiments, the determining unit 12 is specifically configured to: obtain P second motion information by searching according to the k-th second refined prediction mode; and obtain the P second candidate prediction modes according to the P second motion information.

In some embodiments, the determining unit 12 is specifically configured to: obtain P offsets by searching according to the k-th second refined prediction mode; and obtain the P second motion information according to the P offsets.

In some embodiments, the determining unit 12 is specifically configured to determine, among the N candidate weight derivation modes, a candidate weight derivation mode with a lowest first cost as the weight derivation mode for the current block.

In some embodiments, the determining unit 12 is specifically configured to: obtain a candidate weight derivation mode list by sorting the N candidate weight derivation modes according to the first costs respectively corresponding to the N candidate weight derivation modes; decode the bitstream to obtain a weight derivation mode index; and determine, from the candidate weight derivation mode list, a candidate weight derivation mode corresponding to the weight derivation mode index as the weight derivation mode for the current block.

In some embodiments, the determining unit 12 is specifically configured to: determine an alternative prediction mode list, the alternative prediction mode list comprising at least two alternative prediction modes; decode the bitstream to obtain a prediction mode index; and determine the K initial prediction modes from the alternative prediction mode list according to the prediction mode index.

In some embodiments, the determining unit 12 is specifically configured to: determine an angle index and a distance index according to a weight derivation mode; and determine a template weight according to the angle index, the distance index, and a size of a template, where when the weight derivation mode is the weight derivation mode for the current block, the template weight is a first template weight, and when the weight derivation mode is an i-th candidate weight derivation mode, the template weight is a second template weight.

In some embodiments, the determining unit 12 is specifically configured to: determine a first parameter of a sample in the template according to the angle index, the distance index, and the size of the template, where the first parameter is used for determining a weight; determine a weight of the sample in the template according to the first parameter of the sample in the template; and determine the template weight according to the weight of the sample in the template.

In some embodiments, the predicting unit 13 is specifically configured to: determine K prediction values according to the K adjusted prediction modes; determine weights of the K prediction values according to the weight derivation mode for the current block; and determine the prediction value of the current block according to the K prediction values and the weights of the K prediction values.

In some embodiments, the determining unit 12 is specifically configured to: determine a weight of a sample in a merge region consisting of the current block and the template, according to the angle index, the distance index, the size of the template, and a size of the current block; and determine the template weight according to the size of the template and the weight of the sample in the merge region.

In some embodiments, the predicting unit 13 is specifically configured to: determining K prediction values according to the K adjusted prediction modes; determining weights of the K prediction values according to the weight of the sample in the merge region; and determining the prediction value of the current block according to the K prediction values and the weights of the K prediction values.

In some embodiments, the predicting unit 13 is specifically configured to determining the weights of the K prediction values according to the weight of the sample in the current block in the merge region.

Optionally, the template of the current block includes at least one of an upper decoded region, a left decoded region, or an upper-left decoded region of the current block.

It should be understood that, the apparatus embodiments and the method embodiments may correspond to each other, and for similar elaborations, reference can be made to the method embodiments, which will not be described again herein to avoid redundancy. Specifically, the apparatus 10 illustrated in FIG. 20 may correspond to a corresponding entity for performing the prediction method at the decoding end according to the embodiment of the disclosure, and the foregoing and other operations and/or functions of various units in the apparatus 10 are respectively intended to implement corresponding processes of various methods such as the prediction method at the decoding end, which will not be repeated herein for brevity.

Figure 21:
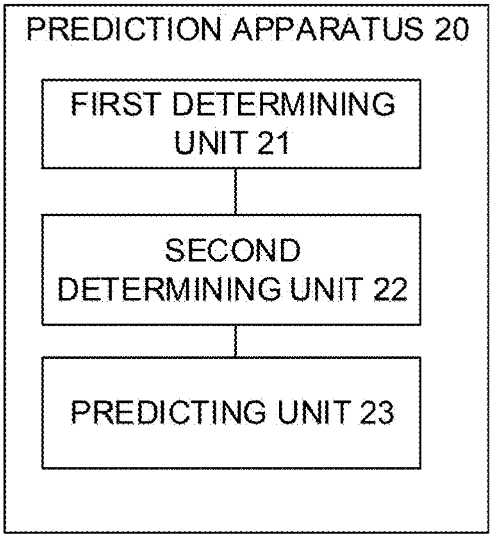
FIG. 21 is a schematic block diagram of a prediction apparatus provided in an embodiment of the disclosure.

FIG. 21 is a schematic block diagram of a prediction apparatus provided in embodiments of the disclosure. The prediction apparatus is applied to the above encoder.

As illustrated in FIG. 21, the prediction apparatus 20 includes a first determining unit 21, a second determining unit 22, and a predicting unit 23.

The first determining unit 21 is configured to decode a bitstream to determine K initial prediction modes, K being an integer greater than 1.

The second determining unit 22 is configured to determine a weight derivation mode for a current block according to the K initial prediction modes.

The predicting unit 23 is configured to determine a prediction value of the current block according to the weight derivation mode for the current block.

In some embodiments, the predicting unit 23 is specifically configured to determine K adjusted prediction modes according to the weight derivation mode for the current block, and determine the prediction value of the current block according to the K adjusted prediction modes and the weight derivation mode for the current block.

In some embodiments, the second determining unit 22 is specifically configured to: determine N candidate weight derivation modes, N being an integer greater than 1; for an i-th candidate weight derivation mode in the N candidate weight derivation modes, determine a first cost corresponding to the i-th candidate weight derivation mode according the i-th candidate weight derivation mode and the K initial prediction modes, i being a positive integer from 1 to N; and determine the weight derivation mode for the current block according to first costs respectively corresponding to the N candidate weight derivation modes.

In some embodiments, the second determining unit 22 is specifically configured to: predict a template of the current block using the i-th candidate weight derivation mode and the K initial prediction modes, to obtain a first prediction value of the template; and determine the first cost corresponding to the i-th candidate weight derivation mode according to the first prediction value of the template and a reconstruction value of the template.

In some embodiments, the second determining unit 22 is specifically configured to obtain the K adjusted prediction modes by refining the K initial prediction modes according to the weight derivation mode for the current block.

In some embodiments, the second determining unit 22 is specifically configured to: determine a first template weight according to the weight derivation mode for the current block; for a j-th initial prediction mode in the K initial prediction modes, determine M first candidate prediction modes corresponding to the j-th initial prediction mode, M being a positive integer greater than 1, and j being a positive integer from 1 to K; determine, according to the first template weight, a second cost corresponding to prediction of the template using each of the M first candidate prediction modes; and determine an adjusted prediction mode corresponding to the j-th initial prediction mode according to second costs respectively corresponding to the M first candidate prediction modes.

In some embodiments, the second determining unit 22 is specifically configured to determine, among the M first candidate prediction modes, a first candidate prediction mode with a lowest second cost as the adjusted prediction mode corresponding to the j-th initial prediction mode.

In some embodiments, the second determining unit 22 is specifically configured to: obtain K first refined prediction modes corresponding to the i-th candidate weight derivation mode by refining the K initial prediction modes according to the i-th candidate weight derivation mode; and determine the first cost corresponding to the i-th candidate weight derivation mode according to the i-th candidate weight derivation mode and the K first refined prediction modes.

In some embodiments, the second determining unit 22 is specifically configured to determine a second template weight according to the i-th candidate weight derivation mode; for a j-th initial prediction mode in the K initial prediction modes, determine M first candidate prediction modes corresponding to the j-th initial prediction mode, M being a positive integer greater than 1, and j being a positive integer from 1 to K; determine, according to the second template weight, a third cost corresponding to prediction of the template using each of M first candidate prediction modes; and determine a first refined prediction mode corresponding to the j-th initial prediction mode according to third costs respectively corresponding to the M first candidate prediction modes.

In some embodiments, the second determining unit 22 is specifically configured to determine, among the M first candidate prediction modes, a first candidate prediction mode with a lowest third cost as the first refined prediction mode corresponding to the j-th initial prediction mode.

In some embodiments, the second determining unit 22 is specifically configured to: obtain a second prediction value of the template by predicting the template of the current block using the i-th candidate weight derivation mode and the K first refined prediction modes; and determine the first cost corresponding to the i-th candidate weight derivation mode according to the second prediction value of the template and a reconstruction value of the template.

In some embodiments, the second determining unit 22 is specifically configured to determine K first refined prediction modes corresponding to the weight derivation mode for the current block as the K adjusted prediction modes.

In some embodiments, the second determining unit 22 is specifically configured to: for a j-th initial prediction mode in the K initial prediction modes, determine a second refined prediction mode corresponding to the j-th initial prediction mode with respect to P sub-templates, P being a positive integer, j being a positive integer from 1 to K; determine, from second refined prediction modes respectively corresponding to the K initial prediction modes with respect to the P sub-templates, K second refined prediction modes corresponding to the i-th candidate weight derivation mode according to the i-th candidate weight derivation mode; and determine the first cost corresponding to the i-th candidate weight derivation mode according to the i-th candidate weight derivation mode and the K second refined prediction modes.

In some embodiments, the second determining unit 22 is specifically configured to: determine a partition angle corresponding to the i-th candidate weight derivation mode; and determine, from the second refined prediction modes respectively corresponding to the K initial prediction modes with respect to the P sub-templates, K second refined prediction modes corresponding to the i-th candidate weight derivation mode according to correspondence between partition angles and templates corresponding to prediction modes.

Optionally, the P sub-templates include at least one of a left template, an above template, or an all template for the current block.

In some embodiments, the second determining unit 22 is specifically configured to determine M first candidate prediction modes corresponding to the j-th initial prediction mode, M being a positive integer greater than 1; for a p-th sub-template of the P sub-templates, determine a fourth cost corresponding to prediction of the p-th sub-template using each of the M first candidate prediction modes, p being a positive integer from 1 to P; and determine the second refined prediction mode corresponding to the j-th initial prediction mode with respect to the p-th sub-template according to fourth costs respectively corresponding to the M first candidate prediction modes with respect to the p-th sub-template.

In some embodiments, the second determining unit 22 is specifically configured to determine, among the M first candidate prediction modes, a first candidate prediction mode with a lowest fourth cost with respect to the p-th sub-template as the second refined prediction mode corresponding to the j-th initial prediction mode with respect to the p-th sub-template.

In some embodiments, the second determining unit 22 is specifically configured to: for any first candidate prediction mode of the M first candidate prediction modes, obtain a prediction value of the p-th sub-template by predicting the p-th sub-template using the first candidate prediction mode; and determine the fourth cost corresponding to the first candidate prediction mode with respect to the p-th sub-template according to the prediction value of the p-th sub-template and a reconstruction value of the p-th sub-template.

In some embodiments, the second determining unit 22 is specifically configured to: obtain a third prediction value of the template by predicting the template of the current block using the i-th candidate weight derivation mode and the K second refined prediction modes; and determine the first cost corresponding to the i-th candidate weight derivation mode according to the third prediction value of the template and a reconstruction value of the template.

In some embodiments, the second determining unit 22 is specifically configured to determine the K adjusted prediction modes according to K second refined prediction modes corresponding to the weight derivation mode for the current block.

In some embodiments, the second determining unit 22 is specifically configured to determine the K second refined prediction modes corresponding to the weight derivation mode for the current block as the K adjusted prediction modes.

In some embodiments, the second determining unit 22 is specifically configured to obtain the K adjusted prediction modes by refining the K second refined prediction modes according to the weight derivation mode for the current block.

In some embodiments, the second determining unit 22 is specifically configured to: determine a first template weight according to the weight derivation mode for the current block; for a k-th second refined prediction mode in the K second refined prediction modes, determine P second candidate prediction modes corresponding to the k-th second refined prediction mode, P being a positive integer greater than 1, and k being a positive integer from 1 to K; determine, according to the first template weight, a fifth cost corresponding to prediction of the template using each of the P second candidate prediction modes; and determine an adjusted prediction mode corresponding to the k-th second refined prediction mode according to fifth costs respectively corresponding to the P second candidate prediction modes.

In some embodiments, the second determining unit 22 is specifically configured to determine, among the P second candidate prediction modes, a second candidate prediction mode with a lowest fifth cost as the adjusted prediction mode corresponding to the k-th second refined prediction mode.

In some embodiments, when the j-th initial prediction mode is an intra prediction mode, the second determining unit 22 is specifically configured to determine M intra prediction modes similar to the j-th initial prediction mode as the M first candidate prediction modes.

In some embodiments, when the j-th initial prediction mode is an inter prediction mode, the second determining unit 22 is specifically configured to: obtain M first motion information by searching according to the j-th initial prediction mode; and obtain the M first candidate prediction modes according to the M first motion information.

In some embodiments, the second determining unit 22 is specifically configured to: obtain M offsets by searching according to the j-th initial prediction mode; and obtain the M first motion information according to the M offsets.

In some embodiments, when the k-th second refined prediction mode is an intra prediction mode, the second determining unit 22 is specifically configured to determine P intra prediction modes similar to the k-th second refined prediction mode as the P second candidate prediction modes.

In some embodiments, when the k-th second refined prediction mode is an inter prediction mode, the second determining unit 22 is specifically configured to: obtain P second motion information by searching according to the k-th second refined prediction mode; and obtain the P second candidate prediction modes according to the P second motion information.

In some embodiments, the second determining unit 22 is specifically configured to: obtain P offsets by searching according to the k-th second refined prediction mode; and obtain the P second motion information according to the P offsets.

In some embodiments, the second determining unit 22 is specifically configured to determine, among the N candidate weight derivation modes, a candidate weight derivation mode with a lowest first cost as the weight derivation mode for the current block.

In some embodiments, the second determining unit 22 is specifically configured to: obtain a candidate weight derivation mode list by sorting the N candidate weight derivation modes according to the first costs respectively corresponding to the N candidate weight derivation modes; and determine, according to the candidate weight derivation mode list, the weight derivation mode for the current block.

In some embodiments, the first determining unit 22 is specifically configured to signal into a bitstream a weight derivation mode index corresponding to the weight derivation mode for the current block in the candidate weight derivation mode list.

In some embodiments, the first determining unit 22 is specifically configured to signal into a bitstream a prediction mode index, where the prediction mode index is used to determine the K initial prediction modes.

In some embodiments, the second determining unit 22 is specifically configured to: determine an angle index and a distance index according to a weight derivation mode; and determine a template weight according to the angle index, the distance index, and a size of a template, where when the weight derivation mode is the weight derivation mode for the current block, the template weight is a first template weight, and when the weight derivation mode is an i-th candidate weight derivation mode, the template weight is a second template weight.

In some embodiments, the second determining unit 22 is specifically configured to: determine a first parameter of a sample in the template according to the angle index, the distance index, and the size of the template, where the first parameter is used for determining a weight; determine a weight of the sample in the template according to the first parameter of the sample in the template; and determine the template weight according to the weight of the sample in the template.

In some embodiments, the predicting unit 23 is specifically configured to: determining K prediction values according to the K adjusted prediction modes; determining weights of the K prediction values according to the weight derivation mode for the current block; and determining the prediction value of the current block according to the K prediction values and the weights of the K prediction values.

In some embodiments, the second determining unit 22 is specifically configured to: determine a weight of a sample in a merge region consisting of the current block and the template, according to the angle index, the distance index, the size of the template, and a size of the current block; and determine the w template eight according to the size of the template and the weight of the sample in the merge region.

In some embodiments, the predicting unit 23 is specifically configured to: determine K prediction values according to the K adjusted prediction modes; determine weights of the K prediction values according to the weight of the sample in the merge region; and determine the prediction value of the current block according to the K prediction values and the weights of the K prediction values.

In some embodiments, the predicting unit 23 is specifically configured to determine the weights of the K prediction values according to the weight of the sample in the current block in the merge region.

Optionally, the template of the current block includes at least one of an upper decoded region, a left decoded region, or an upper-left decoded region of the current block.

It should be understood that, the apparatus embodiments and the method embodiments may correspond to each other, and for similar elaborations, reference can be made to the method embodiments, which will not be described again herein to avoid redundancy. Specifically, the apparatus 20 illustrated in FIG. 21 may correspond to a corresponding entity for performing the prediction method at the encoding end according to the embodiment of the disclosure, and the foregoing and other operations and/or functions of various units in the apparatus 20 are respectively intended to implement corresponding processes of various methods such as the prediction method at the encoding end, which will not be repeated herein for brevity.

The apparatus and system of embodiments of the disclosure are described above from the perspective of functional units with reference to the accompanying drawings. It should be understood that, the functional unit may be implemented in the form of hardware, or may be implemented by an instruction in the form of software, or may be implemented by a combination of hardware and software unit. Specifically, each step of the method embodiments of the disclosure may be completed by an integrated logic circuit of hardware in a processor and/or an instruction in the form of software. The steps of the method disclosed in embodiments of the disclosure may be directly implemented by a hardware decoding processor, or may be performed by hardware and software units in the decoding processor. Optionally, the software unit may be located in a storage medium such as a random access memory (RAM), a flash memory, a read only memory (ROM), a programmable ROM (PROM), or an electrically erasable programmable memory, registers, and the like. The storage medium is located in a memory. The processor reads the information in the memory, and completes the steps of the foregoing method embodiments with the hardware of the processor.

Figure 22:
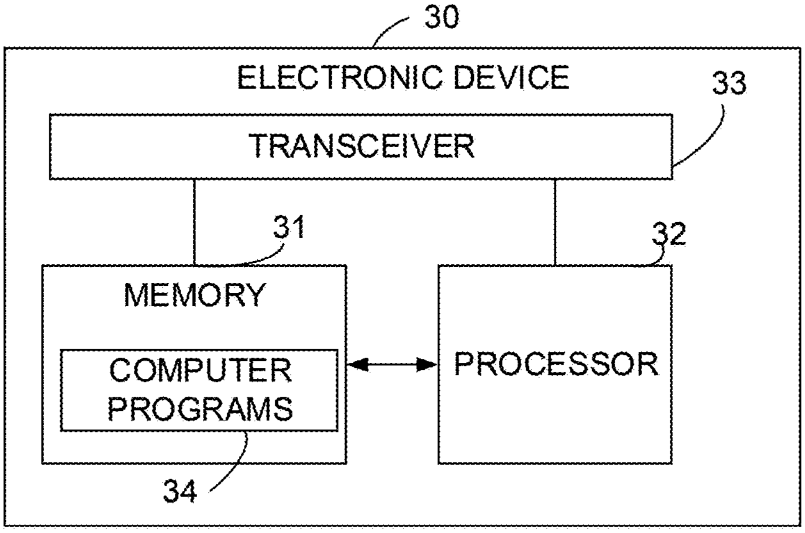
FIG. 22 is a schematic block diagram of an electronic device provided in embodiments of the disclosure.

FIG. 22 is a schematic block diagram of an electronic device provided in embodiments of the disclosure.

As illustrated in FIG. 22, the electronic device 30 may be a video encoder or a video decoder according to embodiments of the disclosure. The electronic device 30 may include a memory 31 and a processor 32. The memory 31 is configured to store computer programs 34 and transmit the program codes 34 to the processor 32. In other words, the processor 32 may call the computer programs 34 from the memory 31 to implement the method in embodiments of the disclosure.

For example, the processor 32 may be configured to perform the steps in the method 200 described above according to instructions in the computer programs 34.

In some embodiments of the disclosure, the processor 32 may include, but is not limited to: a general-purpose processor, a digital signal processor (DSP), an application specific integrated circuit (ASIC), a field programmable gate array (FPGA), or other programmable logic devices, discrete gates or transistor logic devices, discrete hardware components, etc.

In some embodiments of the disclosure, the memory 31 includes, but is not limited to: a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

In some embodiments of the disclosure, the computer program 34 may be divided into one or more units, and the one or more units are stored in the memory 31 and executed by the processor 32 to complete the method provided in the disclosure. The one or more units may be a series of computer program instruction segments capable of performing particular functions, where the instruction segments are used for describing the execution of the computer program 34 in the electronic device 30.

As illustrated in FIG. 22, the electronic device 30 may further include a transceiver 33. The transceiver 33 may be connected to the processor 32 or the memory 31.

The processor 32 can control the transceiver 33 to communicate with other devices, and specifically, can send information or data to other devices, or receive information or data sent by other devices. The transceiver 33 may further include an antenna, where one or more antennas may be provided.

It should be understood that, various components in the electronic device 30 are connected via a bus system. In addition to a data bus, the bus system further includes a power bus, a control bus, and a status signal bus.

Figure 23:
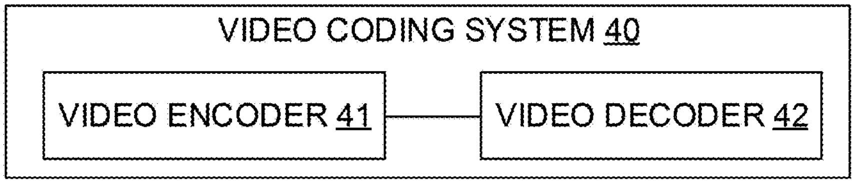
FIG. 23 is a schematic block diagram of a video coding system provided in embodiments of the disclosure.

FIG. 23 is a schematic block diagram of a video coding system provided in embodiments of the disclosure.

As illustrated in FIG. 23, the video coding system 40 may include a video encoder 41 and a video decoder 42. The video encoder 41 is configured to perform the video encoding method in embodiments of the disclosure, and the video decoder 42 is configured to perform the video decoding method in embodiments of the disclosure.

The disclosure further provides a computer storage medium. The computer storage medium is configured to store computer programs. The computer programs, when executed by a computer, are operable with the computer to perform the method in the foregoing method embodiments. Alternatively, embodiments of the disclosure further provide a computer program product. The computer program product includes instructions which, when executed by a computer, are operable with the computer to perform the method in the foregoing method embodiments.

The disclosure further provides a bitstream. The bitstream is generated according to the encoding method. Optionally, the bitstream contains the first flag, or contains the first flag and the second flag.

When implemented by software, all or some the above embodiments can be implemented in the form of a computer program product. The computer program product includes one or more computer instructions. When the computer instructions are applied and executed on a computer, all or some the operations or functions of the embodiments of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disk, a hard disk, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure. For example, various functional units described in various embodiments of the disclosure may be integrated into one processing unit or may be present as a number of physically separated units, and two or more units may be integrated into one.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A prediction method, applied to a decoder and comprising:

decoding a bitstream to determine K initial prediction modes, K being an integer greater than 1;

determining a weight derivation mode for a current block according to the K initial prediction modes;

determining K adjusted prediction modes according to the weight derivation mode for the current block; and determining a prediction value of the current block according to the K adjusted prediction modes and the weight derivation mode for the current block.

2. The method of claim 1, wherein determining the weight derivation mode for the current block according to the K initial prediction modes comprises:

determining N candidate weight derivation modes, N being an integer greater than 1;

for an i-th candidate weight derivation mode in the N candidate weight derivation modes, determining a first cost corresponding to the i-th candidate weight derivation mode according the i-th candidate weight derivation mode and the K initial prediction modes, i being a positive integer from 1 to N; and determining the weight derivation mode for the current block according to first costs respectively corresponding to the N candidate weight derivation modes.

3. The method of claim 2, wherein determining the first cost corresponding to the i-th candidate weight derivation mode according the i-th candidate weight derivation mode and the K initial prediction modes comprises:

predicting a template of the current block using the i-th candidate weight derivation mode and the K initial prediction modes, to obtain a first prediction value of the template; and determining the first cost corresponding to the i-th candidate weight derivation mode according to the first prediction value of the template and a reconstruction value of the template;

wherein determining the K adjusted prediction modes according to the weight derivation mode for the current block comprises:

obtaining the K adjusted prediction modes by refining the K initial prediction modes according to the weight derivation mode for the current block;

wherein obtaining the K adjusted prediction modes by refining the K initial prediction modes according to the weight derivation mode for the current block comprises:

determining a first template weight according to the weight derivation mode for the current block;

for a j-th initial prediction mode in the K initial prediction modes, determining M first candidate prediction modes corresponding to the j-th initial prediction mode, M being a positive integer greater than 1, and j being a positive integer from 1 to K;

determining, according to the first template weight, a second cost corresponding to prediction of the template using each of the M first candidate prediction modes; and determining an adjusted prediction mode corresponding to the j-th initial prediction mode according to second costs respectively corresponding to the M first candidate prediction modes;

wherein determining the adjusted prediction mode corresponding to the j-th initial prediction mode according to the second costs respectively corresponding to the M first candidate prediction modes comprises:

determining, among the M first candidate prediction modes, a first candidate prediction mode with a lowest second cost as the adjusted prediction mode corresponding to the j-th initial prediction mode.

4. The method of claim 2, wherein determining the first cost corresponding to the i-th candidate weight derivation mode according the i-th candidate weight derivation mode and the K initial prediction modes comprises:

obtaining K first refined prediction modes corresponding to the i-th candidate weight derivation mode by refining the K initial prediction modes according to the i-th candidate weight derivation mode; and determining the first cost corresponding to the i-th candidate weight derivation mode according to the i-th candidate weight derivation mode and the K first refined prediction modes;

wherein obtaining the K first refined prediction modes corresponding to the i-th candidate weight derivation mode by refining the K initial prediction modes according to the i-th candidate weight derivation mode comprises:

determining a second template weight according to the i-th candidate weight derivation mode;

for a j-th initial prediction mode in the K initial prediction modes, determining M first candidate prediction modes corresponding to the j-th initial prediction mode, M being a positive integer greater than 1, and j being a positive integer from 1 to K;

determining, according to the second template weight, a third cost corresponding to prediction of the template using each of M first candidate prediction modes; and determining a first refined prediction mode corresponding to the j-th initial prediction mode according to third costs respectively corresponding to the M first candidate prediction modes;

wherein determining the first refined prediction mode corresponding to the j-th initial prediction mode according to the third costs respectively corresponding to the M first candidate prediction modes comprises:

determining, among the M first candidate prediction modes, a first candidate prediction mode with a lowest third cost as the first refined prediction mode corresponding to the j-th initial prediction mode.

5. The method of claim 4, wherein determining the first cost corresponding to the i-th candidate weight derivation mode according to the i-th candidate weight derivation mode and the K first refined prediction modes comprises:

obtaining a second prediction value of the template by predicting the template of the current block using the i-th candidate weight derivation mode and the K first refined prediction modes; and determining the first cost corresponding to the i-th candidate weight derivation mode according to the second prediction value of the template and a reconstruction value of the template.

6. The method of claim 4, wherein determining the K adjusted prediction modes according to the weight derivation mode for the current block comprises:

determining K first refined prediction modes corresponding to the weight derivation mode for the current block as the K adjusted prediction modes.

7. The method of claim 2, wherein determining the first cost corresponding to the i-th candidate weight derivation mode according the i-th candidate weight derivation mode and the K initial prediction modes comprises:

for a j-th initial prediction mode in the K initial prediction modes, determining a second refined prediction mode corresponding to the j-th initial prediction mode with respect to P sub-templates, P being a positive integer, j being a positive integer from 1 to K;

determining, from second refined prediction modes respectively corresponding to the K initial prediction modes with respect to the P sub-templates, K second refined prediction modes corresponding to the i-th candidate weight derivation mode according to the i-th candidate weight derivation mode; and determining the first cost corresponding to the i-th candidate weight derivation mode according to the i-th candidate weight derivation mode and the K second refined prediction modes;

wherein the P sub-templates comprise at least one of a left template, an above template, or an all template for the current block;

wherein determining the second refined prediction mode corresponding to the j-th initial prediction mode with respect to P sub-templates comprises:

determining M first candidate prediction modes corresponding to the j-th initial prediction mode, M being a positive integer greater than 1;

for a p-th sub-template of the P sub-templates, determining a fourth cost corresponding to prediction of the p-th sub-template using each of the M first candidate prediction modes, p being a positive integer from 1 to P; and determining the second refined prediction mode corresponding to the j-th initial prediction mode with respect to the p-th sub-template according to fourth costs respectively corresponding to the M first candidate prediction modes with respect to the p-th sub-template.

8. The method of claim 7, wherein determining the K adjusted prediction modes according to the weight derivation mode for the current block comprises:

determining the K adjusted prediction modes according to K second refined prediction modes corresponding to the weight derivation mode for the current block;

wherein determining the K adjusted prediction modes according to the K second refined prediction modes corresponding to the weight derivation mode for the current block comprises:

obtaining the K adjusted prediction modes by refining the K second refined prediction modes according to the weight derivation mode for the current block;

wherein obtaining the K adjusted prediction modes by refining the K second refined prediction modes according to the weight derivation mode for the current block comprises:

determining a first template weight according to the weight derivation mode for the current block;

for a k-th second refined prediction mode in the K second refined prediction modes, determining P second candidate prediction modes corresponding to the k-th second refined prediction mode, P being a positive integer greater than 1, and k being a positive integer from 1 to K;

determining, according to the first template weight, a fifth cost corresponding to prediction of the template using each of the P second candidate prediction modes; and determining an adjusted prediction mode corresponding to the k-th second refined prediction mode according to fifth costs respectively corresponding to the P second candidate prediction modes.

9. The method of claim 3, wherein when the j-th initial prediction mode is an inter prediction mode, determining the M first candidate prediction modes corresponding to the j-th initial prediction mode comprises:

obtaining M first motion information by searching according to the j-th initial prediction mode; and obtaining the M first candidate prediction modes according to the M first motion information;

wherein obtaining the M first motion information by searching according to the j-th initial prediction mode comprises:

obtaining M offsets by searching according to the j-th initial prediction mode; and obtaining the M first motion information according to the M offsets.

10. The method of claim 3, further comprising:

determining an angle index and a distance index according to a weight derivation mode; and determining a template weight according to the angle index, the distance index, and a size of a template;

wherein when the weight derivation mode is the weight derivation mode for the current block, the template weight is a first template weight, and when the weight derivation mode is an i-th candidate weight derivation mode, the template weight is a second template weight;

wherein determining the template weight according to the angle index, the distance index, and the size of the template comprises:

determining a first parameter of a sample in the template according to the angle index, the distance index, and the size of the template, wherein the first parameter is used for determining a weight;

determining a weight of the sample in the template according to the first parameter of the sample in the template; and determining the template weight according to the weight of the sample in the template.

11. A prediction method, applied to an encoder and comprising:

determining K initial prediction modes, K being an integer greater than 1;

determining a weight derivation mode for a current block according to the K initial prediction modes;

determining K adjusted prediction modes according to the weight derivation mode for the current block; and determining a prediction value of the current block according to the K adjusted prediction modes and the weight derivation mode for the current block.

12. The method of claim 11, wherein determining the weight derivation mode for the current block according to the K initial prediction modes comprises:

determining N candidate weight derivation modes, N being an integer greater than 1;

for an i-th candidate weight derivation mode in the N candidate weight derivation modes, determining a first cost corresponding to the i-th candidate weight derivation mode according the i-th candidate weight derivation mode and the K initial prediction modes, i being a positive integer from 1 to N; and determining the weight derivation mode for the current block according to first costs respectively corresponding to the N candidate weight derivation modes.

13. The method of claim 12, wherein determining the first cost corresponding to the i-th candidate weight derivation mode according the i-th candidate weight derivation mode and the K initial prediction modes comprises:

predicting a template of the current block using the i-th candidate weight derivation mode and the K initial prediction modes, to obtain a first prediction value of the template; and determining the first cost corresponding to the i-th candidate weight derivation mode according to the first prediction value of the template and a reconstruction value of the template;

wherein determining the K adjusted prediction modes according to the weight derivation mode for the current block comprises:

obtaining the K adjusted prediction modes by refining the K initial prediction modes according to the weight derivation mode for the current block;

wherein obtaining the K adjusted prediction modes by refining the K initial prediction modes according to the weight derivation mode for the current block comprises:

determining a first template weight according to the weight derivation mode for the current block;

for a j-th initial prediction mode in the K initial prediction modes, determining M first candidate prediction modes corresponding to the j-th initial prediction mode, M being a positive integer greater than 1, and j being a positive integer from 1 to K;

determining, according to the first template weight, a second cost corresponding to prediction of the template using each of the M first candidate prediction modes; and determining an adjusted prediction mode corresponding to the j-th initial prediction mode according to second costs respectively corresponding to the M first candidate prediction modes;

wherein determining the adjusted prediction mode corresponding to the j-th initial prediction mode according to the second costs respectively corresponding to the M first candidate prediction modes comprises:

determining, among the M first candidate prediction modes, a first candidate prediction mode with a lowest second cost as the adjusted prediction mode corresponding to the j-th initial prediction mode.

14. The method of claim 12, wherein determining the first cost corresponding to the i-th candidate weight derivation mode according the i-th candidate weight derivation mode and the K initial prediction modes comprises:

obtaining K first refined prediction modes corresponding to the i-th candidate weight derivation mode by refining the K initial prediction modes according to the i-th candidate weight derivation mode; and determining the first cost corresponding to the i-th candidate weight derivation mode according to the i-th candidate weight derivation mode and the K first refined prediction modes;

wherein obtaining the K first refined prediction modes corresponding to the i-th candidate weight derivation mode by refining the K initial prediction modes according to the i-th candidate weight derivation mode comprises:

determining a second template weight according to the i-th candidate weight derivation mode;

for a j-th initial prediction mode in the K initial prediction modes, determining M first candidate prediction modes corresponding to the j-th initial prediction mode, M being a positive integer greater than 1, and j being a positive integer from 1 to K;

determining, according to the second template weight, a third cost corresponding to prediction of the template using each of M first candidate prediction modes; and determining a first refined prediction mode corresponding to the j-th initial prediction mode according to third costs respectively corresponding to the M first candidate prediction modes;

wherein determining the first refined prediction mode corresponding to the j-th initial prediction mode according to the third costs respectively corresponding to the M first candidate prediction modes comprises:

determining, among the M first candidate prediction modes, a first candidate prediction mode with a lowest third cost as the first refined prediction mode corresponding to the j-th initial prediction mode.

15. The method of claim 14, wherein determining the first cost corresponding to the i-th candidate weight derivation mode according to the i-th candidate weight derivation mode and the K first refined prediction modes comprises:

obtaining a second prediction value of the template by predicting the template of the current block using the i-th candidate weight derivation mode and the K first refined prediction modes; and determining the first cost corresponding to the i-th candidate weight derivation mode according to the second prediction value of the template and a reconstruction value of the template.

16. The method of claim 14, wherein determining the K adjusted prediction modes according to the weight derivation mode for the current block comprises:

determining K first refined prediction modes corresponding to the weight derivation mode for the current block as the K adjusted prediction modes.

17. The method of claim 12, wherein determining the first cost corresponding to the i-th candidate weight derivation mode according the i-th candidate weight derivation mode and the K initial prediction modes comprises:

for a j-th initial prediction mode in the K initial prediction modes, determining a second refined prediction mode corresponding to the j-th initial prediction mode with respect to P sub-templates, P being a positive integer, j being a positive integer from 1 to K;

determining, from second refined prediction modes respectively corresponding to the K initial prediction modes with respect to the P sub-templates, K second refined prediction modes corresponding to the i-th candidate weight derivation mode according to the i-th candidate weight derivation mode; and determining the first cost corresponding to the i-th candidate weight derivation mode according to the i-th candidate weight derivation mode and the K second refined prediction modes;

wherein the P sub-templates comprise at least one of a left template, an above template, or an all template for the current block;

wherein determining the second refined prediction mode corresponding to the j-th initial prediction mode with respect to P sub-templates comprises:

determining M first candidate prediction modes corresponding to the j-th initial prediction mode, M being a positive integer greater than 1;

for a p-th sub-template of the P sub-templates, determining fourth costs corresponding to prediction of the p-th sub-template using each of the M first candidate prediction modes, p being a positive integer from 1 to P; and determining the second refined prediction mode corresponding to the j-th initial prediction mode with respect to the p-th sub-template according to the fourth costs respectively corresponding to the M first candidate prediction modes with respect to the p-th sub-template.

18. The method of claim 17, wherein determining the K adjusted prediction modes according to the weight derivation mode for the current block comprises:

determining the K adjusted prediction modes according to K second refined prediction modes corresponding to the weight derivation mode for the current block;

wherein determining the K adjusted prediction modes according to the K second refined prediction modes corresponding to the weight derivation mode for the current block comprises:

obtaining the K adjusted prediction modes by refining the K second refined prediction modes according to the weight derivation mode for the current block;

wherein obtaining the K adjusted prediction modes by refining the K second refined prediction modes according to the weight derivation mode for the current block comprises:

determining a first template weight according to the weight derivation mode for the current block;

for a k-th second refined prediction mode in the K second refined prediction modes, determining P second candidate prediction modes corresponding to the k-th second refined prediction mode, P being a positive integer greater than 1, and k being a positive integer from 1 to K;

determining, according to the first template weight, a fifth cost corresponding to prediction of the template using each of the P second candidate prediction modes; and determining an adjusted prediction mode corresponding to the k-th second refined prediction mode according to the fifth costs respectively corresponding to the P second candidate prediction modes.

19. The method of claim 13, wherein when the j-th initial prediction mode is an inter prediction mode, determining the M first candidate prediction modes corresponding to the j-th initial prediction mode comprises:

obtaining M first motion information by searching according to the j-th initial prediction mode; and obtaining the M first candidate prediction modes according to the M first motion information;

wherein obtaining the M first motion information by searching according to the j-th initial prediction mode comprises:

obtaining M offsets by searching according to the j-th initial prediction mode; and obtaining the M first motion information according to the M offsets.

20. A non-transitory computer-readable storage medium storing thereon a computer program and a bitstream, wherein when executed by one or more processors, the computer program causes the one or more processors to generate the bitstream according to an encoding method comprising:

determining K initial prediction modes, K being an integer greater than 1;

determining a weight derivation mode for a current block according to the K initial prediction modes;

determining K adjusted prediction modes according to the weight derivation mode for the current block; and determining a prediction value of the current block according to the K adjusted prediction modes and the weight derivation mode for the current block.

* * * * *